(12) United States Patent
Shin et al.

(10) Patent No.: US 12,314,758 B2
(45) Date of Patent: *May 27, 2025

(54) TASK MANAGER, PROCESSING DEVICE, AND METHOD FOR CHECKING TASK DEPENDENCIES THEREOF

(71) Applicant: Rebellions Inc., Seongnam-si (KR)

(72) Inventors: Wongyu Shin, Seongnam-si (KR);
Miock Chi, Seongnam-si (KR);
Hongyun Kim, Seongnam-si (KR);
Jinseok Kim, Seongnam-si (KR);
Chang-Hyo Yu, Seongnam-si (KR)

(73) Assignee: Rebellions Inc., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/671,802

(22) Filed: May 22, 2024

(65) Prior Publication Data
US 2024/0311186 A1  Sep. 19, 2024

Related U.S. Application Data

(63) Continuation of application No. 18/493,703, filed on Oct. 24, 2023, now Pat. No. 12,026,548.

(30) Foreign Application Priority Data

Nov. 4, 2022  (KR) .................. 10-2022-0146440
Nov. 4, 2022  (KR) .................. 10-2022-0146544
(Continued)

(51) Int. Cl.
*G06F 9/48* (2006.01)

(52) U.S. Cl.
CPC ................ *G06F 9/4881* (2013.01)

(58) Field of Classification Search
CPC .................................... G06F 9/4881
See application file for complete search history.

(56) References Cited

U.S. PATENT DOCUMENTS

2003/0177288 A1  9/2003  Kunimatsu et al.
2015/0082314 A1  3/2015  Suzuki

FOREIGN PATENT DOCUMENTS

| CN | 111026521 A | 4/2020 |
| JP | 2003-263331 A | 9/2003 |

(Continued)

OTHER PUBLICATIONS

Office Action for KR 10-2022-0146440 by Korean Intellectual Property Office dated Jul. 18, 2024.
(Continued)

*Primary Examiner* — Wissam Rashid
(74) *Attorney, Agent, or Firm* — BROADVIEW IP LAW, PC

(57) ABSTRACT

A task manager, a neural processing device, and a method for checking task dependencies thereof are provided. The task manager includes a task buffer configured to receive first and second tasks of different first and second types, a first queue configured to receive a first task descriptor for the first task from the task buffer, a second queue configured to receive a second task descriptor for the second task from the task buffer, a dependency checker configured to check dependencies of the first and second task descriptors, a third queue configured to receive the first task descriptor from the dependency checker, and a fourth queue configured to receive the second task descriptor from the dependency checker.

18 Claims, 54 Drawing Sheets

(30) Foreign Application Priority Data

Nov. 4, 2022 (KR) .................. 10-2022-0146546
Nov. 4, 2022 (KR) .................. 10-2022-0146548

(56) References Cited

FOREIGN PATENT DOCUMENTS

| | | |
|---|---|---|
| JP | 5971334 B2 | 8/2016 |
| KR | 10-2021-0002662 A | 1/2021 |
| KR | 10-2258566 B1 | 6/2021 |
| KR | 10-2022-0078655 A | 6/2022 |
| WO | 2019/212688 A1 | 11/2019 |
| WO | 2021/073752 A1 | 4/2021 |

OTHER PUBLICATIONS

Office Action for KR 10-2022-0146544 by Korean Intellectual Property Office dated Jul. 18, 2024.
Office Action for KR 10-2022-0146546 by Korean Intellectual Property Office dated Jul. 18, 2024.
Office Action for KR 10-2022-0146548 by Korean Intellectual Property Office dated Jul. 18, 2024.

TASK MANAGER, PROCESSING DEVICE, AND METHOD FOR CHECKING TASK DEPENDENCIES THEREOF

CROSS-REFERENCE TO RELATED APPLICATION

This application is a continuation of U.S. application Ser. No. 18/493,703, filed on Oct. 24, 2023, which claims priority under 35 U.S.C. § 119 to Korean Patent Application No. 10-2022-0146544, filed on Nov. 4, 2022, Korean Patent Application No. 10-2022-0146546, filed on Nov. 4, 2022, Korean Patent Application No. 10-2022-0146548, filed on Nov. 4, 2022, and Korean Patent Application No. 10-2022-0146440, filed on Nov. 4, 2022, in the Korean Intellectual Property Office, the entire contents of which is hereby incorporated by reference.

TECHNICAL FIELD

The disclosure relates to a task manager, a processing device, and a method for checking task dependencies thereof. In particular, the disclosure relates to a task manager, a processing device, and a method for checking task dependencies thereof with improved efficiency by self-checking dependencies of tasks.

BACKGROUND

For the last few years, artificial intelligence technology has been the core technology of the Fourth Industrial Revolution and the subject of discussion as the most promising technology worldwide. The biggest problem with artificial intelligence technology is computing performance. For artificial intelligence technology to realize a level of human learning ability, reasoning ability, perceptual ability, natural language implementation ability, etc., it is of the utmost importance to process a large amount of data quickly.

The central processing unit (CPU) or graphics processing unit (GPU) of off-the-shelf computers was used to implement deep-learning training and inference in early artificial intelligence, but these components had limitations in their ability to perform the tasks of deep-learning training and inference with high workloads. Thus, neural processing units (NPUs) that are structurally specialized for deep learning tasks have received a lot of attention.

Such a neural processing unit has a plurality of computation devices therein, and each computation device operates in parallel and can thus enhance computation efficiency. In this case, a method of distributing and managing tasks to each computation device may be important. A plurality of tasks may have dependencies on one another, and checking such dependencies is an essential part of task execution. There may exist various ways of performing such dependency checking.

SUMMARY

Aspects of the disclosure provide a task manager that efficiently checks task dependencies.

Aspects of the disclosure provide a neural processing device that efficiently checks task dependencies.

Aspects of the disclosure provide a method for checking task dependencies of a neural processing device that efficiently checks task dependencies.

According to some aspects of the disclosure, a task manager includes a task buffer configured to receive first and second tasks of different first and second types, a first queue configured to receive a first task descriptor for the first task from the task buffer, a second queue configured to receive a second task descriptor for the second task from the task buffer, a dependency checker configured to check dependencies of the first and second task descriptors, a third queue configured to receive the first task descriptor from the dependency checker and a fourth queue configured to receive the second task descriptor from the dependency checker.

According to some aspects, the dependency checker includes a first dependency matrix, and the first dependency matrix includes first and second rows corresponding to the first and second types, respectively, and first and second columns corresponding to the first and second types, respectively.

According to some aspects, the first dependency matrix includes a first field region and an OR sum region calculated via OR operation of elements of the first field region.

According to some aspects, the dependency checker receives a dependency field update request, and the first dependency matrix is updated according to the dependency field update request.

According to some aspects, the dependency field update request includes a first dependency set code for the first type, and a second dependency set code for the second type.

According to some aspects, the dependency checker further includes a second dependency matrix, and the first and second dependency matrices include a first group, and a second group, and wherein the first group processes the first task descriptor, and the second group processes a third task descriptor, and the third task descriptor is a descriptor for a third task of the first type.

According to some aspects, the dependency checker further includes a second dependency matrix, the first and second tasks are each dependent on a third task, the dependency checker receives a third task descriptor and a third dummy set descriptor for the third task, and the third task descriptor and the third dummy set descriptor are assigned to the first and second dependency matrices of different groups.

According to some aspects, the task manager further includes a task passage including the task buffer, the first queue, the second queue, the dependency checker, the third queue, and the fourth queue, and a done passage configured to check out the first to third task descriptors and the third dummy set descriptor.

According to some aspects, the task manager further includes a void core configured to receive the third dummy set descriptor from the task passage and transfer the dummy set descriptor to the done passage.

According to some aspects, a fourth task is dependent on fifth and sixth tasks, respectively, the dependency checker receives a fourth task descriptor and a fourth dummy check descriptor for the fourth task, and the fourth task descriptor and the fourth dummy check descriptor are assigned to the first and second dependency matrices of different groups.

According to some aspects, the fourth dummy check descriptor is burnt out within the dependency checker.

According to some aspects, the dependency checker generates first and second check codes, respectively, upon receiving the first and second task descriptors, and checks dependencies by comparing the first and second check codes with first and second rows of the first dependency matrix, respectively.

According to some aspects, the dependency checker performs check-in of the first task descriptor according to the first check code, and clears the first row of the first dependency matrix after performing the check-in.

According to some aspects of the disclosure, a neural processing device includes a neural core configured to perform tasks and generate completion signals for completion of the tasks, a core global configured to receive task information about the tasks, transfer the task information to the neural core, and receive the completion signals from the neural core, and a task manager configured to generate the task information, transfer the task information in sequence to the core global according to dependencies of the tasks, generate completion reports by receiving the completion signals from the core global, and transmit the completion reports.

According to some aspects, the task manager includes a task passage configured to generate task descriptors for the tasks and transfer the task information according to the task descriptors to the core global, and a done passage configured to check in the task descriptors from the task passage, receive the completion signals, check out the task descriptors, and generate the completion reports.

According to some aspects, the tasks include a first task and a second task that is a dummy set task of the first task, the task manager checks dependencies of the first and second tasks, the neural core performs the first task and generates a first completion signal, and the task manager further includes a void core configured to generate a second completion signal for the second task.

According to some aspects, the void core generates the second completion signal without transferring a task descriptor for the second task to the neural core.

According to some aspects, the task manager includes a dependency setter configured to generate a first dependency field update request in response to the first completion signal.

According to some aspects of the disclosure, a method for checking task dependencies of a neural processing device, includes receiving at least one dependency set code, storing a dependency matrix according to the at least one dependency set code, comparing a dependency check code of a task descriptor with a corresponding row of the dependency matrix, clearing the corresponding row if the dependency check code and the corresponding row are identical, and transmitting the task descriptor.

According to some aspects, the storing the dependency matrix includes storing at least one value in a field region according to the at least one dependency set code, and storing a first OR sum column by OR operation with elements of the field region.

Aspects of the disclosure are not limited to those mentioned above and other objects and advantages of the disclosure that have not been mentioned can be understood by the following description and will be more clearly understood according to embodiments of the disclosure. In addition, it will be readily understood that the objects and advantages of the disclosure can be realized by the means and combinations thereof set forth in the claims.

According to the task manager, the neural processing device, and the method for checking task dependencies thereof according to the disclosure, the task manager can check and process dependencies between tasks by itself without reporting to the command processor.

Accordingly, traffic between the command processor and the task manager can be minimized, thereby maximizing the processing speed and efficiency of the entire device.

In addition, OR-type dependencies can be implemented through the single mode.

Furthermore, all the dependencies of various modules can be processed even with a single group through the configuration of the counter.

In addition to the foregoing, the specific effects of the disclosure will be described together while elucidating the specific details for carrying out the embodiments below.

BRIEF DESCRIPTION OF THE DRAWINGS

FIG. 45 is a block diagram for illustrating the memory reconstruction of the neural processing system in accordance with some embodiments of the disclosure;

DETAILED DESCRIPTION OF THE PREFERRED EMBODIMENTS

Figure 1:
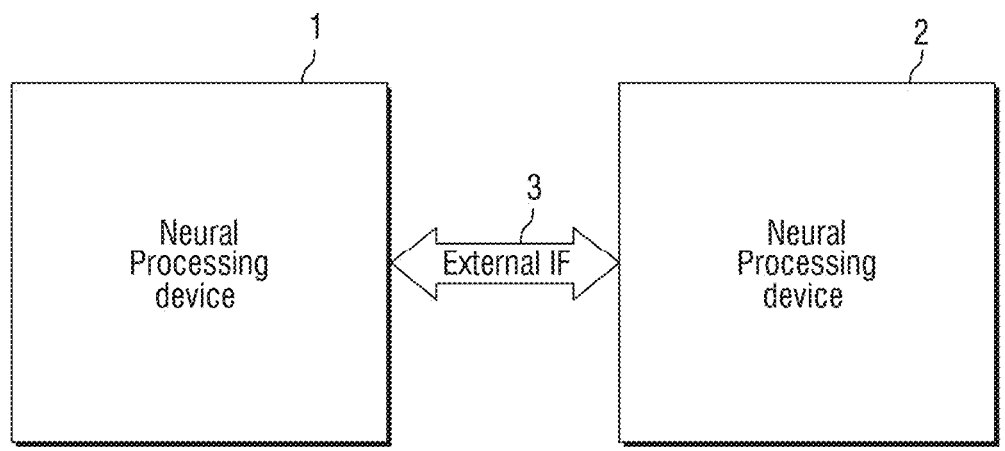
FIG. 1 is a block diagram for illustrating a neural processing system in accordance with some embodiments of the disclosure.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own embodiments in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are used only for the purpose of distinguishing one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular expressions include plural expressions unless the context explicitly indicates otherwise. In the application, terms such as "comprise," "have," "include", "contain," etc. should be understood as not precluding the possibility of existence or addition of features, numbers, steps, operations, components, parts, or combinations thereof described herein. Terms such as a "circuit" or "circuitry", refers to a circuit in hardware but may also refer to a circuit in software.

Unless otherwise defined, the phrases "A, B, or C," "at least one of A, B, or C," or "at least one of A, B, and C" may refer to only A, only B, only C, both A and B, both A and C, both B and C, all of A, B, and C, or any combination thereof.

Unless otherwise defined, all terms used herein, including technical or scientific terms, have the same meaning as commonly understood by those of ordinary skill in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the disclosure.

In addition, each configuration, procedure, process, method, or the like included in each embodiment of the disclosure may be shared to the extent that they are not technically contradictory to each other.

Hereinafter, a neural processing device in accordance with some embodiments of the disclosure will be described with reference to FIGS. 1 to 51.

FIG. 1 is a block diagram illustrating a neural processing system in accordance with some embodiments of the disclosure.

Referring to FIG. 1, a neural processing system NPS in accordance with some embodiments may include a first neural processing device 1, a second neural processing device 2, and an external interface 3.

The first neural processing device 1 may be a device that performs calculations using an artificial neural network. The first neural processing device 1 may be, for example, a device specialized in performing tasks of deep learning computations. However, the embodiment is not limited thereto.

The second neural processing device 2 may be a device having the same or similar configuration as the first neural processing device 1. The first neural processing device 1 and the second neural processing device 2 may be connected to each other via the external interface 3 and share data and control signals.

Although FIG. 1 shows two neural processing devices, the neural processing system NPS in accordance with some embodiments is not limited thereto. In some embodiments, in a neural processing system NPS, three or more neural processing devices may be connected to each other via the external interface 3. Also, conversely, a neural processing system NPS in accordance with some embodiments may include only one neural processing device.

In some embodiments, each of the first neural processing device 1 and the second neural processing device 2 may be a processing device other than the neural processing device. In some embodiments, each of the first neural processing device 1 and the second neural processing device 2 may be a graphics processing unit (GPU), a central processing unit (CPU), and other types of processing units as well. In the following, the first neural processing device 1 and the second neural processing device 2 will be described as neural processing devices for convenience.

Figure 2:
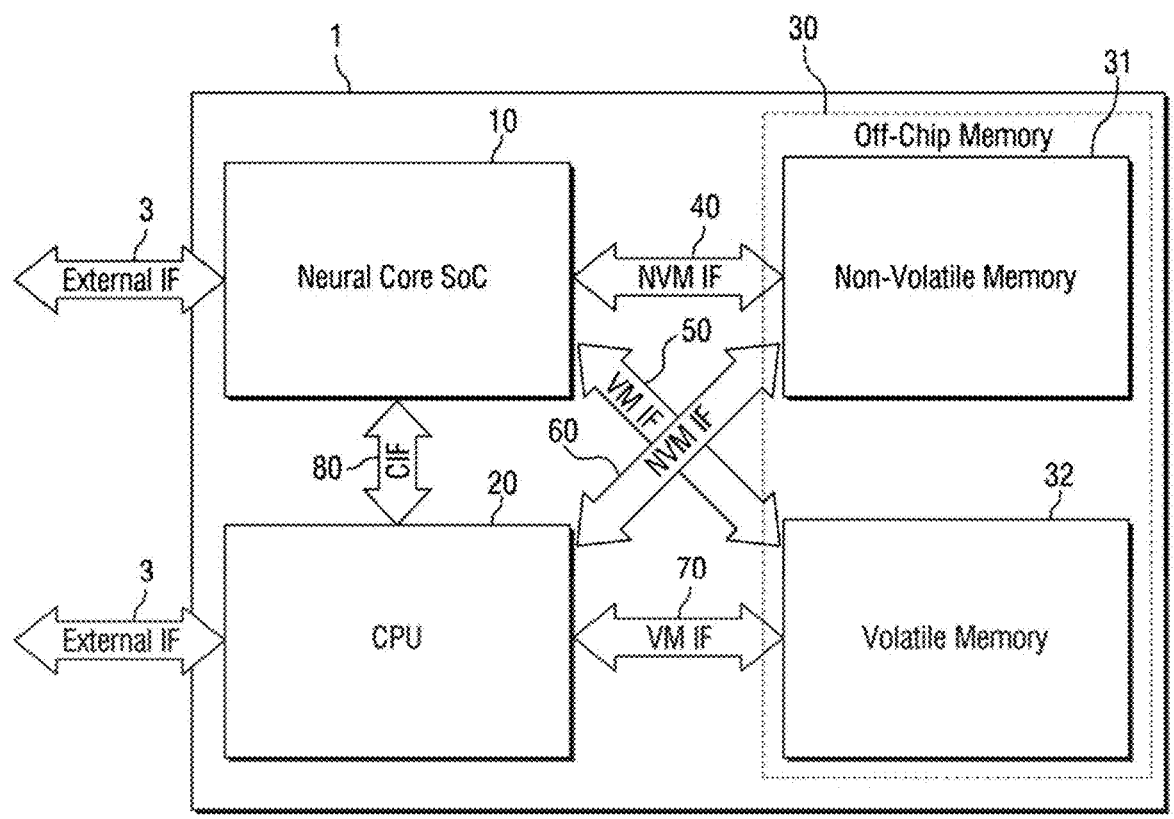
FIG. 2 is a block diagram for illustrating the neural processing device of FIG. 1 in detail.

FIG. 2 is a block diagram for illustrating the neural processing device of FIG. 1.

Referring to FIG. 2, a first neural processing device 1 may include a neural core SoC 10, a CPU 20, an off-chip memory 30, a first non-volatile memory interface 40, a first volatile memory interface 50, a second non-volatile memory interface 60, a second volatile memory interface 70 and a control interface (CIF) 80.

The neural core SoC 10 may be a system on a chip device. The neural core SoC 10 can be an artificial intelligence computation device and may be an accelerator. The neural core SoC 10 may be, for example, any one of a graphics processing unit (GPU), a field-programmable gate array (FPGA), or an application-specific integrated circuit (ASIC). However, the embodiment is not limited thereto.

The neural core SoC 10 may exchange data with other external computation devices via the external interface 3. Further, the neural core SoC 10 may be connected to the non-volatile memory 31 and the volatile memory 32 via the first non-volatile memory interface 40 and the first volatile memory interface 50, respectively.

The CPU 20 may be a control device that controls the system of the first neural processing device 1 and executes program computations. The CPU 20 is a general-purpose computation device and may have low efficiency in performing simple parallel computations that are frequently used in deep learning. Accordingly, there can be high efficiency by performing computations in deep learning inference and training tasks by the neural core SoC 10.

The CPU 20 may exchange data with other external computation units via the external interface 3. Further, the CPU 20 may be connected to the non-volatile memory 31 and the volatile memory 32 via the second non-volatile memory interface 60 and the second volatile memory interface 70, respectively.

The CPU 20 may also transfer tasks to the neural core SoC 10 via commands. In some embodiments, the CPU 20 may be a kind of host that gives instructions to the neural core SoC 10. In some embodiments, the neural core SoC 10 can efficiently perform parallel computation tasks such as deep learning tasks according to the instructions of the CPU 20.

The off-chip memory 30 may be a memory disposed outside the chip of the neural core SoC 10. The off-chip memory 30 may include a non-volatile memory 31 and a volatile memory 32.

The non-volatile memory 31 may be a memory that continuously retains stored information even if electric power is not supplied. The non-volatile memory 31 may include, for example, at least one of Read-Only Memory (ROM), Programmable Read-Only Memory (PROM), Erasable Alterable ROM (EAROM), Erasable Programmable Read-Only Memory (EPROM), Electrically Erasable Programmable Read-Only Memory (EEPROM) (e.g., NAND Flash memory, NOR Flash memory), Ultra-Violet Erasable Programmable Read-Only Memory (UVEPROM), Ferroelectric Random-Access Memory (FeRAM), Magnetoresistive Random-Access Memory (MRAM), Phase-change Random-Access Memory (PRAM), silicon-oxide-nitride-oxide-silicon (SONOS), Resistive Random-Access Memory (RRAM), Nanotube Random-Access Memory (NRAM), magnetic computer storage devices (e.g., hard disks, diskette drives, magnetic tapes), optical disc drives, or 3D XPoint memory. However, the embodiment is not limited thereto.

The volatile memory 32 may be a memory that continuously requires electric power to retain stored information, unlike the non-volatile memory 31. The volatile memory 32 may include, for example, at least one of Dynamic Random-Access Memory (DRAM), Static Random-Access Memory (SRAM), Synchronous Dynamic Random-Access Memory (SDRAM), or Double Data Rate SDRAM (DDR SDRAM). However, the embodiment is not limited thereto.

Each of the first non-volatile memory interface 40 and the second non-volatile memory interface 60 may include, for example, at least one of Parallel Advanced Technology Attachment (PATA), Small Computer System Interface (SCSI), Serial Attached SCSI (SAS), Serial Advanced Technology Attachment (SATA), or PCI Express (PCIe). However, the embodiment is not limited thereto.

Each of the first volatile memory interface 50 and the second volatile memory interface 70 may be, for example, at least one of SDR (Single Data Rate), DDR (Double Data Rate), QDR (Quad Data Rate), or XDR (eXtreme Data Rate, Octal Data Rate). However, the embodiment is not limited thereto.

The control interface 80 may be an interface for transferring control signals between the CPU 20 and the neural core SoC 10. The control interface 80 may transmit commands of the CPU 20 and transmit responses thereto of the neural core SoC 10. The control interface 80 may be, for example, PCIe (PCI Express), but is not limited thereto.

Figure 3:
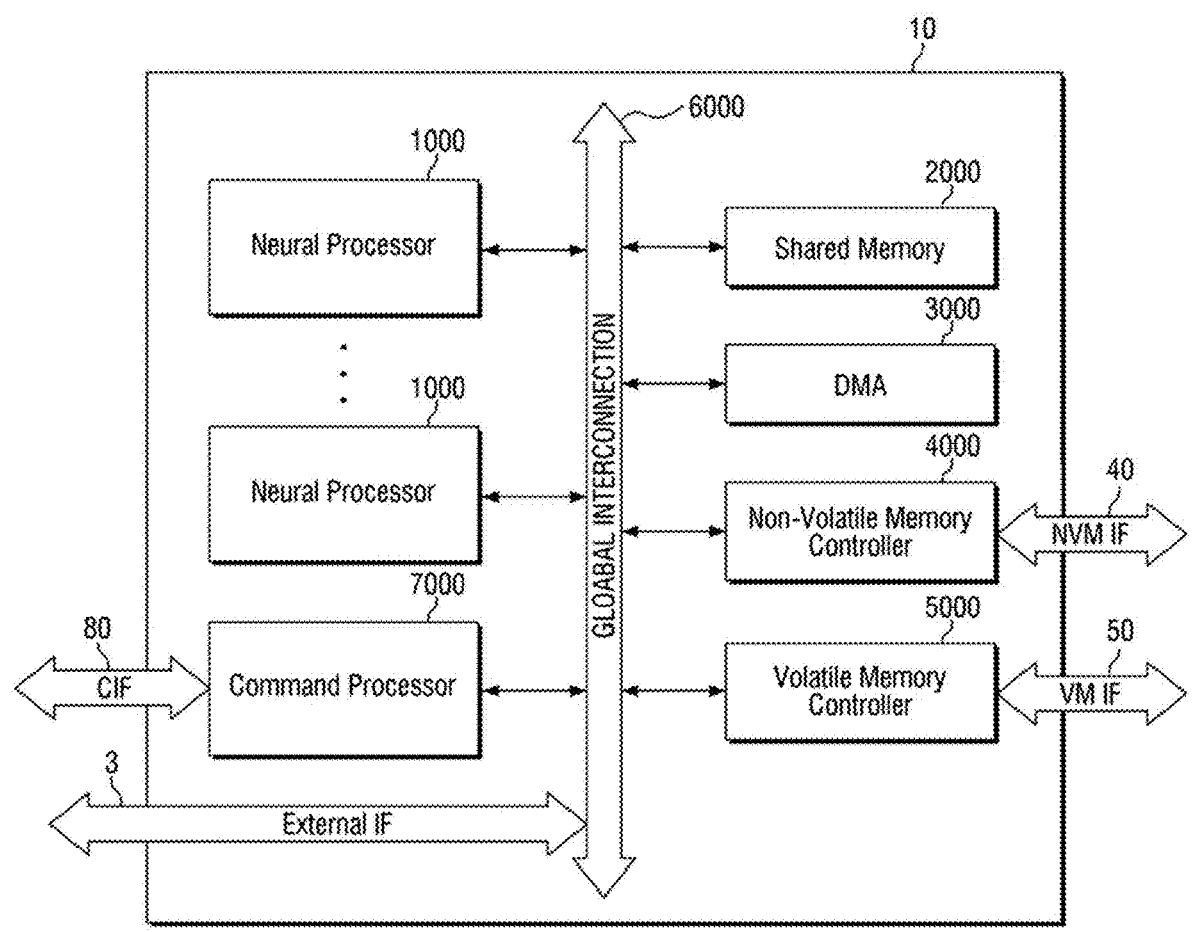
FIG. 3 is a block diagram for illustrating the neural core SoC of FIG. 2.

FIG. 3 is a block diagram for illustrating the neural core SoC of FIG. 2.

Referring to FIGS. 2 and 3, the neural core SoC 10 may include at least one neural processor 1000, a shared memory 2000, direct memory access (DMA) 3000, a non-volatile memory controller 4000, a volatile memory controller 5000, a command processor 7000, and a global interconnection 6000. In some embodiments, the command processor 7000 may be referred to as a command processor circuit, but for the sake of convenience, the terms are unified as a command processor. In addition, the command processor 7000 may be implemented as a circuit or circuitry.

The command processor 7000 may be implemented in software on the off-chip memory 30, in particular, on the volatile memory 32 of FIG. 2. However, the embodiment is not limited thereto and may also be implemented as separate hardware. Moreover, the command processor 7000 may also be implemented in software in part and in hardware in part. In some embodiments, the part implemented in hardware can increase the computation speed of the command processor 7000.

The neural processor 1000 may be a computation device that directly performs computation tasks. If there exist a plurality of neural processors 1000, computation tasks may be assigned to respective neural processors 1000. The respective neural processors 1000 may be connected to each other via the global interconnection 6000.

The shared memory 2000 may be a memory shared by multiple neural processors 1000. The shared memory 2000 may store data of neural processors 1000. In addition, the shared memory 2000 may receive data from the off-chip memory 30, store the data temporarily, and transfer the data to neural processors 1000. The shared memory 2000 may also receive data from the neural processor 1000, store the data temporarily, and transfer the data to the off-chip memory 30 of FIG. 2.

The shared memory 2000 may be required to be a relatively high-speed memory. Accordingly, the shared memory 2000 may include, for example, an SRAM. However, the embodiment is not limited thereto. In some embodiments, the shared memory 2000 may include a DRAM as well.

The shared memory 2000 may be a memory corresponding to the SoC level, i.e., level 2 (L2). Accordingly, the shared memory 2000 may also be defined as an L2 shared memory.

The DMA 3000 may directly control movements of data without needs for the neural processor 1000 or CPU 20 to control the input/output of data. Accordingly, the DMA 3000 may control data movements between memories, thereby minimizing a number of interrupts of the neural processor 1000 or CPU 20.

The DMA 3000 may control the data movements between the shared memory 2000 and the off-chip memory 30. Via the authority of the DMA 3000, the non-volatile memory controller 4000 and the volatile memory controller 5000 may perform movements of data.

The non-volatile memory controller 4000 may control tasks of reading from or writing onto the non-volatile memory 31. The non-volatile memory controller 4000 may control the non-volatile memory 31 via the first non-volatile memory interface 40. In some embodiments, the non-volatile memory controller 4000 may be referred to as a non-volatile memory controller circuit, but for the sake of convenience, the terms are unified as a non-volatile memory controller. In addition, the non-volatile memory controller 4000 may be implemented as a circuit or circuitry.

The non-volatile memory controller 4000 may control tasks of reading from or writing onto the non-volatile memory 31. The non-volatile memory controller 4000 may control the non-volatile memory 31 via the first non-volatile memory interface 40. In some embodiments, the non-volatile memory controller 4000 may be referred to as a non-volatile memory controller circuit, but for the sake of convenience, the terms are unified as a non-volatile memory controller. In addition, the non-volatile memory controller 4000 may be implemented as a circuit or circuitry.

The command processor 7000 may be connected to the control interface 80. The command processor 7000 may receive control signals from the CPU 20 via the control interface 80. The command processor 7000 may generate tasks via the control signals received from the CPU 20 and transmit the control signals to neural processors 1000. Further, the command processor 7000 may receive completion reports for the tasks from neural processors 1000.

The global interconnection 6000 may connect the at least one neural processor 1000, the shared memory 2000, the DMA 3000, the non-volatile memory controller 4000, the command processor 7000, and the volatile memory controller 5000 to one another. In addition, the external interface 3 may also be connected to the global interconnection 6000. The global interconnection 6000 may be a path through which data travel between the at least one neural processor 1000, the shared memory 2000, the DMA 3000, the non-volatile memory controller 4000, the volatile memory controller 5000, the command processor 7000, and the external interface 3.

The global interconnection 6000 may transmit not only data but also control signals and signals for synchronization. In the neural processing device in accordance with some embodiments of the disclosure, each neural processor 1000 may directly transmit and receive the synchronization signals. Accordingly, latencies due to transmissions of the synchronization signals generated by the command processor 7000 can be minimized.

In some embodiments, if there exist a plurality of neural processors 1000, there may be dependencies of individual tasks in which a task of one neural processor 1000 needs to be finished before the next neural processor 1000 can start a new task. The end and start of these individual tasks can be checked via the synchronization signals, and in the conventional techniques, the command processor 7000 or the host, i.e., the CPU 20, was exclusively responsible for both receiving these synchronization signals and instructing the start of a new task.

However, as the number of neural processors 1000 increases and task dependencies are designed more complicatedly, the number of requests and instructions for this synchronization task can increase exponentially. Therefore, the latency resulting from each request and instruction can greatly reduce the efficiency of tasks.

Therefore, in the neural processing device in accordance with some embodiments of the disclosure, each neural processor 1000, instead of the command processor 7000, may directly transmit some of the synchronization signals to other neural processors 1000 according to task dependencies. In some embodiments, several neural processors 1000 can perform the synchronization tasks in parallel as compared with the method managed by the command processor 7000, thereby minimizing the latency due to synchronization.

In addition, the command processor 7000 needs to perform the task scheduling of the neural processors 1000 according to a task dependency, and the overhead of such scheduling may increase significantly as the number of neural processors 1000 increases. Therefore, in the neural processing device in accordance with some embodiments of the disclosure, scheduling tasks are also performed in part by individual neural processors 1000, and hence scheduling burden resulting therefrom can be reduced, thereby improving the performance of the device.

Furthermore, the neural processing device in accordance with some embodiments of the disclosure can carry out monitoring whether a task is completed, an event occurs, a task is delayed, or the like in the neural cores of each neural processor 1000, and can minimize intervention of the command processor 7000 and reduce load on the command processor 7000, thereby improving the performance of the device.

Moreover, the neural processing device in accordance with some embodiments of the disclosure can selectively generate completion reports by setting whether to monitor tasks for each task. And the neural processing device in accordance with some embodiments of the disclosure can be configured to modify whether to generate a completion report if a report to the command processor 7000 is required. Accordingly, it may be possible to report tasks that require an alert without carrying out monitoring all tasks, and stable monitoring of tasks may be possible while reducing the load on the command processor 7000.

Figure 4:
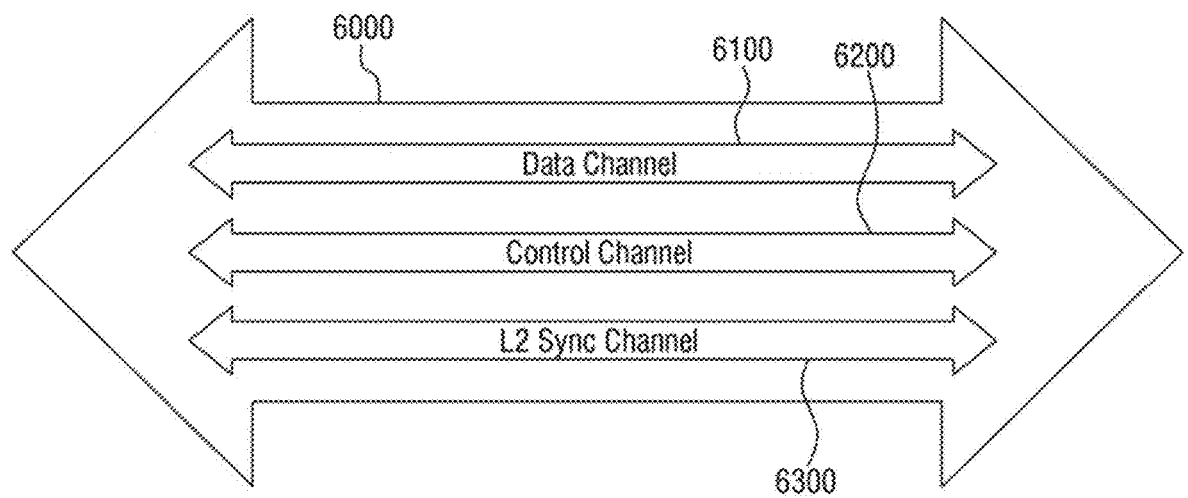
FIG. 4 is a structural diagram for illustrating the global interconnection of FIG. 3.

FIG. 4 is a structural diagram for illustrating the global interconnection of FIG. 3.

Referring to FIG. 4, the global interconnection 6000 may include a data channel 6100, a control channel 6200, and an L2 sync channel 6300.

The data channel 6100 may be a dedicated channel for transmitting data. Through the data channel 6100, the at least one neural processor 1000, the shared memory 2000, the DMA 3000, the non-volatile memory controller 4000, the volatile memory controller 5000, and the external interface 3 may exchange data with one another.

The control channel 6200 may be a dedicated channel for transmitting control signals. Through the control channel 6200, the at least one neural processor 1000, the shared memory 2000, the DMA 3000, the non-volatile memory controller 4000, the volatile memory controller 5000, the command processor 7000, and the external interface 3 may exchange control signals with one another. In particular, the command processor 7000 may transmit various control signals to neural processors 1000.

The L2 sync channel 6300 may be a dedicated channel for transmitting synchronization signals. Through the L2 sync channel 6300, the at least one neural processor 1000, the shared memory 2000, the DMA 3000, the non-volatile memory controller 4000, the volatile memory controller 5000, the command processor 7000, and the external interface 3 may exchange synchronization signals with one another.

The L2 sync channel 6300 may be set as a dedicated channel inside the global interconnection 6000, and thus, may not overlap with other channels and transmit synchronization signals quickly. Accordingly, the neural processing device in accordance with some embodiments does not require new wiring work and may smoothly perform the synchronization task by using the global interconnection 6000.

Figure 5:
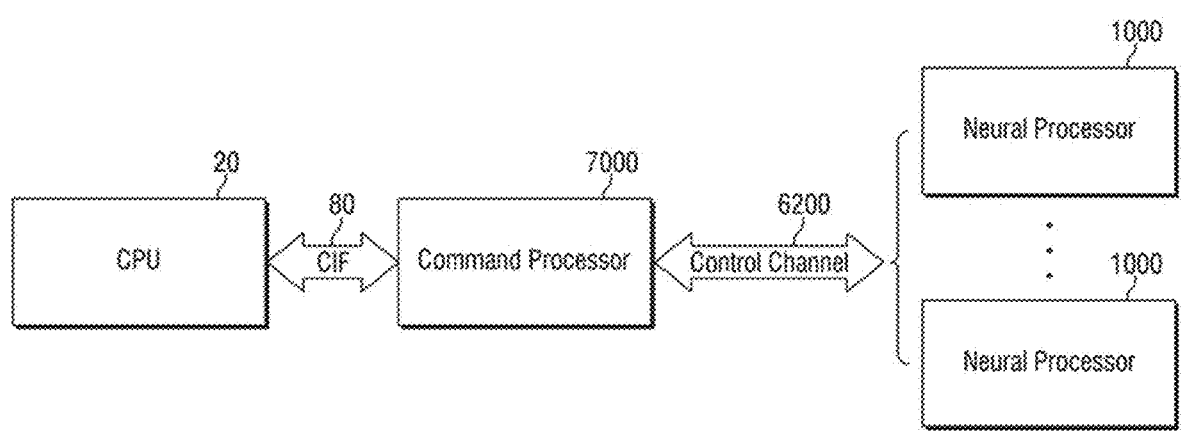
FIG. 5 is a block diagram for illustrating a flow of control signals of the neural processing device of FIG. 1.

FIG. 5 is a block diagram for illustrating a flow of control signals of the neural processing device of FIG. 1.

Referring to FIG. 5, the CPU 20 may transfer control signals to the command processor 7000 via the control interface 80. In some embodiments, a control signal may be a signal instructing execution of each operation, such as a computation task or a data load/store task.

The command processor 7000 may receive the control signals and transfer the control signals to at least one neural processor 1000 via the control channel 6200. Each control signal may be stored in the neural processor 1000 as each task.

Figure 6:
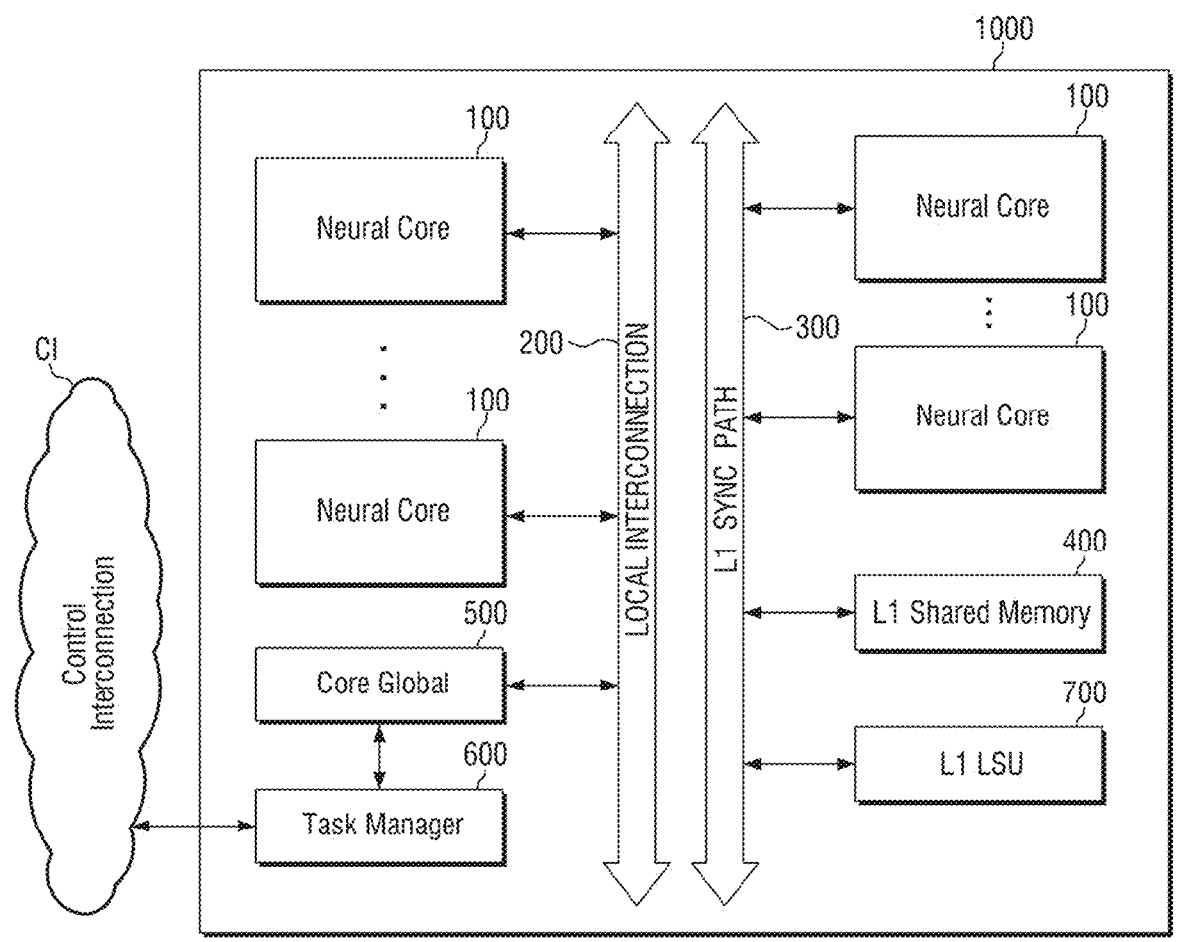
FIG. 6 is a block diagram for schematically illustrating the neural processor of FIG. 3.

FIG. 6 is a block diagram for schematically illustrating the neural processor of FIG. 3.

Referring to FIGS. 3 to 6, the neural processor 1000 may include at least one neural core 100, an L1 shared memory 400, an L1 LSU 700, a task manager 600, a core global 500, a local interconnection 200, and an L1 sync path 300. The L1 LSU 700, the task manager 600, and the core global 500 may be referred to respectively as an L1 LSU circuit, a task manager circuit, and a core global circuit, but for the sake of convenience, the terms are respectively unified as an L1 LSU, a task manager, and a core global. Further, each of the L1 LSU 700, the task manager 600, and the core global 500 may be implemented as a circuit or circuitry.

The at least one neural core 100 may share and perform the tasks of the neural processor 1000. The number of neural cores 100 may be, for example, eight. However, the embodiment is not limited thereto. FIGS. 3 and 6 illustrate that a plurality of neural cores are included in the neural processor 1000, but the embodiment is not limited thereto. In some embodiments, the neural processor 1000 may be configured with only one neural core.

The neural cores 100 may receive task information from the core global 500 and perform tasks according to the task information. In some embodiments, a task may be defined by a control signal, and the task may be any one of memory operations. A memory operation may be, for example, any one of micro-DMA (DMA), LP micro-DMA (Low Priority DMA), store DMA (ST DMA), or a pre-processing task.

The L1 shared memory 400 may be a memory shared by the neural cores 100 in the neural processor 1000. The L1 shared memory 400 may store data of each neural core 100. In addition, the L1 shared memory 400 may receive data from the shared memory 2000 of FIG. 3, store them temporarily, and transfer them to each neural core 100. On the contrary, the L1 shared memory 400 may also receive data from the neural core 100, store them temporarily, and transfer them to the shared memory 2000 of FIG. 3.

The L1 shared memory 400 may be a memory corresponding to the neural processor level, i.e., level 1 (L1). The L2 shared memory, i.e., the shared memory 2000 may be shared by the neural processors 1000, and the L1 shared memory 400 may be shared by the neural cores 100.

The L1 LSU 700 may receive at least one of data, a control signal, or a synchronization signal from the outside via the global interconnection 6000. The L1 LSU 700 may transmit at least one of the received data, control signal, or synchronization signal to the L1 shared memory 400. Similarly, the L1 LSU 700 may transfer at least one of the data, the control signal, or the synchronization signal to the outside via the global interconnection 6000. Further, the L1

LSU 700 may transfer and receive at least one of the data, the control signal, or the synchronization signal to and from each of the neural cores 100.

The neural core 100 may receive task information from the core global 500 and perform tasks according to the task information. In some embodiments, a task may be a computation task (calculation task) or a task related to memory operations. A task may be defined by a control signal. The task information is information about a task, and may be information about the type of a task, a form of a task, additional information about a task, and the like.

The neural cores 100 may transfer a completion signal indicating completion of execution of a task to the core global 500.

The task manager 600 may receive tasks from a control interconnection CI. In some embodiments, the control interconnection CI may be a generic term for transport interfaces that transfer tasks from the command processor 7000. In some embodiments, the control interconnection CI may include the control channel 6200 and the local interconnection 200.

The task manager 600 may receive tasks, generate task information, and transmit the task information to the core global 500. In some embodiments, the task information may include information about data paths. Further, the task manager 600 may receive completion signals via the core global 500, generate completion reports accordingly, and transmit the completion reports to the command processor 7000 via the control interconnection CI.

The core global 500 may be a wire structure connected in hardware within the neural core 100. Although not shown, the core global 500 may be a structure connecting all of the neural core 100, the L1 shared memory 400, the L1 LSU 700, and the task manager 600. Therefore, the local interconnection 200 and the L1 sync path 300 may also be included in the core global 500. However, the embodiment is not limited thereto.

The core global 500 may receive task information from the task manager 600 and transfer the task information to the neural cores 100, and may receive completion signals related thereto from the neural cores 100. Subsequently, the core global 500 may transfer the completion signals to the task manager 600.

The local interconnection 200 may connect the at least one neural core 100, the L1 shared memory 400, the L1 LSU 700, the core global 500, and the task manager 600 to one another. The local interconnection 200 may be a path along which data move between the at least one neural core 100, the L1 shared memory 400, the L1 LSU 700, the core global 500, and the task manager 600. The local interconnection 200 may be connected and transmit data to the global interconnection 6000 of FIG. 3.

The L1 sync path 300 may connect the at least one neural core 100, the L1 shared memory 400, the L1 LSU 700, the core global 500, and the task manager 600 to one another. The L1 sync path 300 may be a path along which synchronization signals of the at least one neural core 100, the L1 shared memory 400, the L1 LSU 700, the core global 500, and the task manager 600 travel.

The L1 sync path 300 may be formed physically separately from the local interconnection 200. In the case of the local interconnection 200, sufficient channels may not be formed therein, unlike the global interconnection 6000. In such a case, the L1 sync path 300 may be formed separately so that the synchronization signal can be transmitted quickly and without any delay. The L1 sync path 300 may be used for synchronization performed at a level one step lower than that of the L2 sync channel 6300 of the global interconnection 6000.

Figure 7:
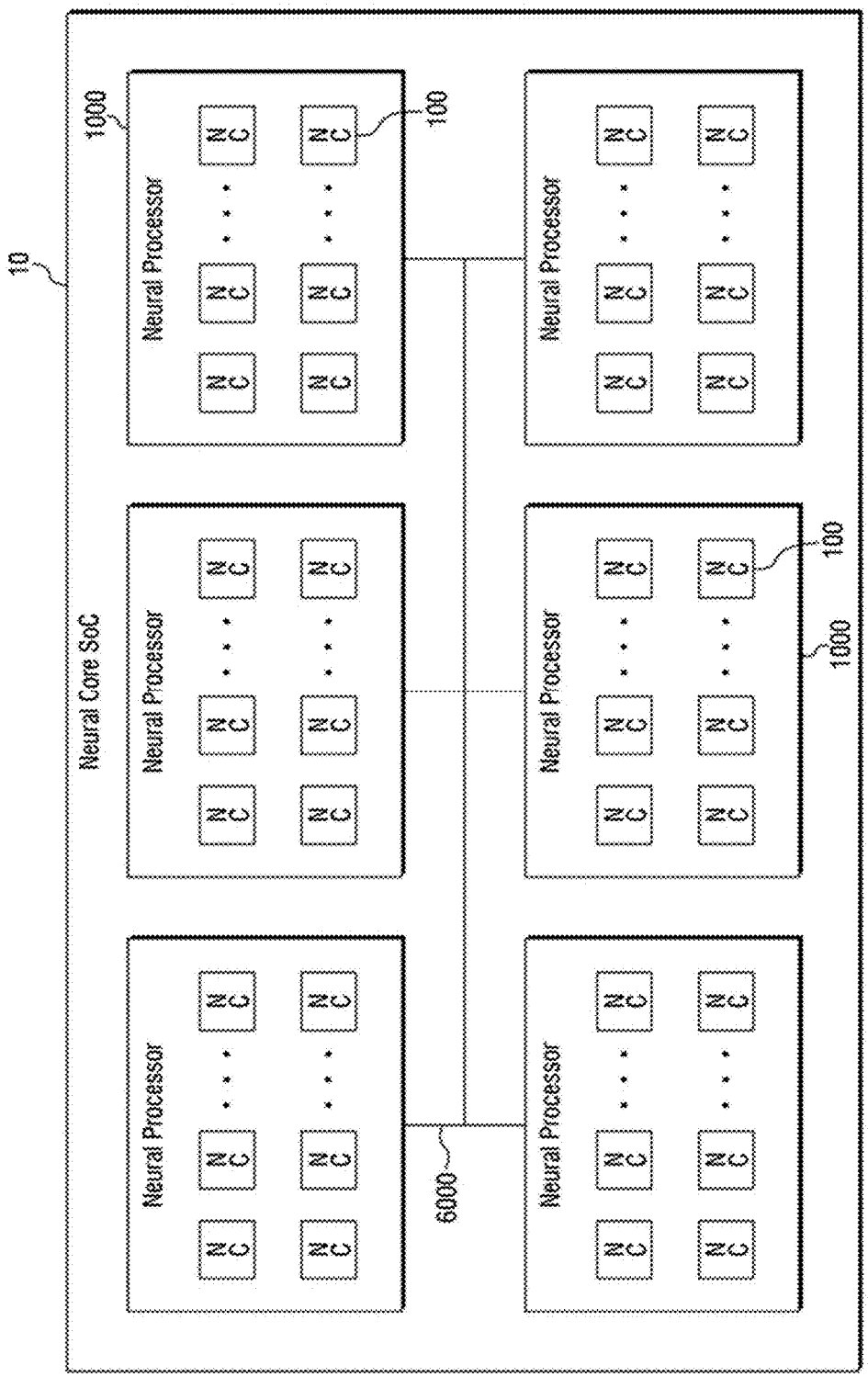
FIG. 7 is a diagram for illustrating a hierarchical structure of a neural processing device in accordance with some embodiments of the disclosure.

FIG. 7 is a diagram for illustrating a hierarchical structure of a neural processing device in accordance with some embodiments of the disclosure.

Referring to FIG. 7, the neural core SoC 10 may include at least one neural processor 1000. The neural processors 1000 may transmit data to each other via the global interconnection 6000.

Each of neural processors 1000 may include at least one neural core 100. The neural core 100 may be a unit of processing optimized for deep learning computation tasks. The neural core 100 may be a unit of processing corresponding to one operation of deep learning computation tasks. In some embodiments, a deep learning computation task can be represented by a sequential or parallel combination of multiple operations. Each of neural cores 100 may be a unit of processing capable of processing one operation, and may be a minimum computation unit that can be considered for scheduling from the viewpoint of a compiler.

The neural processing device in accordance with the embodiment may configure scales of the minimum computation unit considered from the viewpoint of compiler scheduling and the hardware unit of processing to be the same, so that fast and efficient scheduling and computation tasks can be performed.

In some embodiments, if a unit of processing into which hardware can be divided is too large compared to computation tasks, inefficiency of the computation tasks may occur in driving the unit of processing. Conversely, it is not appropriate to schedule a unit of processing that is a unit smaller than an operation, which is the minimum scheduling unit of the compiler, every time since a scheduling inefficiency may occur and hardware design costs may increase.

Therefore, by adjusting the scales of the scheduling unit of the compiler and the hardware unit of processing to be similar in the embodiment, it is possible to simultaneously satisfy the fast scheduling of computation tasks and the efficient execution of the computation tasks without wasting hardware resources.

Figure 8:
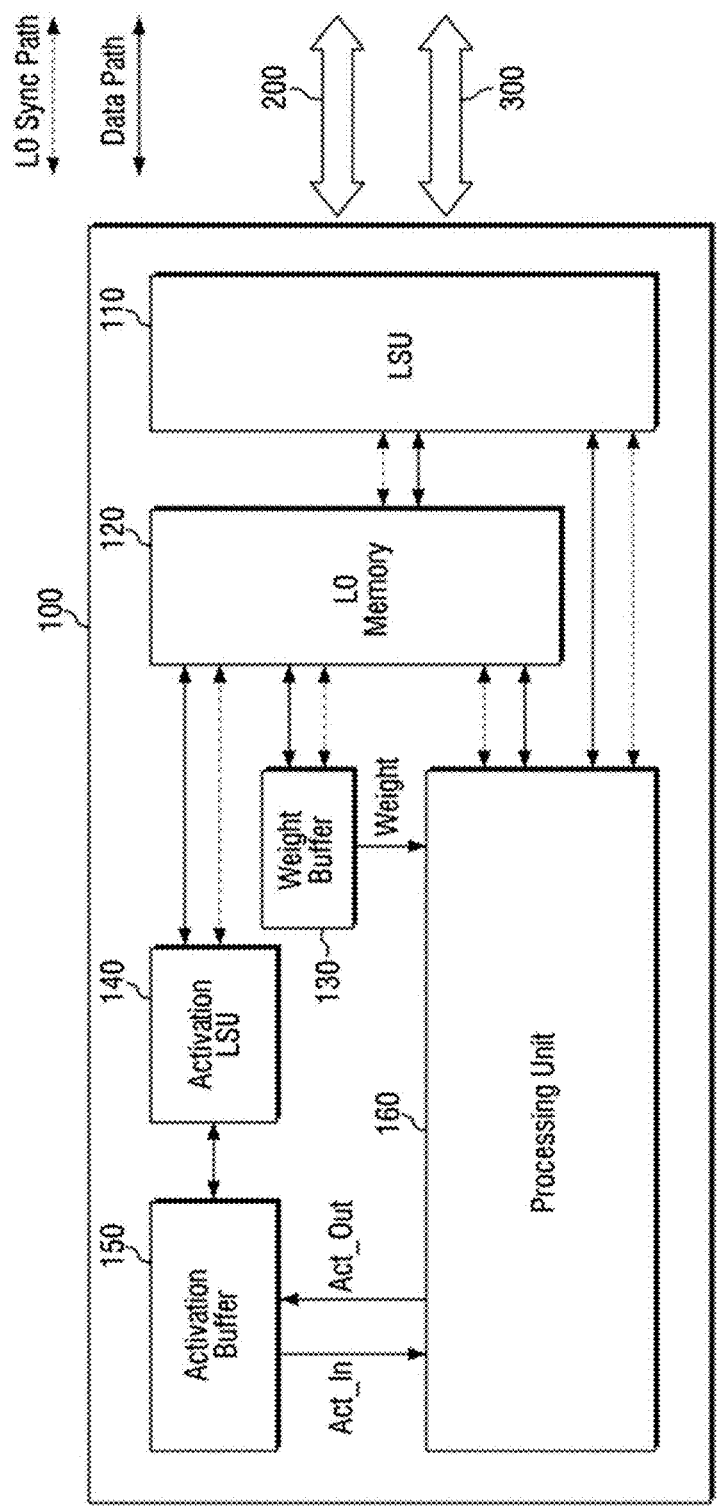
FIG. 8 is a block diagram for illustrating the neural core of FIG. 6 in detail.

FIG. 8 is a block diagram for illustrating the neural core of FIG. 6 in detail.

Referring to FIG. 8, the neural core 100 may include a load/store unit (LSU) 110, an L0 memory 120, a weight buffer 130, an activation LSU 140, an activation buffer 150, and a processing unit 160. In some embodiments, the LSU 110 and the activation LSU 140 may be referred to respectively as an LSU circuit and an activation LSU circuit, but for the sake of convenience, the terms are respectively unified as an LSU and an activation LSU. In addition, each of the LSU 110 and the activation LSU 140 may be implemented as a circuit circuitry.

The LSU 110 may receive at least one of data, a control signal, or a synchronization signal from the outside via the local interconnection 200 and the L1 sync path 300. The LSU 110 may transmit at least one of the data, the control signal, or the synchronization signal received to the L0 memory 120. Similarly, the LSU 110 may transfer at least one of the data, the control signal, or the synchronization signal to the outside via the local interconnection 200 and the L1 sync path 300. In some embodiments, the LSU 110 may be referred to as an LSU circuit, but for the sake of convenience, the terms are unified as an LSU. In addition, the LSU 110 may be implemented as a circuit or circuitry.

Specifically, a micro-DMA task may be a task in which the neural core 100 loads a program or data from the shared memory 2000 or the off-chip memory 30 to the L0 memory 120. An LP micro-DMA task may be a load task for a program or data to be used later rather than a current program or data, unlike a general micro-DMA task. As such a task has a lower priority, it can be identified differently from the micro-DMA task. An ST micro-DMA task may be a store task that stores data from the L0 memory 120 of the neural core 100 to the shared memory 2000 or the off-chip memory 30. The preprocessing task may include a task that pre-loads data such as a large number of lookup tables in the CPU 20.

Figure 9:
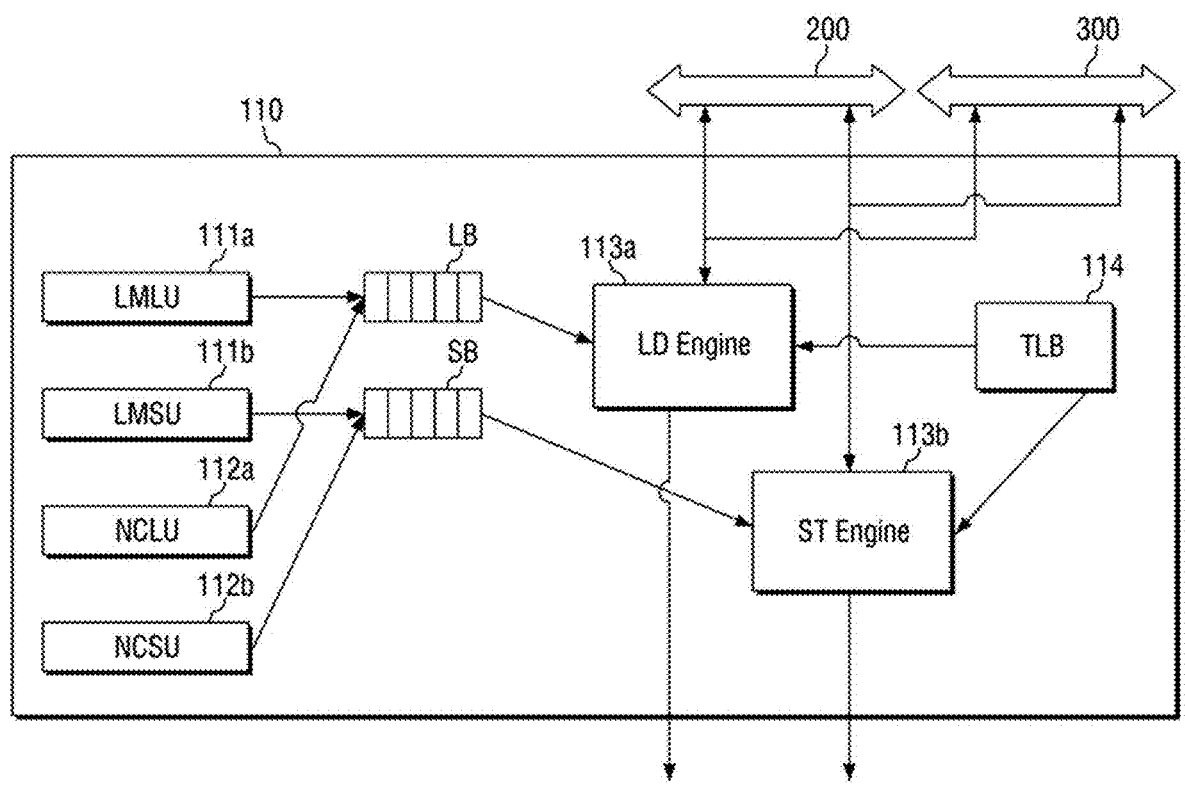
FIG. 9 is a block diagram for illustrating the LSU of FIG. 8 in detail.

FIG. 9 is a block diagram for illustrating the LSU of FIG. 8 in detail.

Referring to FIG. 9, the LSU 110 may include a local memory load unit (LMLU) 111a, a local memory store unit (LMSU) 111b, a neural core load unit (NCLU) 112a, a neural core store unit (NCSU) 112b, a load buffer LB, a store buffer SB, a load (LD) engine 113a, a store (ST) engine 113b, and a translation lookaside buffer (TLB) 114.

The local memory load unit 111a, the local memory store unit 111b, the neural core load unit 112a, the neural core store unit 112b, the load engine 113a, and the store engine 113b may be referred to respectively as a local memory load circuit, a local memory store circuit, a neural core load circuit, a neural core store circuit, a load engine circuit, and a store engine circuit. However, for the sake of convenience, the terms are respectively unified as a local memory load unit, a local memory store unit, a neural core load unit, a neural core store unit, a load engine, and a store engine. In addition, the local memory load unit 111a, the local memory store unit 111b, the neural core load unit 112a, the neural core store unit 112b, the load engine 113a, and the store engine 113b may each be implemented as a circuit or circuitry.

The local memory load unit 111a may fetch a load instruction for the L0 memory 120 and issue the load instruction. When the local memory load unit 111a provides the issued load instruction to the load buffer LB, the load buffer LB may sequentially transmit memory access requests to the load engine 113a according to the inputted order.

Further, the local memory store unit 111b may fetch a store instruction for the L0 memory 120 and issue the store instruction. When the local memory store unit 111b provides the issued store instruction to the store buffer SB, the store buffer SB may sequentially transmit memory access requests to the store engine 113b according to the inputted order.

The neural core load unit 112a may fetch a load instruction for the neural core 100 and issue the load instruction. When the neural core load unit 112a provides the issued load instruction to the load buffer LB, the load buffer LB may sequentially transmit memory access requests to the load engine 113a according to the inputted order.

In addition, the neural core store unit 112b may fetch a store instruction for the neural core 100 and issue the store instruction. When the neural core store unit 112b provides the issued store instruction to the store buffer SB, the store buffer SB may sequentially transmit memory access requests to the store engine 113b according to the inputted order.

The load engine 113a may receive the memory access request and retrieve data via the local interconnection 200. In some embodiments, the load engine 113a may quickly find the data by using a translation table of a logical address and a physical address that has been used recently in the translation lookaside buffer 114. If the logical address of the load engine 113a is not in the translation lookaside buffer 114, the address translation information may be found in another memory.

The store engine 113b may receive the memory access request and retrieve data via the local interconnection 200. In some embodiments, the store engine 113b may quickly find the data by using a translation table of a logical address and a physical address that has been used recently in the translation lookaside buffer 114. If the logical address of the store engine 113b is not in the translation lookaside buffer 114, the address translation information may be found in another memory.

The load engine 113a and the store engine 113b may send synchronization signals to the L1 sync path 300. In some embodiments, the synchronization signal may indicate that the task has been completed.

Referring to FIG. 8 again, the L0 memory 120 is a memory located inside the neural core 100, and may receive all input data required for the tasks by the neural core 100 from the outside and store them temporarily. In addition, the L0 memory 120 may temporarily store the output data calculated by the neural core 100 for transmission to the outside.

The L0 memory 120 may transmit an input activation Act_In to the activation buffer 150 and receive an output activation Act_Out via the activation LSU 140. The L0 memory 120 may directly transmit and receive data to and from the processing unit 160, in addition to the activation LSU 140. In some embodiments, the L0 memory 120 may exchange data with each of a processing element (PE) array 163 and a vector unit 164. The L0 memory 120 may be a memory corresponding to the level of the neural core. In some embodiments, the L0 memory 120 may be a private memory of the neural core.

The L0 memory 120 may transmit data such as activations or weights via a data path. The L0 memory 120 may exchange synchronization signals via an L0 sync path, which is a separate dedicated path. The L0 memory 120 may exchange synchronization signals with, for example, the LSU 110, the weight buffer 130, the activation LSU 140, and the processing unit 160 via the L0 sync path.

The weight buffer 130 may receive a weight from the L0 memory 120. The weight buffer 130 may transfer the weight to the processing unit 160. The weight buffer 130 may temporarily store the weight before transferring it.

The input activation Act_In and the output activation Act_Out may refer to input values and output values of the layers of a neural network. In some embodiments, if there are a plurality of layers in the neural network, the output value of the previous layer becomes the input value of the next layer, and thus, the output activation Act_Out of the previous layer may be utilized as the input activation Act_In of the next layer.

The weight may refer to a parameter that is multiplied by the input activation Act_In inputted in each layer. The weight is adjusted and confirmed in the deep learning training phase, and may be used to derive the output activation Act_Out via a fixed value in the inference phase.

The activation LSU 140 may transfer the input activation Act_In from the L0 memory 120 to the activation buffer 150, and the output activation Act_Out from the activation buffer 150 to the on-chip buffer. In some embodiments, the activation LSU 140 may perform both a load task and a store task of the activation.

The activation buffer 150 may provide the input activation Act_In to the processing unit 160 and receive the output activation Act_Out from the processing unit 160. The activation buffer 150 may temporarily store the input activation Act_In and the output activation Act_Out.

The activation buffer 150 may quickly provide the activation to the processing unit 160, in particular, the PE array 163, which has a large quantity of calculations, and may quickly receive the activation, thereby increasing the calculation speed of the neural core 100.

The processing unit 160 may be a module that performs calculations. The processing unit 160 may perform not only one-dimensional calculations but also two-dimensional matrix calculations, i.e., convolution operations. The processing unit 160 may receive an input activation Act_In, multiply it by a weight, and then add it to generate an output activation Act_Out.

Figure 10:
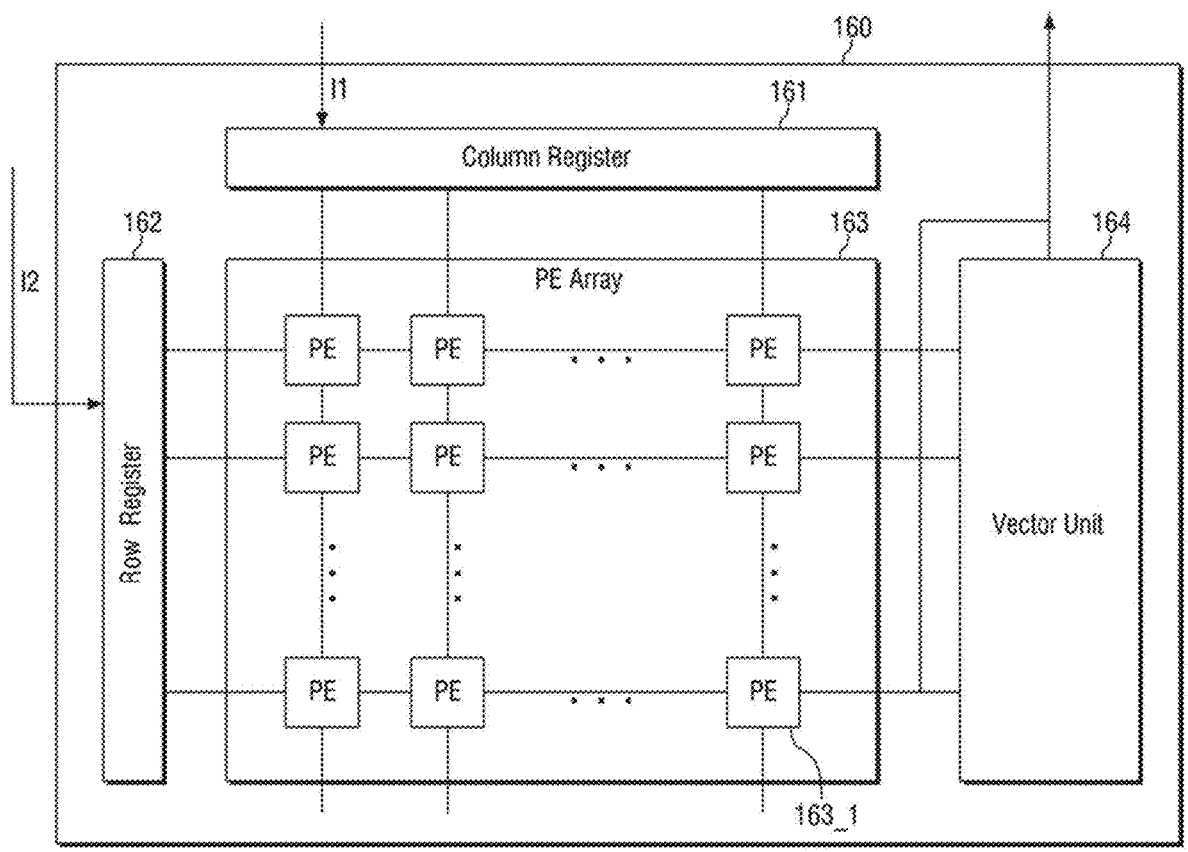
FIG. 10 is a block diagram for illustrating the processing unit of FIG. 8 in detail.

FIG. 10 is a block diagram for illustrating the processing unit of FIG. 8 in detail.

Referring to FIG. 8 and FIG. 10, the processing unit 160 may include a PE array 163, a vector unit 164, a column register 161, and a row register 162.

The PE array 163 may receive the input activation Act_In and the weight and perform multiplication on them. In some embodiments, each of the input activation Act_In and the weight may be in the form of matrices and calculated via convolution. Through this, the PE array 163 may generate an output activation Act_Out. However, the embodiment is not limited thereto. The PE array 163 may generate any types of outputs other than the output activation Act_Out as well.

The PE array 163 may include at least one processing element (PE) 163_1. The processing elements 163_1 may be aligned with each other so that each of the processing elements 163_1 may perform multiplication on one input activation Act_In and one weight.

The PE array 163 may sum values for each multiplication to generate a subtotal. This subtotal may be utilized as an output activation Act_Out. The PE array 163 performs two-dimensional matrix multiplication, and thus, may be referred to as a 2D matrix compute unit.

The vector unit 164 may mainly perform one-dimensional calculations. The vector unit 164, together with the PE array 163, may perform deep learning calculations. Through this, the processing unit 160 may be specialized for necessary calculations. In some embodiments, each of the at least one neural core 100 has calculation modules that perform a large amount of two-dimensional matrix multiplications and one-dimensional calculations, and thus, can efficiently perform deep learning tasks.

The column register 161 may receive a first input I1. The column register 161 may receive the first input I1, and distribute them to each column of the processing elements 163_1.

The row register 162 may receive a second input I2. The row register 162 may receive the second input I2, and distribute them to each row of the processing elements 163_1.

The first input I1 may be an input activation Act_In or a weight. The second input I2 may be a value other than the first input I1 between the input activation Act_In or the weight. Alternatively, the first input I1 and the second input I2 may be values other than the input activation Act_In and the weight.

Figure 11:
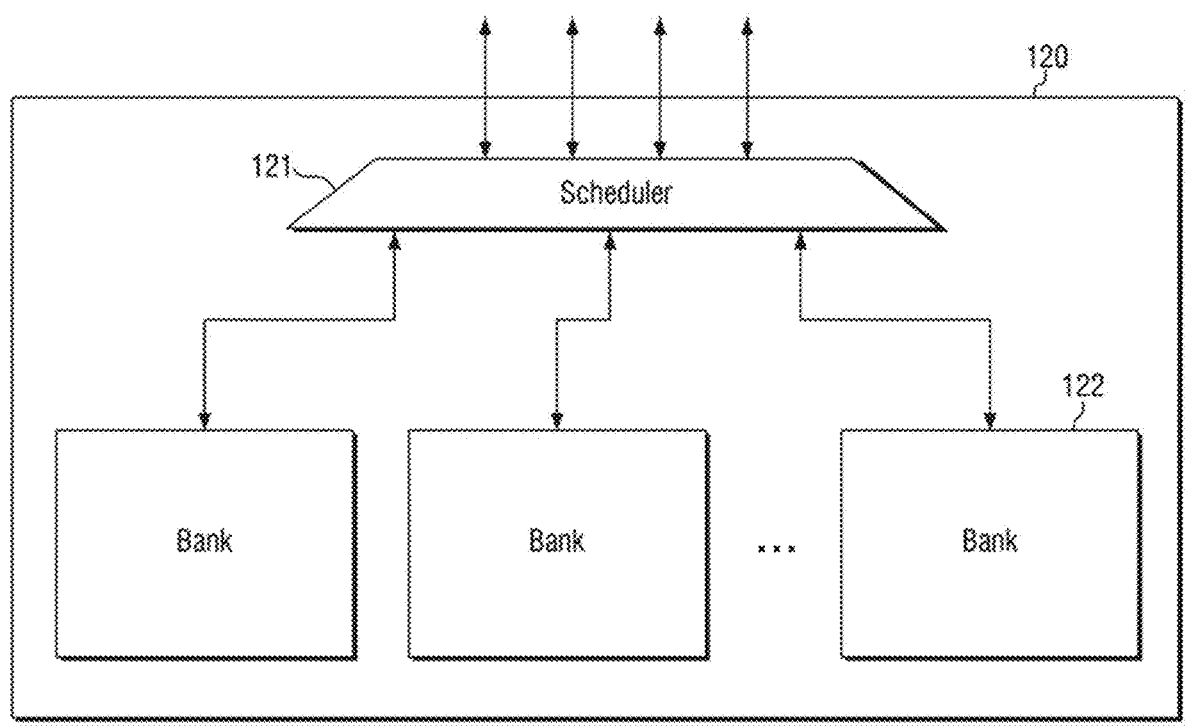
FIG. 11 is a block diagram for illustrating the L0 memory of FIG. 8 in detail.

FIG. 11 is a block diagram for illustrating the processing element of FIG. 8 in detail.

Referring to FIG. 11, the L0 memory 120 may include a scheduler 121 and one or more local memory banks 122.

When data are stored in the L0 memory 120, the scheduler 121 may receive data from the load engine 113a. In some embodiments, the local memory bank 122 may be allocated for the data in a round-robin manner. Accordingly, data may be stored in any one of the local memory banks 122.

In contrast to this, when data are loaded from the L0 memory 120, the scheduler 121 may receive the data from the local memory bank 122 and transmit the data to the store engine 113b. The store engine 113b may store the data in the outside through the local interconnection 500. In some embodiments, the scheduler 121 may be referred to as a scheduler circuit, but for the sake of convenience, the terms are unified as a scheduler. In addition, the scheduler 121 may be implemented as a circuit or circuitry.

Figure 12:
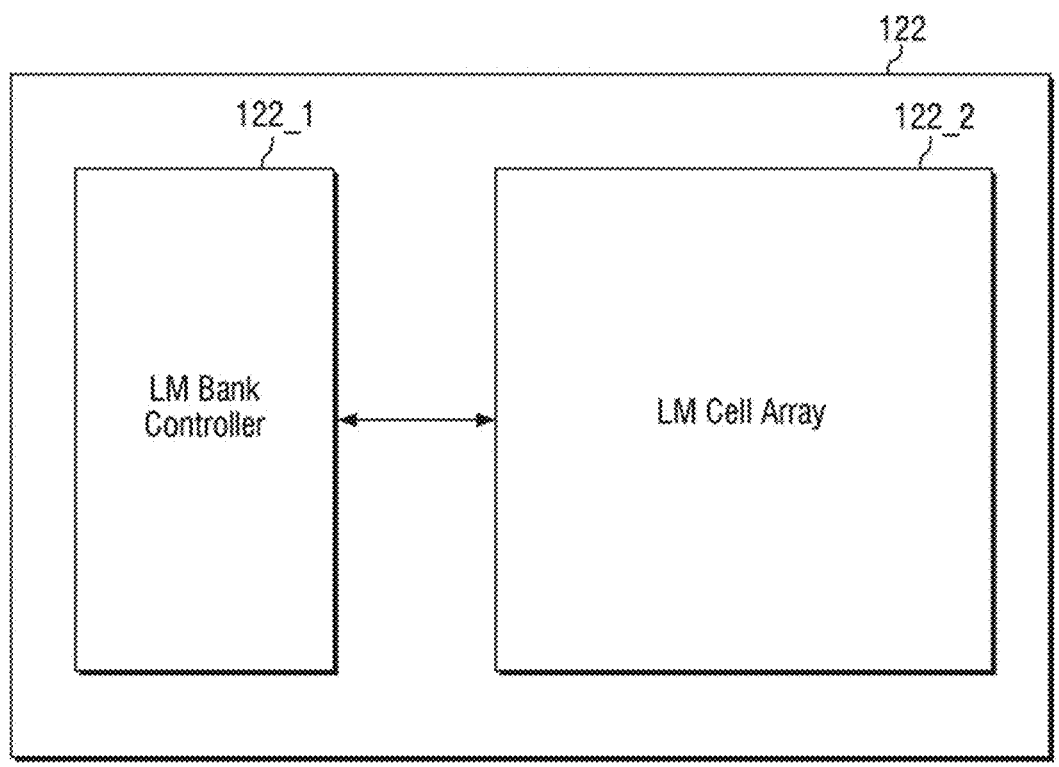
FIG. 12 is a block diagram for illustrating the local memory bank of FIG. 11 in detail.

FIG. 12 is a block diagram for illustrating the local memory bank of FIG. 11 in detail.

Referring to FIG. 12, the local memory bank 122 may include a local memory bank controller 122_1 and a local memory bank cell array 122_2.

The local memory bank controller 122_1 may manage read and write operations via the addresses of data stored in the local memory bank 122. In some embodiments, the local memory bank controller 122_1 may manage the input/output of data as a whole.

The local memory bank cell array 1222 may be of a structure in which cells in which data are directly stored are arranged in rows and columns. The local memory bank cell array 122_2 may be controlled by the local memory bank controller 122_1.

Figure 13:
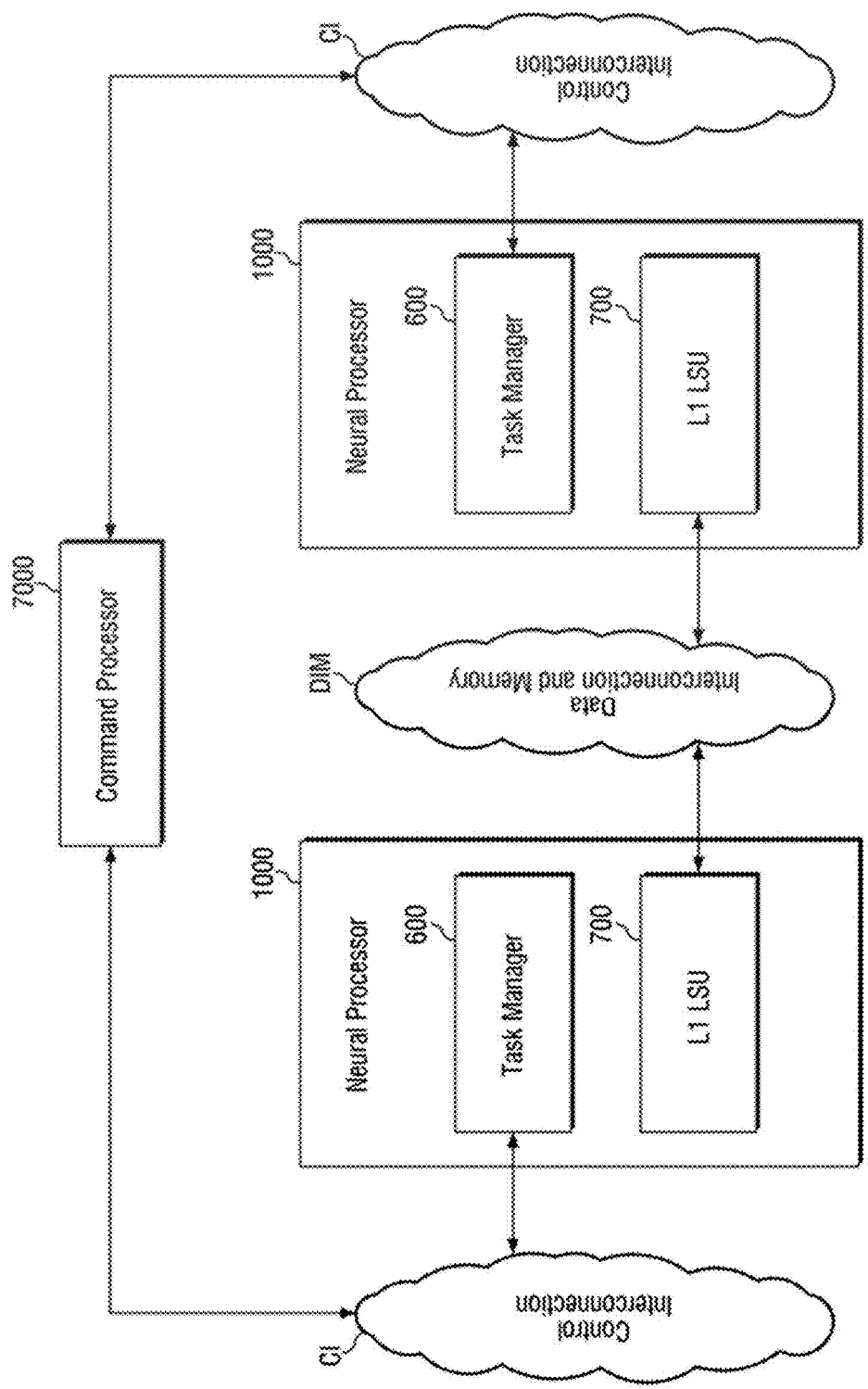
FIG. 13 is a block diagram for illustrating a flow of data and control signals of the neural processing device of FIG. 1.
Figure 14:
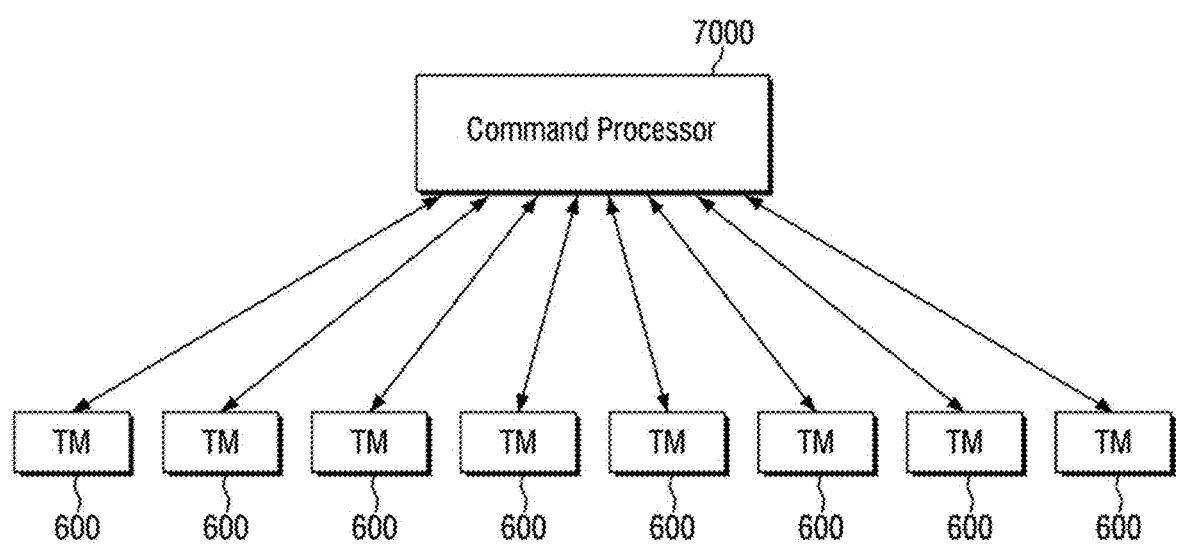
FIG. 14 is a block diagram for illustrating relationship between the command processor and the task managers of FIG. 13.

FIG. 13 is a block diagram for illustrating a flow of data and control signals of the neural processing device of FIG. 1, and FIG. 14 is a block diagram for illustrating relationship between the command processor and the task managers of FIG. 13.

Referring to FIGS. 13 and 14, the neural processor 1000 may include at least one neural core 100. Each neural processor 1000 may include a task manager 600 and an L1 LSU 700 therein, respectively. The task managers 600 may exchange control signals and responses to the control signals with a command processor 7000 via a control interconnection CI.

In contrast, the L1 LSU 700 may exchange data via a data interconnection and memory DIM. The data interconnection and memory DIM may include an interconnection for transmitting data and a memory in which data are shared. Specifically, the data interconnection and memory DIM may include a local interconnection 500 and a data channel 6100. In addition, the data interconnection and memory DIM may include an L1 shared memory 400, a shared memory 2000, and a volatile memory 32. However, the embodiment is not limited thereto.

The task managers 600 may be controlled by the command processor 7000. In some embodiments, the command processor 7000 may transfer tasks to the task managers 600 via control signals, and the task managers 600 may transfer task completion reports to the command processor 7000. At least one task manager 600 may be included in the neural core 100, and thus, at least one task manager 600 may be included in the neural processor 1000. Moreover, if the neural processors 1000 are plural, the number of task managers 600 may get larger. Such a plurality of task managers 600 may all be controlled by the command processor 7000.

Figure 15:
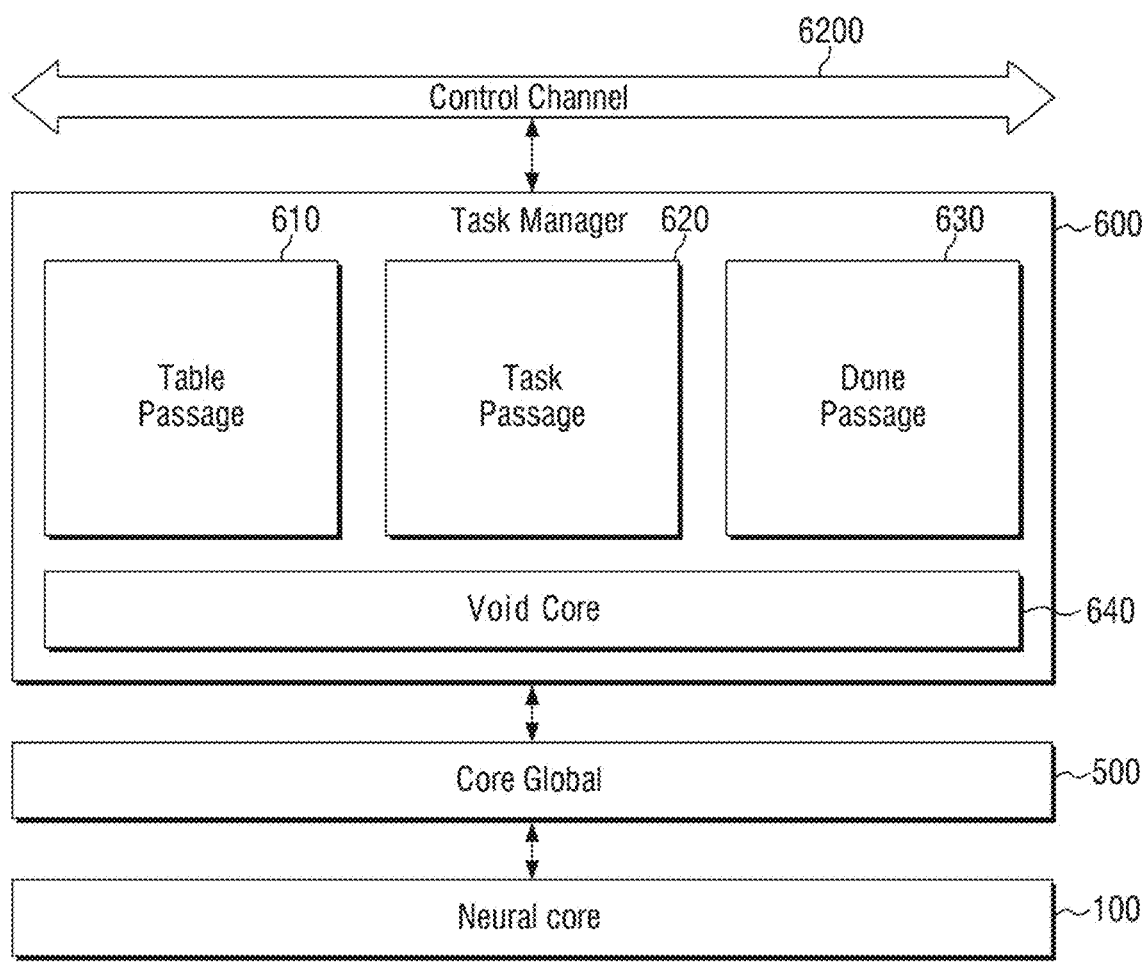
FIG. 15 is a block diagram for illustrating the structure of the task manager of FIG. 6 in detail.

FIG. 15 is a block diagram for illustrating the structure of the task manager of FIG. 6 in detail.

Referring to FIGS. 6, 13, and 15, the task manager 600 may include a table passage 610, a task passage 620, a done passage 630, and a void core 640. In some embodiments, the table passage 610, the task passage 620, the done passage 630, and the void core 640 may be referred to respectively as a table passage circuit, a task passage circuit, a done passage circuit, and a void core circuit, but for the sake of convenience, the terms are respectively unified as a table passage, a task passage, a done passage, and a void core. Further, each of the table passage 610, the task passage 620, the done passage 630, and the void core 640 may be implemented as a circuit circuitry.

The table passage 610 may receive a table update request TURQ for updating a matching table of physical addresses and logical addresses from the control channel 6200 and transfer the table update request TURQ to the core global 500. In some embodiments, the table update request may be transferred from the command processor 7000 via the control channel 6200.

The task passage 620 may receive tasks from the control channel 6200, generate task information accordingly, and transmit the task information to the core global 500. In some embodiments, the tasks may be transferred from the command processor 7000 via the control channel 6200. The core global 500 may transfer the task information to the neural core 100. The neural core 100 may perform the task according to the transferred task information and transfer completion signals to the core global 500.

The core global 500 may transfer the completion signals to the done passage 630. The done passage 630 may receive the completion signals and generate completion reports DNrp for the task. The done passage 630 may transmit the completion reports DNrp to the command processor 7000 via the control channel 6200. Further, the table update request TURQ in the table passage 610 may be transferred to the LSU 110 via the core global 500. In some embodiments, the table of the translation lookaside buffer 114 in the LSU 110 may be updated.

The void core 640 may process the tasks without transferring it to the neural core 100 and generate completion signals for the task. In some embodiments, the void core 640 may virtually process a task and generate a completion signal. In some embodiments, the void core 640 may virtually process dummy set tasks for dependency setting between dependency matrices. A dummy set task is a task for dependency setting, and may be configured not to include information for computation or memory operations but to include information for dependency setting. The void core 640 may generate a completion signal in response to a dummy set task for a dependency set, and causes dependency setting to be performed in response to a completion signal.

Figure 16:
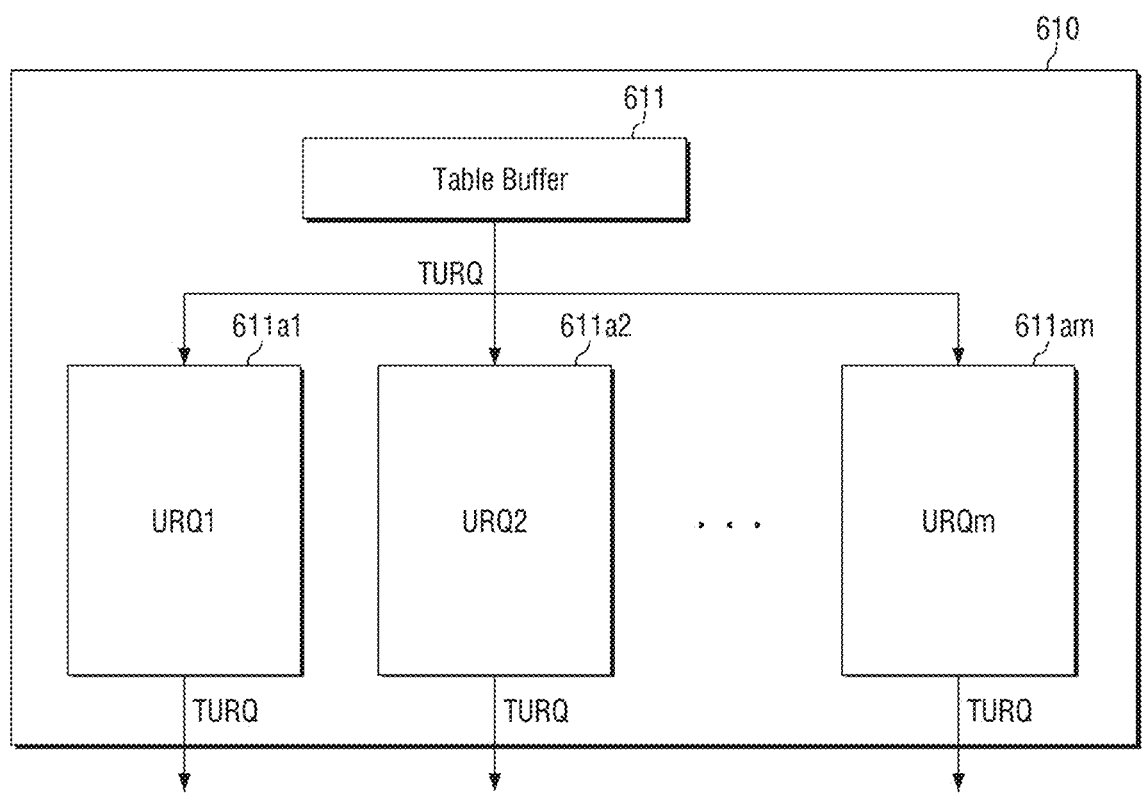
FIG. 16 is a block diagram for illustrating the table passage of FIG. 15 in detail.

FIG. 16 is a block diagram for illustrating the table passage of FIG. 15 in detail.

Referring to FIG. 16, the table passage 610 may include a table buffer 611 and first to m-th update request queues 611a1 to 611am.

In the table buffer 611, table update requests TURQ in which physical addresses and logical addresses are matched may be transmitted from the command processor 7000 and stored. When the core global 500 fetches these table update requests TURQ, each table update request TURQ may be stored in the first to m-th update request queues 611a1 to 611am.

Different types of table update requests TURQ may be stored in each of the first to m-th update request queues 611a1 to 611am. For example, different types of table update requests TURQ may include at least one of neural core TLB update requests, micro-DMA TLB update requests, LP micro-DMA TLB update requests, or ST micro-DMA TLB update requests. However, the embodiment is not limited thereto. In some embodiments, each of the first to m-th update request queues 611a1 to 611am may also include the same type of table update request TURQ.

In addition, the first to m-th update request queues 611a1 to 611am may each be a general queue, i.e., a queue that accommodates all the various types of requests. Accordingly, each of the first to m-th update request queues 611a1 to 611am may accept requests regardless of the type.

Each of the first to m-th update request queues 611a1 to 611am may transmit the table update requests TURQ to the core global 500, and may transfer them to the LSU 110 via the core global 500. In some embodiments, the tables in the translation lookaside buffer 114 within the LSU 110 may be updated.

Figure 17:
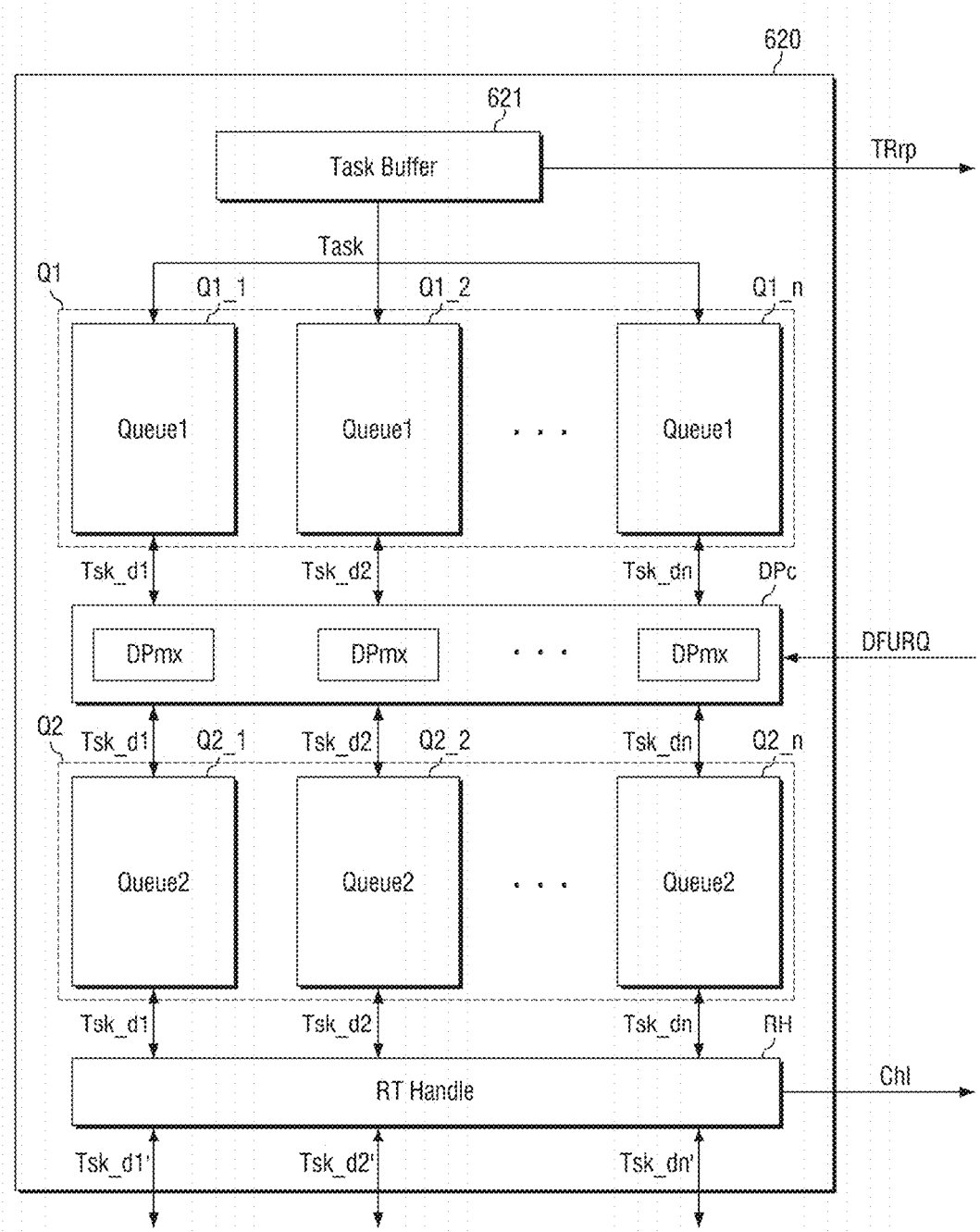
FIG. 17 is a block diagram for illustrating the task passage of FIG. 15 in detail.

FIG. 17 is a block diagram for illustrating the task passage of FIG. 15 in detail.

Referring to FIG. 17, the task passage 620 may include a task buffer 621, a first queue group Q1, a dependency checker DPc, a second queue group Q2, and a runtime handle RH. In this case, the task buffer 621, the first queue group Q1, the dependency checker DPc, the second queue group Q2, and the runtime handle RH may be referred to respectively as a first queue group circuit, a dependency checker circuit, a second queue group circuit, and a runtime handle circuit, but for the sake of convenience, the terms are respectively unified as a first queue group, a dependency checker, a second queue group, and a runtime handle. In addition, each of the task buffer 621, the first queue group Q1, the dependency checker DPc, the second queue group Q2, and the runtime handle RH may be implemented as a circuit or circuitry. In some embodiments, the first queue group Q1 may be referred to as a dependency check waiting memory and the second queue group Q2 may be referred to as a process waiting memory.

The task buffer 621 may store tasks Task according to the control signals transmitted from the command processor 7000. The task buffer 621 may store the tasks Task in a form of task descriptor in the first queue group Q1 by task fetching operations of the core global 500. In some embodiments, the task passage 620 may generate task descriptors corresponding to the tasks Task and store them in the first queue group Q1.

The task descriptor for a task may contain dependency information. The dependency information may include a task type field, a dependency check information field, and a dependency set information field. The dependency check information field may include a dependency check enable field, a dependency check code, a dependency check group code, a neural core dependency check number field, and one or more non-neural core dependency check number fields. The dependency set information field may include a dependency set enable field, a dependency set code, and a dependency set group code.

The task type field may indicate a type of the task having the task descriptor. If there are 4 types, the number of bits for the task type field may be 2. For example, the task type field set equal to 0, 1, 2, and 3 may indicate the COMP type, the uDMA type, the LPuDMA type, and the STuDMA type, respectively.

The dependency check enable field may indicate whether a dependency check is needed for the task to be executed.

The dependency check code may indicate a list of reference tasks which the task depends on. In some embodiments, the number of bits for the dependency check code is 4. The dependency check code may include a plurality of dependency check fields. Each of the plurality of dependency check fields is associated with a respective one of a plurality of task types. A respective one dependency check field of the dependency check code may indicate whether a reference task associated with the respective one dependency check field depends on the task having the dependency check code. For example, the first, second, third, and fourth bits may be associated with the COMP type, the uDMA type, the LPuDMA type, and the STuDMA type, respectively.

The dependency check group code may indicate a group which the task belongs to. For example, if there are 64 groups, the number of bits for dependency check group code is 6. In some embodiments, there are a plurality of dependency check matrices, and the dependency check group code may indicate a dependency check matrix which should be used for the task having the task descriptor to be executed.

In some embodiments, when dependency check enable field indicates that a dependency check is needed for the task to be executed, the dependency checker DPc may check whether a row vector indicated by the task type field in the dependency check matrix indicated by the dependency check group code is matched with the dependency check code. For example, when the value of the task type field is equal to N1 and the value of the dependency check group code is equal to N2, the dependency checker DPc may check whether a (N1+1)-th row vector in the (N2+1)-th dependency check matrix is matched with the dependency check code.

The neural core dependency check number field may indicate the total number of reference tasks that the task depends on and that neural cores perform.

Each of the non-neural core dependency check number fields may be associated with a respective one of users and indicate the total number of reference tasks that the task depends on and that non-neural cores perform.

The dependency set enable field may indicate whether a dependency set is needed after the task is completed.

The dependency set code may indicate a list of reference tasks which depend on the task. In some embodiments, the number of bits for the dependency set code is 4. The dependency set code may include a plurality of dependency set fields. The plurality of dependency set fields may be associated with a respective one of a plurality of task types. A respective one dependency set field may indicate whether the task depends on a reference task associated with the respective one dependency set field. For example, the first, second, third, and fourth bits may be associated with a COMP type, uDMA type, LPuDMA type, and STuDMA type, respectively.

The dependency set group code may indicate a group which reference tasks which depend on the task belong to. For example, if there are 64 groups, the number of bits for dependency set group code is 6.

In some embodiments, in a case that a dependency set enable field indicates that a dependency set is needed after the task is completed, when the task is completed, the dependency checker DPc may set a column vector indicated by the task type field in the dependency check matrix indicated by the dependency set group code to the dependency set code. For example, when the value of the task type field is equal to N1 and the value of the dependency check group code is equal to N2, the dependency checker DPc may set a (N1+1)-th column vector in the (N2+1)-th dependency check matrix to the dependency set code.

The task buffer 621 may transmit the task descriptors to the first queue group Q1 and generate transfer done reports TRrp. The task buffer 621 may transmit the transfer done reports TRrp to the done passage 630. The transfer done reports TRrp may be reports about the tasks transmitted to the first queue group Q1.

The task passage 620 may distribute task descriptors in the task buffer 621 to the first queue group Q1 according to the types indicated by the task type fields of the task descriptors. FIG. 17 shows n queues in the first queue group Q1. In some embodiments, n may be a natural number. In some embodiments, the number of queues in the first queue group Q1 may be equal to or greater than one. In some embodiments, the plurality of first queues in the first queue group Q1 may be associated with a respective one of the plurality of task types. In some embodiments, the plurality of task types may include the COMP, uDMA, LPuDMA, and STuDMA. In some embodiments, a respective one first queue of the plurality of first queues in the first queue group Q1 may store ML tasks having a task type associated with the respective one first queue.

In some embodiments, the first queue group Q1 may include a plurality of first queues Q1_1 ... Q1_$n$. The first queue may be referred to as a dependency check waiting queue, since the first queue stores a task which is waiting for a dependency check. The i-th first queue Q1_$i$ of the first queue group Q1 (i=1 ... n) may store a i-th task descriptor Tsk_di corresponding to a task which has i-th task type and which is waiting for a dependency check.

The first to n-th task descriptors Tsk_d1 to Tsk_dn may be of different types or the same type. Alternatively, some of the first to n-th task descriptors Tsk_d1 to Tsk_dn may be of the same type, and some may be of different types.

The dependency checker DPc may include one or more dependency matrices DPmx. Dependencies for task descriptors can be checked via a comparison between a dependency set code defined for the dependency matrix DPmx and a check code extracted from the task descriptors. The dependency set code that is set for the dependency matrix DPmx may be updated via a dependency update request DFURQ. The dependency update request DFURQ may notify the change of dependency as a completed task occurs according to a defined dependency between particular tasks.

In an embodiment, the task descriptor may include dependency information representing a list of tasks which a task having the task descriptor depends on. In some embodiments, a particular task descriptor may include dependency information, which is information about other task descriptors that are dependent on it. As a particular task descriptor is completed, a dependency update request DFURQ is generated by taking into account the dependency information included in the corresponding task descriptor. Therefore, the dependency update request DFURQ may include an update request to the dependency matrix of a task descriptor.

In some embodiments, a plurality of the dependency matrices DPmx included in the dependency checker DPc may be configured. Referring to FIG. 17, the dependency matrices DPmx may include a plurality of dependency matrices DPmx. In FIG. 17, the plurality of queues Q1_1 ... Q1_$n$ may correspond to the plurality of dependency matrices DPmx respectively, but the embodiments of the disclosure are not limited thereto. In some embodiments, the number m of dependency matrices DPmx, may be different from the number n of queues in the first queue group Q1, and a correspondence relationship may not be established between the plurality of dependency matrices DPmx and queues of the first queue group Q1. In an embodiment, the dependency matrices DPmx may be configured in a pre-calculated number (m) for efficient operation of the neural processing system. In some embodiments, each dependency matrix DPmx may also be represented as belonging to a separate group.

In addition, each of the plurality of dependency matrices DPmx may operate independently. In an embodiment, each of the plurality of dependency matrices DPmx may operate independently, and updates of the dependency matrices may also be performed individually. In some embodiments, the dependency update requests DFURQ may include first to m-th dependency field update requests DFURQ_1 to DFURQ_m corresponding to each of the plurality of dependency matrices DPmx. In the following, a structure of one dependency matrix and a process in which a plurality of dependency matrices operates independently will be described in more detail.

Figure 18:
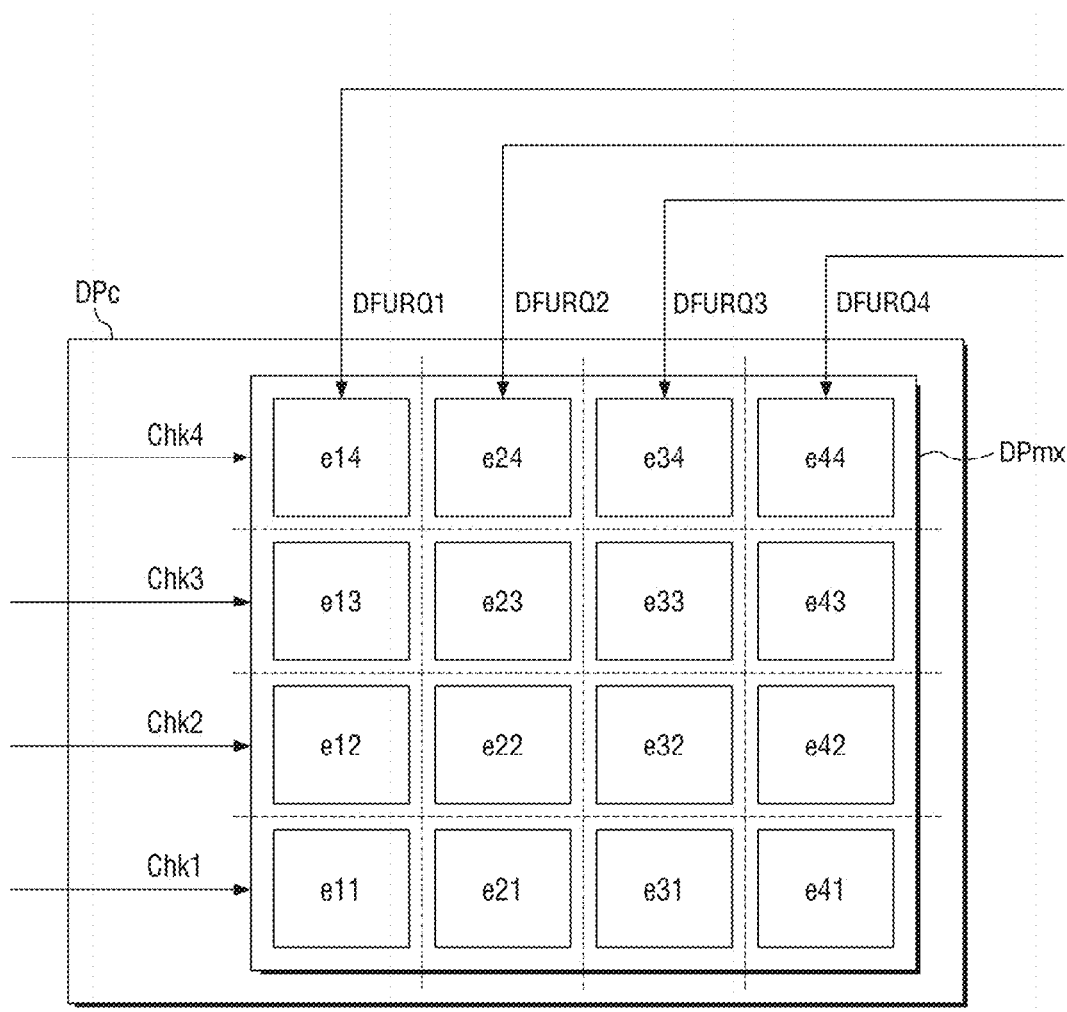
FIG. 18 is a diagram for illustrating dependency checker DPc in accordance with a first embodiment.

FIG. 18 is a diagram for illustrating a dependency checker DPc in accordance with a first embodiment.

Referring to FIG. 18, a dependency checker DPc in accordance with a first embodiment may be one embodiment of the dependency checker DPc of FIG. 17. The dependency checker DPc in accordance with the first embodiment may include a first dependency matrix DPmx1 therein. The dependency matrix DPmx in the dependency checker DPc in accordance with the first embodiment may be a square matrix. The dependency matrix DPmx may include a rectangular array of elements in arranged in rows and columns, and its size may be 4×4. In some embodiments, the dependency matrix DPmx may include a square array of elements. In some embodiments, the number of rows and columns of the dependency matrix DPmx may be equal to or greater than 5, or equal to or less than 3. In some embodiments, the number of rows and columns of the dependency matrix DPmx may be n, respectively. In some embodiments, the number of queues in the first queue group Q1, the number of queues in the second queue group Q2, and check-in buffers of the done passage 630, and the number of rows and columns of the dependency matrix DPmx may all be the same.

The dependency checker DPc may update each column of the dependency matrix DPmx via first to fourth dependency set codes DFURQ1 to DFURQ4 generated by the dependency update requests DFURQ. In some embodiments, the dependency checker DPc may generate the dependency set codes DFURQ1 to DFURQ4 with the dependency update requests DFURQ.

In some embodiments, the first to fourth columns of the dependency matrix DPmx may be updated to be the same as the values of the first to fourth dependency set codes DFURQ1 to DFURQ4, respectively.

For example, if the first dependency set code of the dependency matrix DPmx is [1 0 0 1], then e11 may be 1, e12 may be 0, e13 may be 0, and e14 may be 1. Similarly, other elements may be updated by the second to fourth dependency set codes DFURQ2 to DFURQ4.

After being updated in this way, the dependency matrix DPmx may be compared with the first to fourth dependency check codes chk1 to chk4. In some embodiments, the dependency checker DPc may receive the first to n-th task descriptors Tsk_d1 to Tsk_dn, and generate a dependency check code according to each task descriptor. The dependency check codes may correspond to each row of the dependency matrix DPmx.

In some embodiments, the first to fourth dependency check codes chk1 to chk4 may correspond to the first to fourth rows of the dependency matrix DPmx, respectively. For example, the first dependency check code chk1 may have the first row as the corresponding row, and the fourth dependency check code chk4 may have the fourth row as the corresponding row. Therefore, the first to fourth dependency check codes chk1 to chk4 may be compared with the first to fourth rows of the dependency matrix DPmx, respectively. For example, if the first dependency check code chk1 and the first row e11, e21, e31, and e41 of the dependency matrix DPmx are equal, the dependency checker DPc may transmit and check in the first task descriptor Tsk_d1 and clear the first row of the dependency matrix DPmx. In some embodiments, clearing may mean removing all data in the first row of the dependency matrix DPmx. The checked-in task descriptor may be transmitted to the second queue group Q2.

In some embodiments, data in the first row of the dependency matrix DPmx may be values updated by the first to fourth dependency set codes DFURQ1 to DFURQ4. The first to fourth dependency set codes DFURQ1 to DFURQ4 may be transferred to the dependency checker DPc when each descriptor of the first to n-th task descriptors Tsk_d1 to Tsk_dn is checked out. Accordingly, the first to fourth dependency set codes DFURQ1 to DFURQ4 may set the dependency matrix DPmx as to what the next task descriptor having a dependency relationship is.

If the first dependency check code chk1 and the first row e11, e21, e31, and e41 of the dependency matrix DPmx are not equal, the dependency checker DPc may not transfer the first task descriptor Tsk_d1 to the second queue group Q2 until the first dependency check code chk1 and the first row e11, e21, e31, and e41 of the dependency matrix DPmx are equal by an additional update.

Referring again to FIG. 17, the dependency checker DPc may transmit the first to n-th task descriptors Tsk_d1 to Tsk_dn in sequence to the second queue group Q2 according to the above method.

In some embodiments, the second queue group Q2 may include a plurality of second queues Q2_1 . . . Q2_n. The second queue may be referred to as a check-in waiting queue, a process waiting queue. The i-th queue Q2_i of the second queue group Q2 (i=1 . . . n) may store the i-th task descriptor Tsk_di. The number of queues in the second queue group Q2 may be the same as the number of queues in the first queue group Q1.

The first to n-th task descriptors Tsk_d1 to Tsk_dn may also include a wait field. A wait field may be specified by software. The task descriptors in which the wait field is set may wait for once and then be transferred in sequence depending on whether a particular condition is satisfied, instead of being transferred immediately according to an instruction given in advance.

The runtime handle RH may extract necessary information out of each of the first to n-th task descriptors Tsk_d1 to Tsk_dn and generate first to n-th task information Tsk_d1' to Tsk_dn'. The runtime handle RH may transfer the first to n-th task information Tsk_d1' to Tsk_dn' to the core global 500. In some embodiments, the first to n-th task information Tsk_d1' to Tsk_dn' may correspond to the first to n-th task descriptors Tsk_d1 to Tsk_dn, respectively. In some embodiments, each of the first to n-th task information Tsk_d1' to Tsk_dn' may also be the same as the first to n-th task descriptors Tsk_d1 to Tsk_dn. However, the embodiment is not limited thereto.

The runtime handle RH may transmit check-in data Ch1 to the done passage 630. The check-in data Ch1 may include the first to n-th task descriptors Tsk_d1 to Tsk_dn. The check-in data Ch1 may inform the done passage 630 that the first to n-th task information Tsk_d1' to Tsk_dn' corresponding to the first to n-th task descriptors Tsk_d1 to Tsk_dn leaves the task passage 620 and is transferred to the core global 500 for operation.

Figure 19:
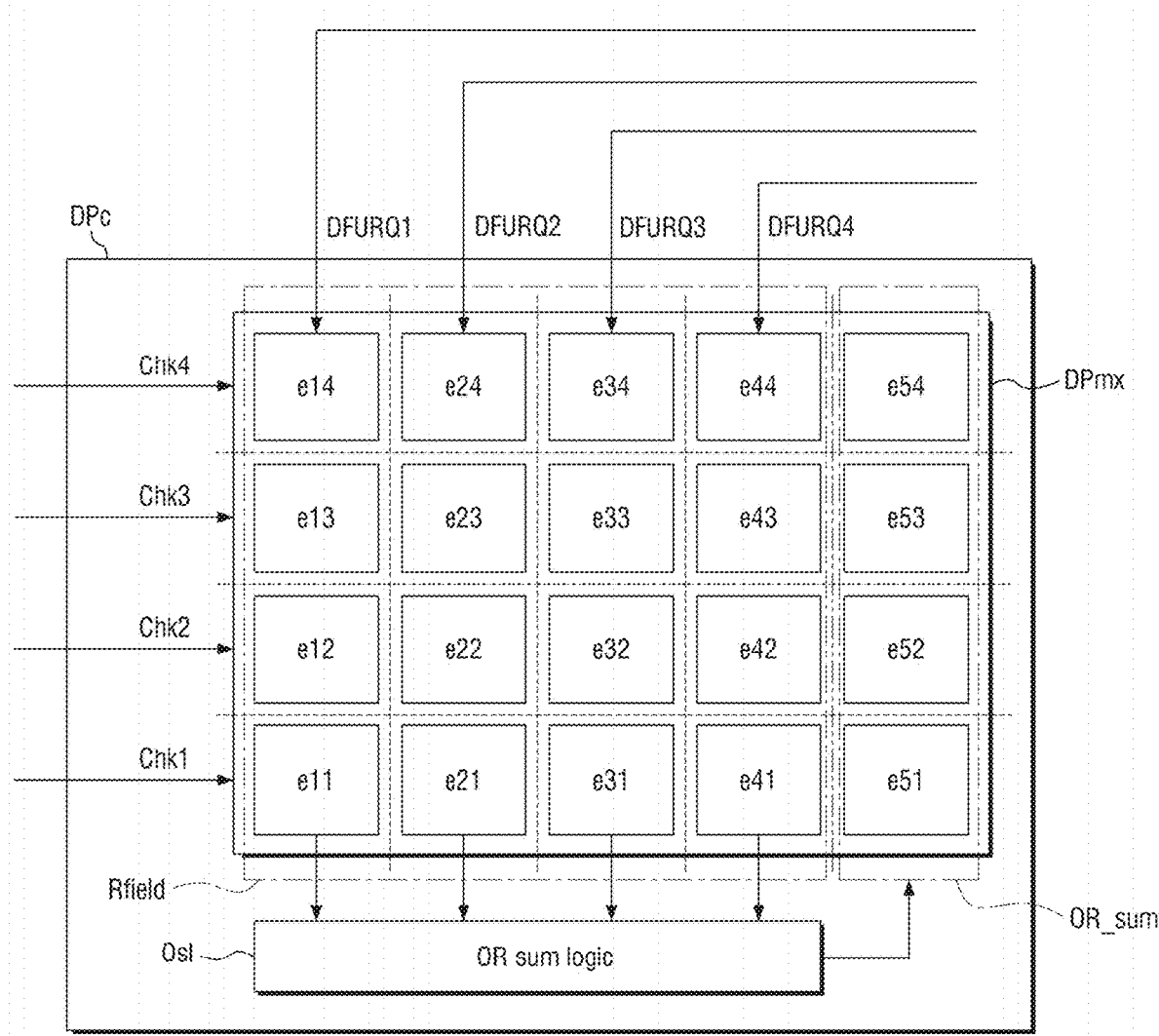
FIG. 19 is a diagram for illustrating a dependency checker including a dependency matrix in accordance with a second embodiment.

FIG. 19 is a diagram for illustrating a dependency checker including a dependency matrix in accordance with a second embodiment.

Referring to FIG. 19, a dependency checker DPc in accordance with the second embodiment may be one embodiment of the dependency checker DPc of FIG. 17. The dependency checker DPc may include a dependency matrix DPmx for a single mode and an OR sum logic Osl. In some embodiments, the dependency matrix DPmx for a single mode and the OR sum logic Osl may be referred to respectively as a dependency matrix circuit and an OR sum logic circuit, but for the sake of convenience, the terms are respectively unified as a dependency matrix and an OR sum logic. In addition, each of the dependency matrix DPmx for a single mode and the OR sum logic Osl may be implemented as a circuit or circuitry.

The dependency matrix DPmx for a single mode may implement the single-mode of the dependency matrix DPmx of FIG. 18. In some embodiments, each task for a machine learning model may depends only on a single pervious task in the single-mode. In some embodiments, the single mode may refer to a mode capable of displaying a case in which dependencies exist in a form of OR in two or more task descriptors.

Specifically, the dependency matrix DPmx for a single mode may include a field region Rfield and a OR sum region OR_sum. The field region Rfield may be the same as the dependency matrix DPmx of FIG. 18. In some embodiments, the field region Rfield may have the form of a square matrix. The field region Rfield may refer to a region capable of displaying 1:1 dependency between the respective task descriptors.

The OR sum region OR_sum may exist in a form of a column on a side of the field region Rfield. Accordingly, the dependency matrix DPmx for a single mode may have more columns than rows by one. Therefore, the dependency matrix DPmx for a single mode may be a non-square rectangular matrix due to the OR sum region OR_sum.

The OR sum region OR_sum may include a plurality of elements. The plurality of the elements in the OR sum region OR_sum may be associated with a respective one of the plurality of second queues Q2. The OR sum region OR_sum may be generated by the OR operation of the elements of the field region Rfield. Specifically, the OR operation of the four elements in the first row of the field region Rfield may become a first OR sum element e51 in the first row of the OR sum region OR_sum. Likewise, second to fourth OR sum elements e52 to e54 in the second to fourth rows may be the resulting values of the second to fourth rows, respectively.

The OR sum logic Osl may calculate the value of the OR sum region OR_sum by using the values of the elements in the field region Rfield. The OR sum logic Osl may perform an OR operation with elements in a respective one row of the field region Rfield and store the result in an element in the respective one row of the OR sum region OR_sum, as described above.

In some embodiments, if the dependency matrix DPmx for a single mode has stored '0' in the OR sum region OR_sum, it may operate in the same manner as the dependency matrix DPmx of FIG. 18. However, if the dependency matrix DPmx for a single mode has stored '1' in the OR sum region OR_sum, the task descriptor corresponding to the row in which that '1' is stored can be cleared immediately as the dependency is satisfied when any one of the other four task descriptors is checked out.

In some embodiments, since each task for a machine learning model may depends only on a single pervious task in the single-mode, the respective one element of the elements in the OR sum region OR_sum in the single mode may indicate whether all other previous task which a currently-waiting task in a first queue group Q1 associated with the respective one element depends on are complete. The task manager 600 may transfer the currently-waiting task in a first queue group Q1 to a second queue group Q2, in response to a determination that an element of the elements in the OR sum region OR_sum indicates that all other previous task which a currently-waiting task in a first queue group Q1 associated with the respective one element depends on are complete. When an element of the elements in the OR sum region OR_sum indicates that all other previous task which a currently-waiting task in a first queue group Q1 associated with the respective one element depends on are not complete, there may be two cases: one is that the currently-waiting task in a first queue group Q1 depends on a single reference task, and the other is that the currently-waiting task in a first queue group Q1 depends on no task. Considering the both cases, in a case that an element of the elements in the OR sum region OR_sum indicates that all other previous task which a currently-waiting task in a first queue group Q1 associated with the respective one element depends on are not complete, the task manager 600 may transfer the currently-waiting task in the first queue group Q1 to the second queue group Q2, in response to a determination that a dependency check code in a descriptor of the currently-waiting task in the first queue group Q1 associated with the respective one element is matched with a row vector associated with the respective one element in the field region Rfield.

In some embodiments, the dependency matrix DPmx for a single mode can implement the execution of tasks having dependencies in a form of OR with two or more tasks, and thus a clearer and more useful dependency check can be possible.

Figure 20:
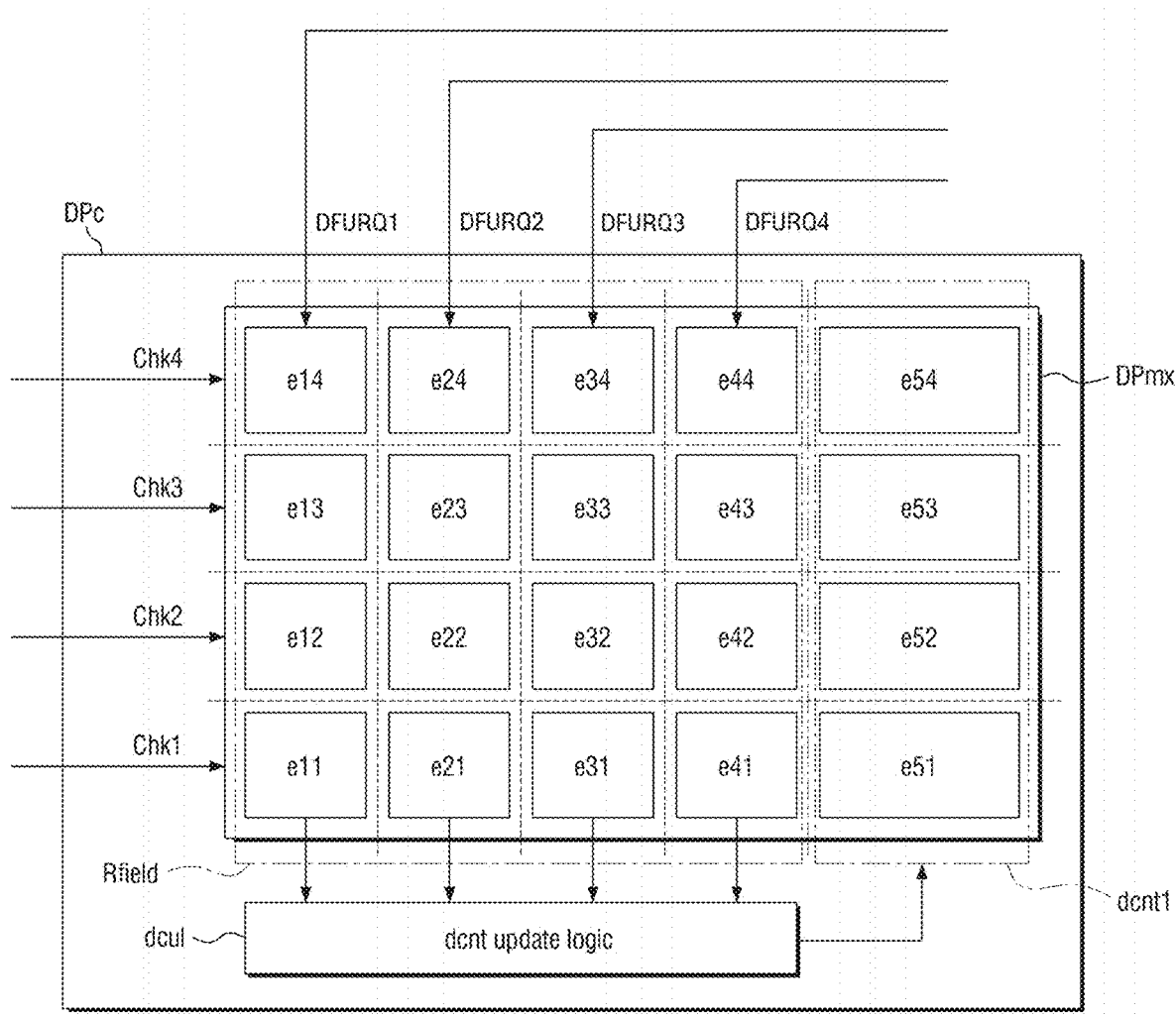
FIG. 20 is a diagram for illustrating a dependency checker in accordance with a third embodiment.

FIG. 20 is a diagram for illustrating a dependency checker in accordance with a third embodiment.

Referring to FIG. 20, a dependency checker DPc in accordance with the third embodiment may include a dependency matrix DPmx and a dependency counter update logic dcul. In some embodiments, the dependency matrix DPmx of FIG. 20 and the dependency counter update logic dcul may be referred to respectively as a first counter dependency matrix circuit and a dependency counter update logic circuit, but the sake of convenience, the terms are respectively unified as a first counter dependency matrix and a dependency counter update logic. In addition, each of the dependency matrix DPmx and the dependency counter update logic dcul may be implemented as a circuit or circuitry.

Referring to FIG. 20, the dependency matrix DPmx may include a field region Rfield and a first dependency counter region dcnt1. The field region Rfield may be the same as the dependency matrix DPmx of FIG. 18. In some embodiments, the field region Rfield may have the form of a square matrix.

Alternatively, the field region Rfield of the dependency matrix DPmx may have a larger number of bits than the dependency matrix DPmx of FIG. 18. In some embodiments, if the dependency matrix DPmx of FIG. 18 can be implemented with, for example, 1 bit, the field region Rfield of the dependency matrix DPmx can be implemented with 2 bits or more. For example, the field region Rfield of the dependency matrix DPmx may consist of 2 bits or more. In some embodiments, a greater number of bits may record accumulated data of several dependency set codes. However, the embodiment is not limited thereto.

The first dependency counter region dcnt1 may exist in the form of a column on the side of the field region Rfield. Accordingly, the dependency matrix DPmx may have more columns than rows by one. Therefore, the dependency matrix DPmx may be a non-square rectangular matrix due to the first dependency counter region dcnt1.

In some embodiments, the dependency checker DPc may determine values of elements in the first dependency counter region dcnt1 based on the values of elements in the field region Rfield. In some embodiment, the dependency checker DPc may determine an element of the elements in the field region Rfield as a sum of values of elements in a row vector where the element is located. In some embodiments, the dependency checker DPc may set an element e5$k$ equal to e1$k$+e2$k$+e3$k$+e4$k$ ($k$=1,2,3,4). In this scenario, the dependency checker DPc may determine a sum Sk of dependency fields in a task descriptor of a currently-waiting task in the k-th dependency check waiting queue Q1_$k$, determine whether the sum Sk is equal to e5$k$, and then determine whether all reference tasks which a currently-waiting task in the k-th dependency check waiting queue Q1_$k$ depends on are completed, based on the determination whether the sum Sk is equal to e5$k$. If the sum Sk is equal to e5$k$, the dependency checker DPc may determine that all reference tasks which the currently-waiting task depends on are completed; otherwise, the dependency checker DPc may determine that all reference tasks which the currently-waiting task depends on are not completed. The dependency checker DPc may more quickly check the dependency for the currently-waiting task by comparing the sum Sk and the element e5$k$ rather than comparing each elements.

In some embodiments, the first dependency counter region dcnt1 may be generated by counting a number of dependency set codes recorded into the elements of the field region Rfield. Specifically, the received number of the dependency set codes in the first row of the field region Rfield may be the element e51 in the first row of the first dependency counter region dcnt1. Likewise, elements e52 to e54 in the second to fourth rows may be counting result values of the dependency set codes in the second to fourth rows, respectively.

The dependency counter update logic dcul may calculate the value of the first dependency counter region dcnt1 by counting the number of times the dependency set codes of the field region Rfield are received. The dependency counter update logic dcul may perform counting for each row and store it in the first dependency counter region dcnt1, as described above. The elements of the first dependency counter region dcnt1 may have 2 bits or more. For example, the elements of the first dependency counter region dcnt1 may have 4 bits. Through this, it is possible to secure the number of bits required for counting. In some embodiments, the number of bits of the elements of the first dependency counter region dcnt1 may be the same as the number of bits of the elements of the field region Rfield.

The first dependency counter region dcnt1 may be to implement that the same type of dependency set codes are applied by different external neural cores. For example, if a task of one neural core and a task of another neural core are the same, the subsequent task may not be executed at all but may have to wait until the execution of the preceding task is completed.

However, if the first dependency counter region dcnt1 performs counting, a reservation operation of the execution of the second task can be possible in sequence even before the end of the first task, and thus the overall speed of the device can be improved and the bottleneck section can be minimized. In particular, since this is possible with only a single group of dependency matrices, use of hardware resources can be minimized as well.

In some embodiments, the first to fourth dependency check codes chk1 to chk4 may each be applied with numbers smaller than the current counter value, decrement the counter by one, and wait when the counter value reaches 0.

Figure 21:
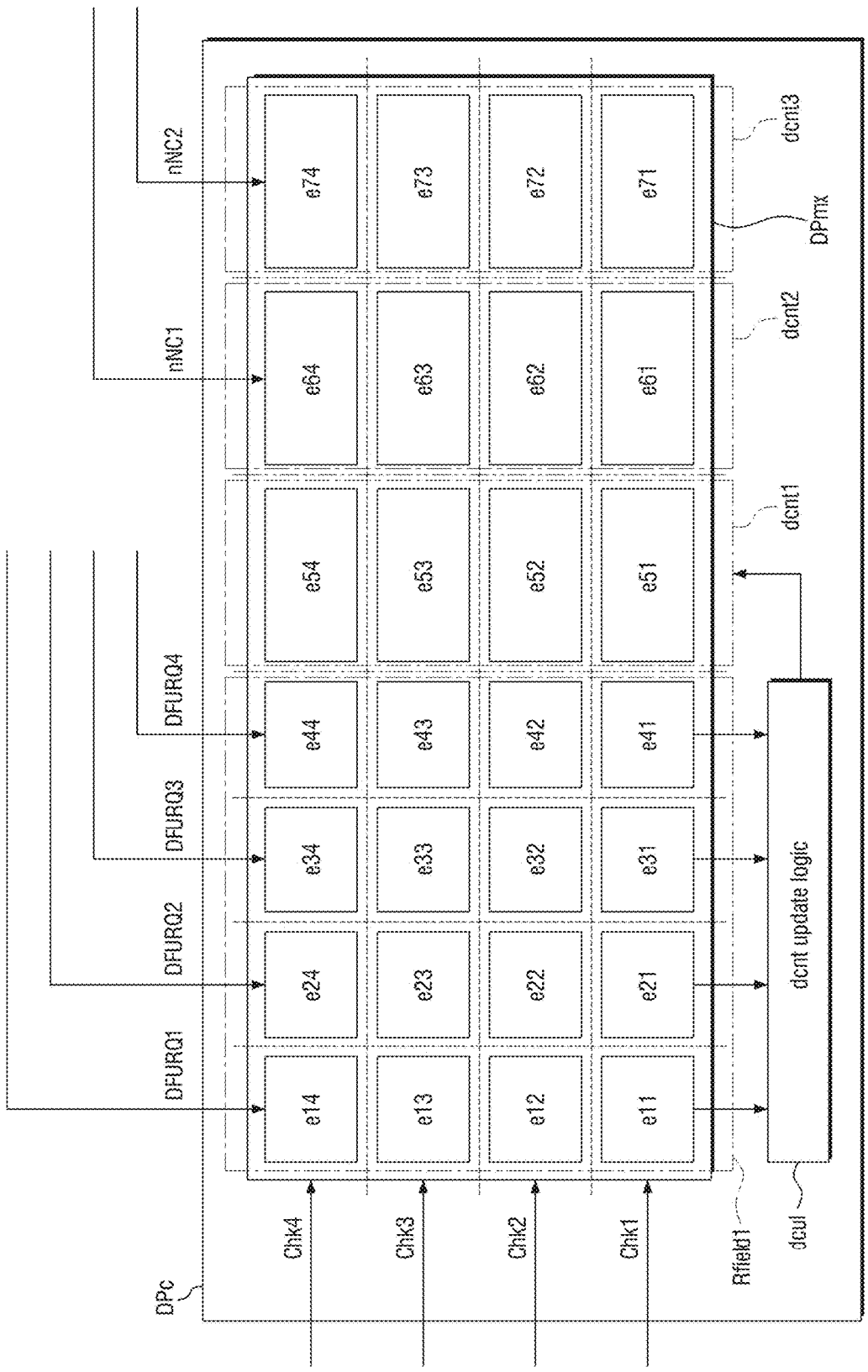
FIG. 21 is a diagram for illustrating a dependency checker in accordance with a fourth embodiment.

FIG. 21 is a diagram for illustrating a dependency checker in accordance with a fourth embodiment.

Referring to FIG. 21, a dependency checker DPc in accordance with the fourth embodiment may include a dependency matrix DPmx. In some embodiments, the dependency matrix DPmx may include a field region Rfield, a first dependency counter region dcnt1, a second dependency counter region dcnt2, and a third dependency counter region dcnt3. The dependency matrix DPmx may be referred to as a dependency matrix circuit, but for the sake of convenience, the terms are unified as a dependency matrix. In addition, the dependency matrix DPmx may be implemented as a circuit or circuitry.

In some embodiments, the field region Rfield and the first dependency counter region dcnt1 of the dependency matrix DPmx may be the same as the dependency matrix DPmx of FIG. 20. The dependency matrix DPmx may further include the second dependency counter region dcnt2 for a first user and the third dependency counter region dcnt3 for a second user. In some embodiments, the two dependency counter regions are additionally included in FIG. 21, but the embodiment is not limited thereto. In some embodiments, one or three or more dependency counter regions may be additionally included as well.

The second dependency counter region dcnt2 and the third dependency counter region dcnt3 may receive and store a first non-neural core dependency set code nNC1 and a second non-neural core dependency set code nNC2 from non-neural core module, respectively. The non-neural core module may refer to a module other than neural cores external to the task manager. For example, the non-neural core module may be a module such as DMA. However, the embodiment is not limited thereto.

In some embodiments, a task for a neural core may depend on a task of non-neural core. For example, the task for a neural core may depend on a task which the DMA 3000 performs to load data from off-chip memory 30 to the shared memory 2000. The DMA 3000 may send a dependency set signal whenever the DMA 3000 loads data for a currently-waiting task in a first queue group Q1 from off-chip memory 30 to the shared memory 2000. The dependency checker DPc may increase the value of an element associated with the task in the second dependency counter region dcnt2 for the first user, if the dependency set signal from DMA 3000 is for the first user. The dependency checker DPc may increase the value of an element associated with the task in the second dependency counter region dcnt2 for the second user, if the dependency set signal from DMA 3000 is for the second user.

The dependency checker DPc may determine whether all reference tasks which a currently-waiting task in a first queue group Q1 depends on are completed, based on a determination on whether the dependency check code, the neural core dependency check number field, and the one or more non-neural core dependency check number fields of the currently-waiting task are matched with a row vector associated with the currently-waiting task in the dependency check matrix indicated by the dependency check group code of the currently-waiting task. In various embodiments, regarding the determination, one or more of the dependency check code, the neural core dependency check number field, and the one or more non-neural core dependency check number fields may be omitted. In various embodiments, one or more of the field region Rfield, the first dependency counter region dcnt1, the second dependency counter region dcnt2, and the third dependency counter region dcnt3 may be omitted in the dependency matrix DPmx.

The embodiment can allow various types of dependencies to be resolved directly within the task manager by implementing a dependency matrix so as to resolve dependencies not only for external neural cores but also for non-neural cores.

In some embodiments, the second dependency counter region dcnt2 and the third dependency counter region dcnt3 may also be performed in the form of counter, and can thus process the same type of tasks of various entities immediately without delays.

Figure 22:
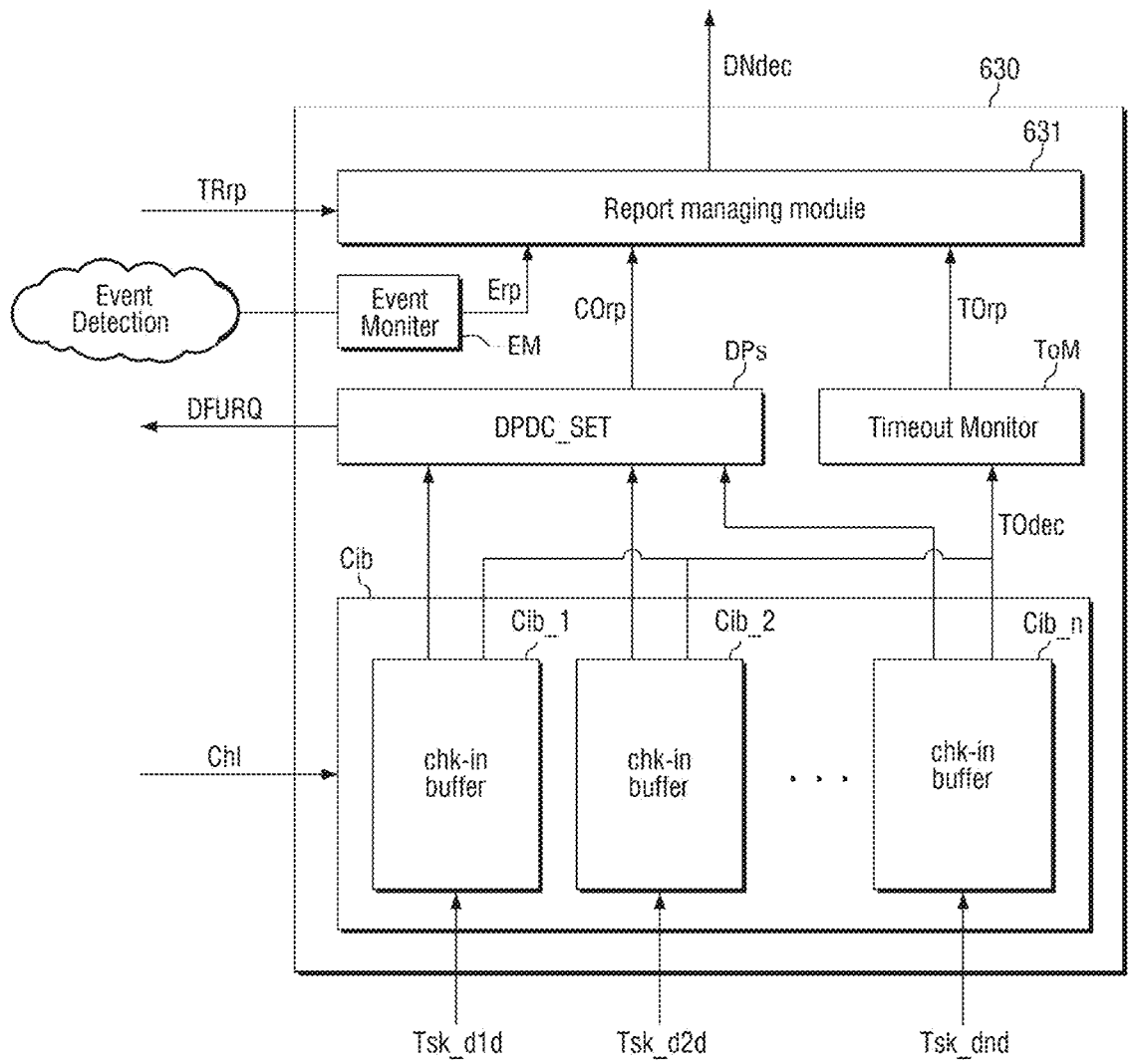
FIG. 22 is a block diagram for illustrating the done passage of FIG. 15 in detail.

FIG. 22 is a block diagram for illustrating the done passage of FIG. 15 in detail.

Referring to FIG. 22, the done passage 630 may include a check-in buffer Cib, a dependency setter DPs, a timeout monitor ToM, an event monitor EM, and a report managing module 631. The check-in buffer Cib, the dependency setter DPs, the timeout monitor ToM, the event monitor EM, and the report managing module 631 may be referred to respectively as a check-in buffer circuit, a dependency setter circuit, a timeout monitor circuit, an event monitor circuit, and a report managing circuit, but for the sake of convenience, the terms are respectively unified as a check-in buffer, a dependency setter, a timeout monitor, an event monitor, and the report managing module. Further, each of the check-in buffer Cib, the dependency setter DPs, the timeout monitor ToM, the event monitor EM, and the report managing module 631 may be implemented as a circuit or circuitry.

The check-in buffer Cib may receive the check-in data Ch1. The check-in buffer Cib may include first to n-th check-in buffers Cib_1 to Cib_n. The check-in buffer Cib may store the first to n-th task descriptors Tsk_d1 to Tsk_dn stored in the check-in data Ch1. The first to n-th check-in buffers Cib_1 to Cib_n may store the first to n-th task descriptors Tsk_d1 to Tsk_dn, respectively. Through this, the check-in buffer Cib may perform check-in of the first to n-th task descriptors Tsk_d1 to Tsk_dn.

In some embodiments, the i-th check-in buffer Cib_i (i=1 . . . n) may store the i-th task descriptor Tsk_di. The number of check-in buffers Cib may be the same as the number of queues in the first queue group Q1 and the number of queues in the second queue group Q2.

The check-in buffer Cib may receive completion signals from the core global 500. In some embodiments, the completion signals may include first to n-th completion signals Tsk_d1d to Tsk_dnd. The first to n-th completion signals Tsk_d1d to Tsk_dnd may be completion signals for each of the first to n-th task descriptors Tsk_d1 to Tsk_dn, respectively. The first to n-th completion signals Tsk_d1d to Tsk_dnd may be received by the first to n-th check-in buffers Cib_1 to Cib_n, respectively. In some embodiments, the i-th check-in buffer Cib_i (i=1 . . . n) may receive the i-th completion signal Tsk_did.

The dependency setter DPs may receive the completion signals from the check-in buffer Cib and generate dependency update requests DFURQ. In some embodiments, depending on which task corresponding to what task descriptor has been completed, the dependency setter DPs may generate a dependency update request DFURQ. The dependency setter DPs may transmit the dependency update request DFURQ to the task passage 620.

In some embodiments, the dependency update request DFURQ may include the contents of the dependency set codes DFURQ1 to DFURQ4 of FIG. 18 described above. In some embodiments, the dependency update request DFURQ may include dependency information of the task descriptor that is being checked out currently. In some embodiments, the dependency update request DFURQ may include information about a task descriptor that can be executed as the dependency limitation is removed by the task descriptor that is being checked out currently.

The dependency setter DPs may check out each of the first to n-th task descriptors Tsk_d1 to Tsk_dn according to the completion signals. Accordingly, the dependency setter DPs may generate checkout reports COrp about which tasks have been completed and checked out.

The dependency setter DPs may transmit the checkout reports COrp to the report managing module 631.

As the dependency setter DPs transmits the dependency update requests DFURQ to the task passage 620, the dependency checker DPc of the task passage 620 may be capable of sequential transmission according to the dependency of each task descriptor.

The embodiment can minimize the overhead required for communication with the command processor 7000 by allowing the task manager 600 to directly perform dependency checking and setting without the command processor 7000 being solely responsible for processing according to the dependencies. Therefore, the performance and speed of the neural processing device 1 in accordance with the embodiment can be significantly improved.

The timeout monitor ToM may receive timeout detection signals TOdec from the check-in buffer Cib. A timeout detection signal TOdec may be a signal regarding whether a time from a check-in time point to a check-out time point exceeds a preset time. The timeout monitor ToM may generate timeout reports TOrp according to the timeout detection signals TOdec. The timeout monitor ToM may transmit the timeout reports TOrp to the report managing module 631.

The timeout monitor ToM may determine the check-in and check-out of each task descriptor and then allow the command processor 7000 to identify errors in which the checked-in task descriptors are not checked out. Through this, data loss can be prevented and prolonged delays due to dependencies can be prevented.

In the embodiment, events may occur according to at least one of hardware or software errors, log-related events, or tasks performed without descriptors. Embodiments of the disclosure are not limited thereto. The event monitor EM may detect whether such events have occurred and generate event reports Erp according to event detecting signals. The generated event reports Erp may be provided to the report managing module 631.

The report managing module 631 may receive at least one of a transfer done report TRrp, an event report Erp, a checkout report COrp, or a timeout report TOrp, and generate a completion report DNrp. In some embodiments, the event reports Erp may be generated by detecting events inside the neural processor 1000. The events may include, for example, at least one of hardware or software errors, log-related events, or tasks performed without descriptors. However, the embodiment is not limited thereto.

The completion reports DNrp may be created so as to comprehensively report whether a task has been performed, whether a timeout has occurred, and the like. The report managing module 631 may report the completion reports DNrp to the command processor 7000.

Figure 23:
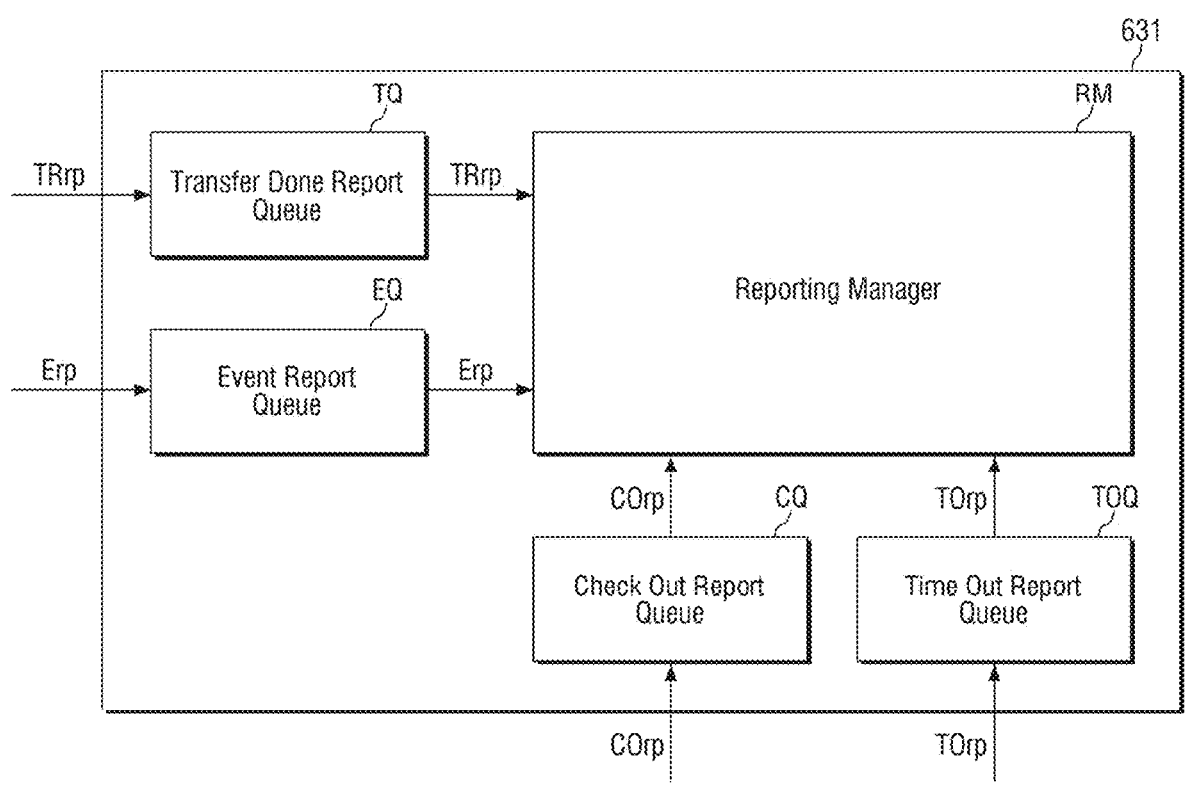
FIG. 23 is a block diagram for illustrating the report managing module of FIG. 22 in detail.

FIG. 23 is a block diagram for illustrating the report managing module of FIG. 22 in detail.

Referring to FIG. 23, the report managing module 631 may include a transfer done report queue TQ, an event report queue EQ, a checkout report queue CQ, a timeout report queue TOQ, and a reporting manager RM. In some embodiments, the transfer done report queue TQ, the event report queue EQ, the checkout report queue CQ, the timeout report queue TOQ, and the reporting manager RM may be referred to respectively as a transfer done report queue circuit, an event report queue circuit, a checkout report queue circuit, a timeout report queue circuit, and a reporting manager circuit, but for the sake of convenience, the terms are respectively unified as a transfer done report queue, an event report queue, a checkout report queue, a timeout report queue, and a reporting manager. Further, each of the transfer done report queue TQ, the event report queue EQ, the checkout report queue CQ, the timeout report queue TOQ, and the reporting manager RM may be implemented as a circuit or circuitry.

The transfer done report queue TQ may receive the transfer done report TRrp and transfer it to the reporting manager RM. The event report queue EQ may receive the event report Erp and transfer it to the reporting manager RM. The checkout report queue CQ may receive the checkout report COrp and transfer it to the reporting manager RM. Further, the timeout report queue TOQ may receive the timeout report TOrp and transfer it to the reporting manager RM.

The reporting manager RM may receive at least one of the transfer done report TRrp, the event report Erp, the checkout report COrp, or the timeout report TOrp, and through this, may generate a completion report DNrp. The reporting manager RM may transfer the completion report DNrp to the command processor 7000.

Figure 24:
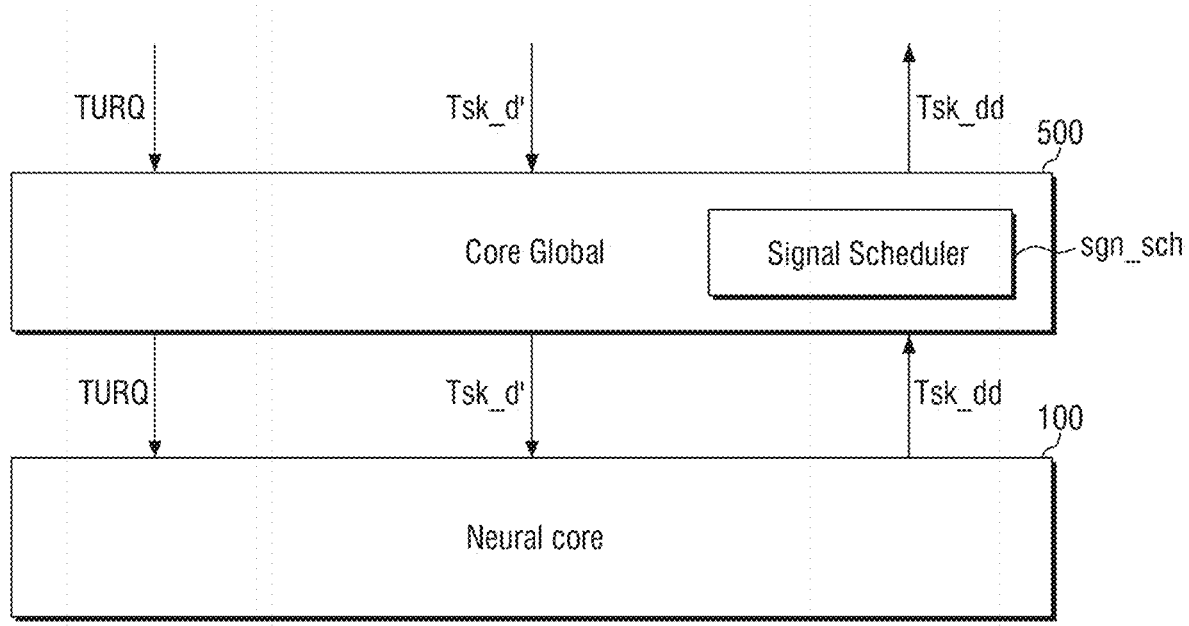
FIG. 24 is a diagram for illustrating data that the core global and the task processing unit of FIG. 15 exchange.

FIG. 24 is a diagram for illustrating data that the core global and the task processing unit of FIG. 15 exchange.

Referring to FIG. 24, the core global 500 may receive the table update request TURQ and transfer it to the LSU 110 of the neural core 100. In addition, the core global 500 may receive the task information Tsk_d' and transfer it to the neural core 100.

The neural core 100 may perform tasks and generate completion signals. The LSU 110 or the processing unit 160 may transfer the completion signals Tsk_dd to the core global 500. The core global 500 may include a signal scheduler sgn_sch. The signal scheduler sgn_sch may receive the completion signals Tsk_dd, schedule transmission of the completion signals Tsk_dd, and transmit them to the done passage 630. The signal scheduler sgn_sch may be referred to as a signal scheduler circuit, but for the sake of convenience, the terms are unified as a signal scheduler.

In addition, the signal scheduler sgn_sch may be implemented as a circuit or circuitry.

Figure 25:
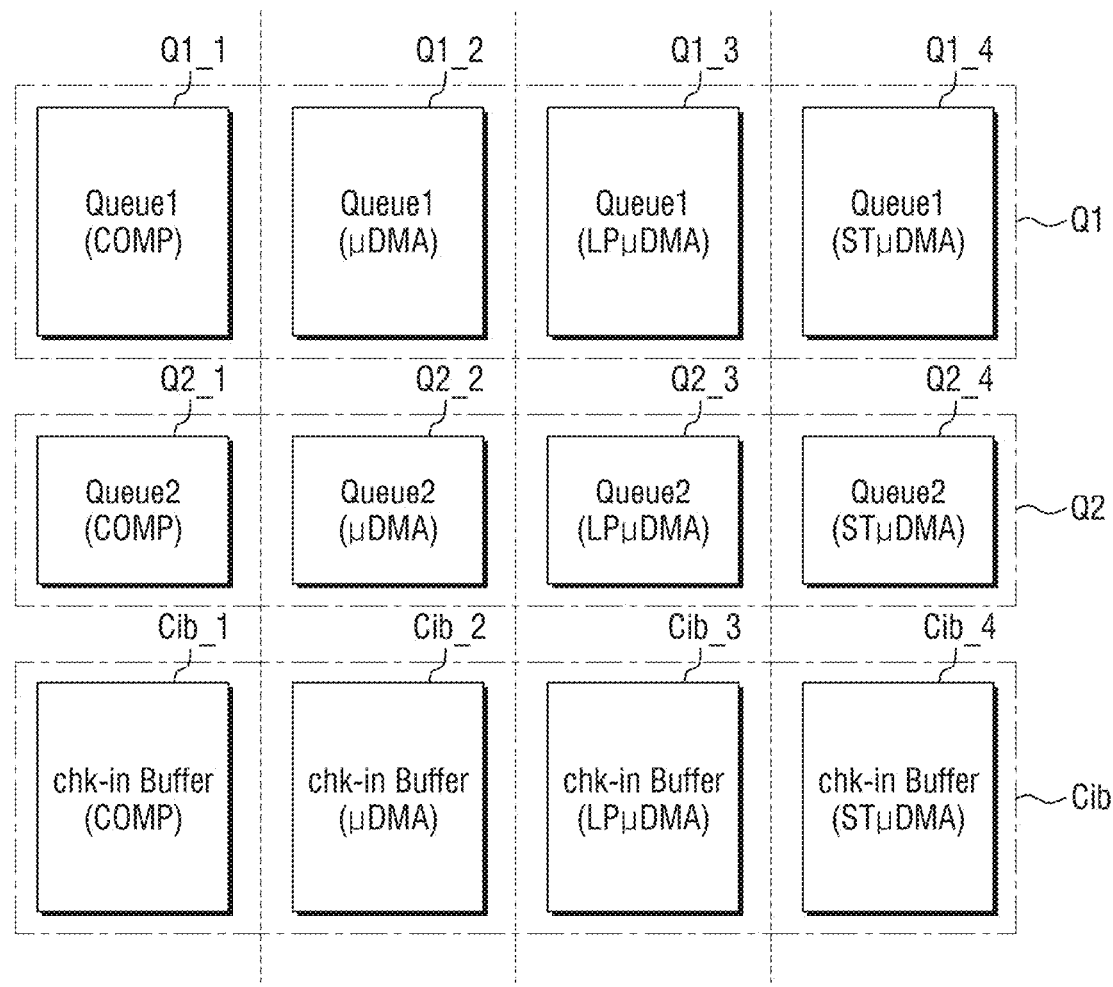
FIG. 25 is a diagram for illustrating types of task descriptors stored in a first queue, a second queue, and a check-in buffer.

FIG. 25 is a diagram for illustrating types of task descriptors stored in a first queue, a second queue, and a check-in buffer.

Referring to FIG. 25, the 1st to 4th queues Q1_1 ... Q1_4 of the first queue group Q1, the 1st to 4th queues Q2_1 ... Q2_4 of the second queue group Q2, and first to fourth check-in buffers Cib_1 to Cib_4 of a check-in buffer Cib may store particular types of task descriptors, respectively. The 1st to 4th queues Q1_1 ... Q1_4 of the first queue group Q1, the 1st to 4th queues Q2_1 ... Q2_4 of the second queue group Q2, and the first to fourth check-in buffers Cib_1 to Cib_4 may store different types of task descriptors.

For example, the 1st queue Q1_1 of the first queue group Q1, the 1st queue Q2_1 of the second queue group Q2, and the first check-in buffer Cib_1 may store task descriptors for computation (COMP), and the 2nd queue Q1_2 of the first queue group Q1, the 2nd queue Q2_2 of the second queue group Q2, and the second check-in buffer Cib_2 may store task descriptors for micro-DMA. Further, the 3rd queue Q1_3 of the first queue group Q1, the 3rd queue Q2_3 of the second queue group Q2, and the third check-in buffer Cib_3 may store task descriptors for LP micro-DMA, and the 4th queue Q1_4 of the first queue group Q1, the 4th queue Q2_4 of the second queue group Q2, and the fourth check-in buffer Cib_4 may store task descriptors for ST micro-DMA. However, the embodiment is not limited thereto.

Figure 26:
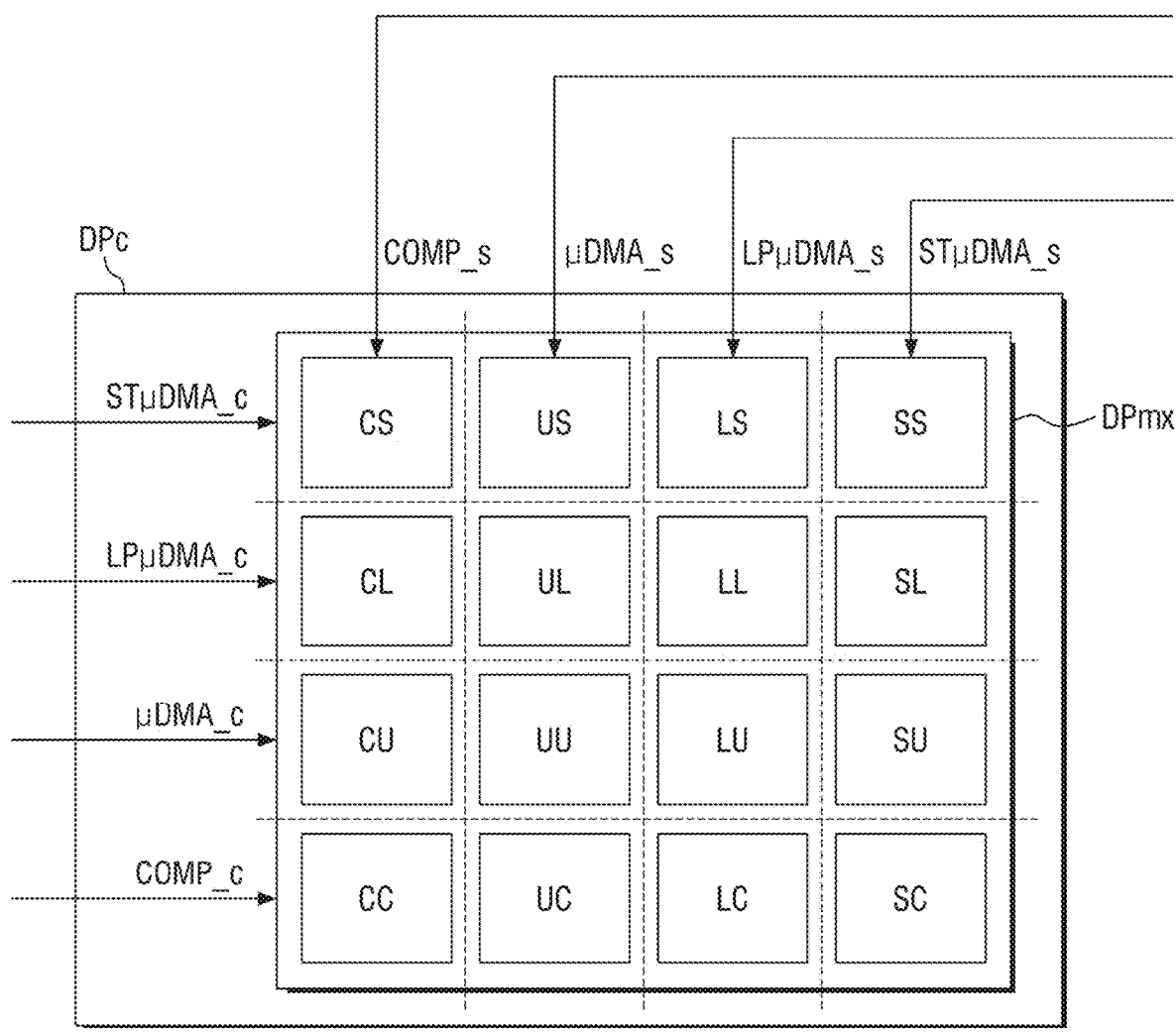
FIG. 26 is a diagram for illustrating a second dependency matrix stored in a dependency checker of a neural processing device in accordance with some embodiments of the disclosure.

FIG. 26 is a diagram for illustrating a second dependency matrix stored in a dependency checker of a neural processing device in accordance with some embodiments of the disclosure.

Referring to FIG. 26, in the dependency matrix DPmx stored in the dependency checker DPc, first to fourth columns may correspond to task descriptor types, respectively. For example, in the dependency matrix DPmx, the first to fourth columns may correspond to computation, micro-DMA, LP micro-DMA, and ST micro-DMA, respectively. Further, in the dependency matrix DPmx, the first to fourth rows may correspond to computation, micro-DMA, LP micro-DMA, and ST micro-DMA, respectively. However, the embodiment is not limited thereto. The type of task descriptors may further include preprocessing, and the computation may be subdivided into detailed computations and defined as a type of a task descriptor.

The first column of the dependency matrix DPmx may be updated by a computation set code COMP_s. The second column of the dependency matrix DPmx may be updated by a micro-DMA set code µDMA_s. The third column of the dependency matrix DPmx may be updated by a micro-LP micro-DMA set code LPµDMA_s. The fourth column of the dependency matrix DPmx may be updated by a micro-ST micro-DMA set code STµDMA_s.

In addition, the first row of the dependency matrix DPmx may be compared with a computation check code COMP_c, the second row may be compared with a micro-DMA check code µDMA_c, the third row may be compared with an LP micro-DMA check code LPµDMA_c, and the fourth row may be compared with an ST micro-DMA check code STµDMA_c.

Therefore, for the dependency matrix DPmx, the first column may include CC, CU, CL, and CS. In some embodiments, CC may refer to a dependency from computation to computation, and CU may refer to a dependency from computation to micro-DMA. Similarly, CL may refer to a dependency from computation to LP micro-DMA, and CS may refer to a dependency from computation to ST micro-DMA. In some embodiments, a dependency from a task of the type corresponding to each column to a task of the type corresponding to each row may refer to each element of the dependency matrix DPmx.

FIGS. 27 to 30 are example diagrams for illustrating operation of the dependency matrix.

Figure 27:
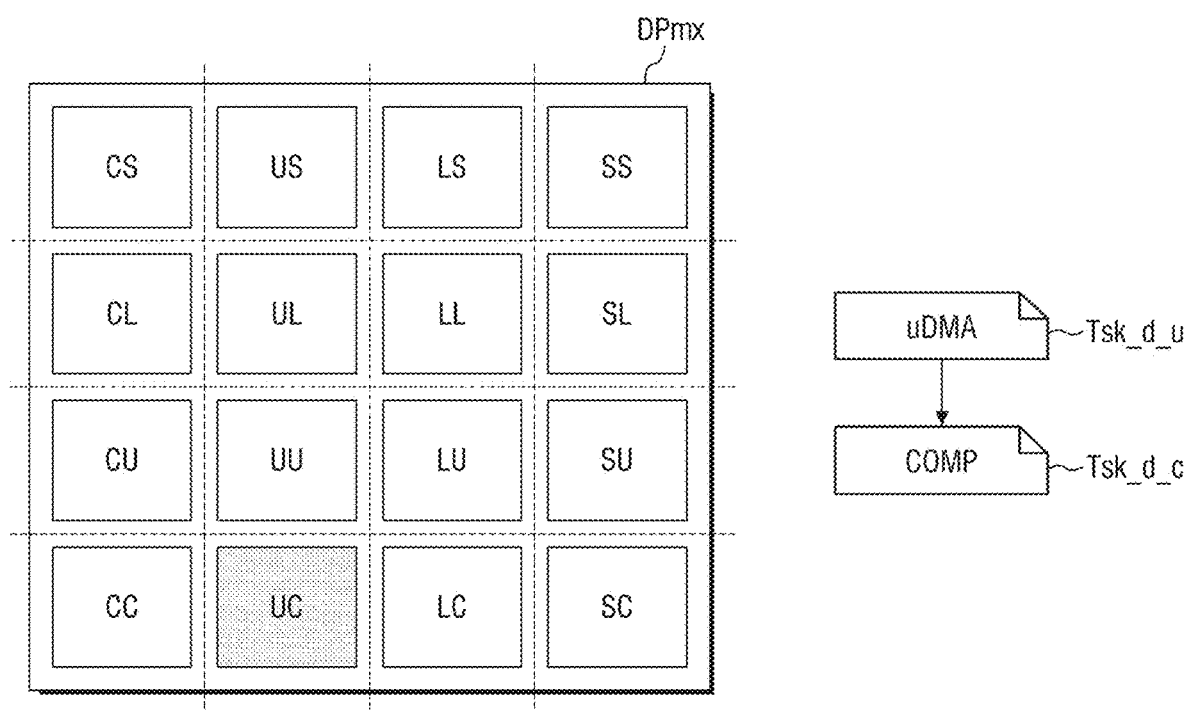
FIGS. 27 to 30 are example diagrams for illustrating operation of the dependency matrix.

Referring to FIGS. 26 and 27, the current COMP task represented by a COMP task descriptor task_d_c belonging to a group depends on the previous uDMA task represented by a uDMA task descriptor task descriptor Tsk_d_u belonging to the same group. In this scenario, a dependency check code of the COMP task descriptor of the current COMP task may be [0 1 0 0].

If the previous uDMA task belonging to the group is completed, an element UC associated with the current COMP task and associated with the previous uDMA task in the dependency matrix DPmx is set equal to 1 by a dependency set code [1 0 0 0], and thereby a row vector associated with the current COMP task may be [0 1 0 0].

Because the dependency check code of the COMP task descriptor of the current COMP task is matched with the row vector associated with the current COMP task in the dependency matrix DPmx, the task manager 600 may determine that all previous tasks which the current COMP task depend on are completed.

Figure 28:
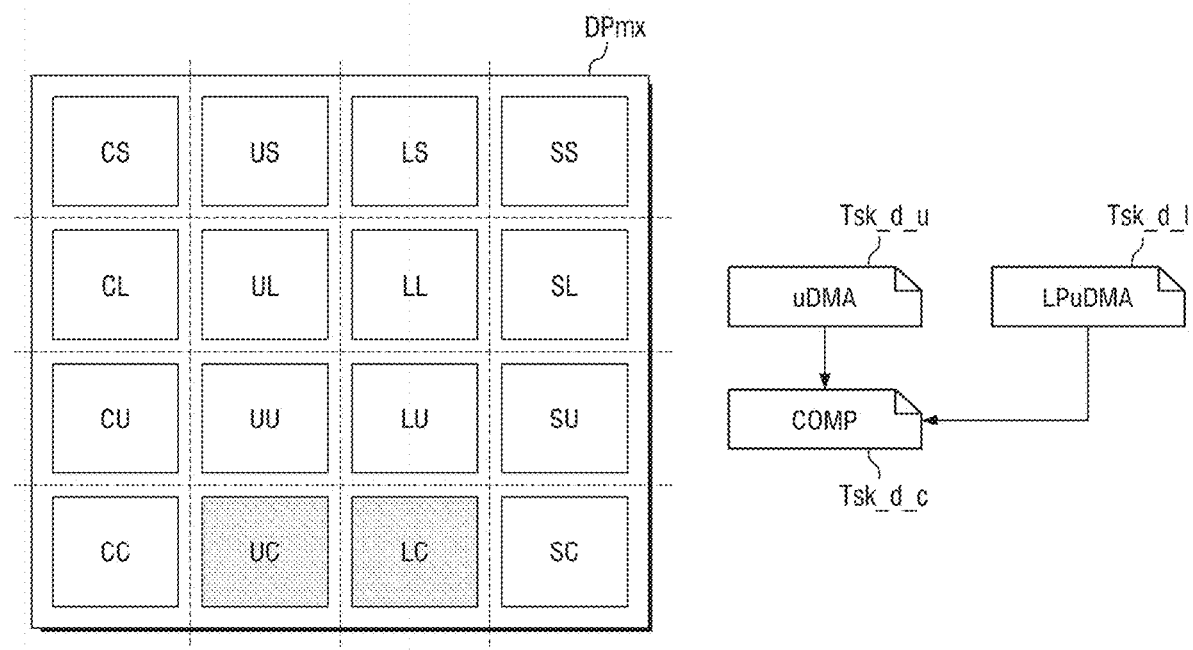

Referring to FIGS. 26 and 28, the current COMP task represented by a COMP task descriptor task_d_c belonging to a group depends on the previous uDMA task represented by a uDMA task descriptor task descriptor Tsk_d_u belonging to the same group and previous LPuDMA task represented by a LPuDMA task descriptor task descriptor Tsk_d_u belonging to the same group. In this scenario, a dependency check code of the COMP task descriptor of the current COMP task may be [0 1 1 0].

If the previous uDMA task belonging to the group is completed, an element UC associated with the current COMP task and associated with the previous uDMA task in the dependency matrix DPmx is set equal to 1 by a dependency set code [1 0 0 0]. If the LPuDMA belonging to the group is completed, an element LC associated with the current COMP task and associated with the previous LPuDMA task in the dependency matrix DPmx is set equal to 1 by a dependency set code [1 0 0 0]. After all, a row vector associated with the current COMP task may become [0 1 1 0].

Because the dependency check code of the COMP task descriptor of the current COMP task is matched with the row vector associated with the current COMP task in the dependency matrix DPmx, the task manager 600 may determine that all previous tasks which the current COMP task depend on are completed.

Figure 29:
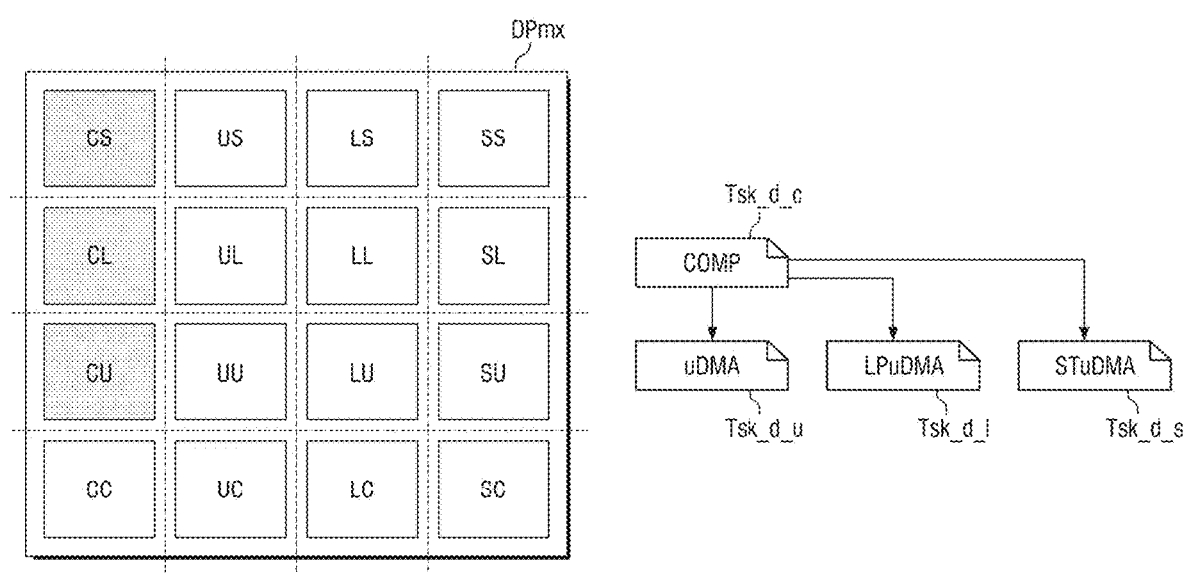

Referring to FIGS. 26 and 29, the current uDMA task represented by a uDMA task descriptor task_d_u belonging to a group depends on the previous COMP task represented by a COMP task descriptor task descriptor Tsk_d_c belonging to the same group. In this scenario, a dependency check code of the uDMA task descriptor of the current uDMA task may bbe [1 0 0 0].

The current LPuDMA task represented by a LPuDMA task descriptor task_d_1 belonging to the same group depends on the previous COMP task represented by a COMP task descriptor task descriptor Tsk_d_c belonging to the same group. In this scenario, a dependency check code of the LPuDMA task descriptor of the current LPuDMA task may be [1 0 0 0].

The current STuDMA task represented by a STuDMA task descriptor task_d_s belonging to the same group depends on the previous COMP task represented by a COMP task descriptor task descriptor Tsk_d_c belonging to the same group. In this scenario, a dependency check code of the STuDMA task descriptor of the current STuDMA task may be [1 0 0 0].

If the previous COMP task belonging to the group is completed, an element CU associated with the current uDMA task and associated with the previous COMP task, an element CL associated with the current LPuDMA task and associated with the previous COMP task, and an element CS associated with the current STuDMA task and associated with the previous COMP task in the dependency matrix DPmx are set equal to 1 by a dependency set code [0 1 1 1].

After all, a row vector associated with the current uDMA task may become [1 0 0 0]. Because the dependency check code of the uDMA task descriptor of the current uDMA task is matched with the row vector associated with the current uDMA task in the dependency matrix DPmx, the task manager 600 may determine that all previous tasks which the current uDMA task depend on are completed.

In addition, a row vector associated with the current LPuDMA task may become [1 0 0 0]. Because the dependency check code of the LPuDMA task descriptor of the current LPuDMA task is matched with the row vector associated with the current LPuDMA task in the dependency matrix DPmx, the task manager 600 may determine that all previous tasks which the current LPuDMA task depend on are completed.

Moreover, a row vector associated with the current STuDMA task may become [1 0 0 0]. Because the dependency check code of the STuDMA task descriptor of the current STuDMA task is matched with the row vector associated with the current STuDMA task in the dependency matrix DPmx, the task manager 600 may determine that all previous tasks which the current STuDMA task depend on are completed.

Figure 30:
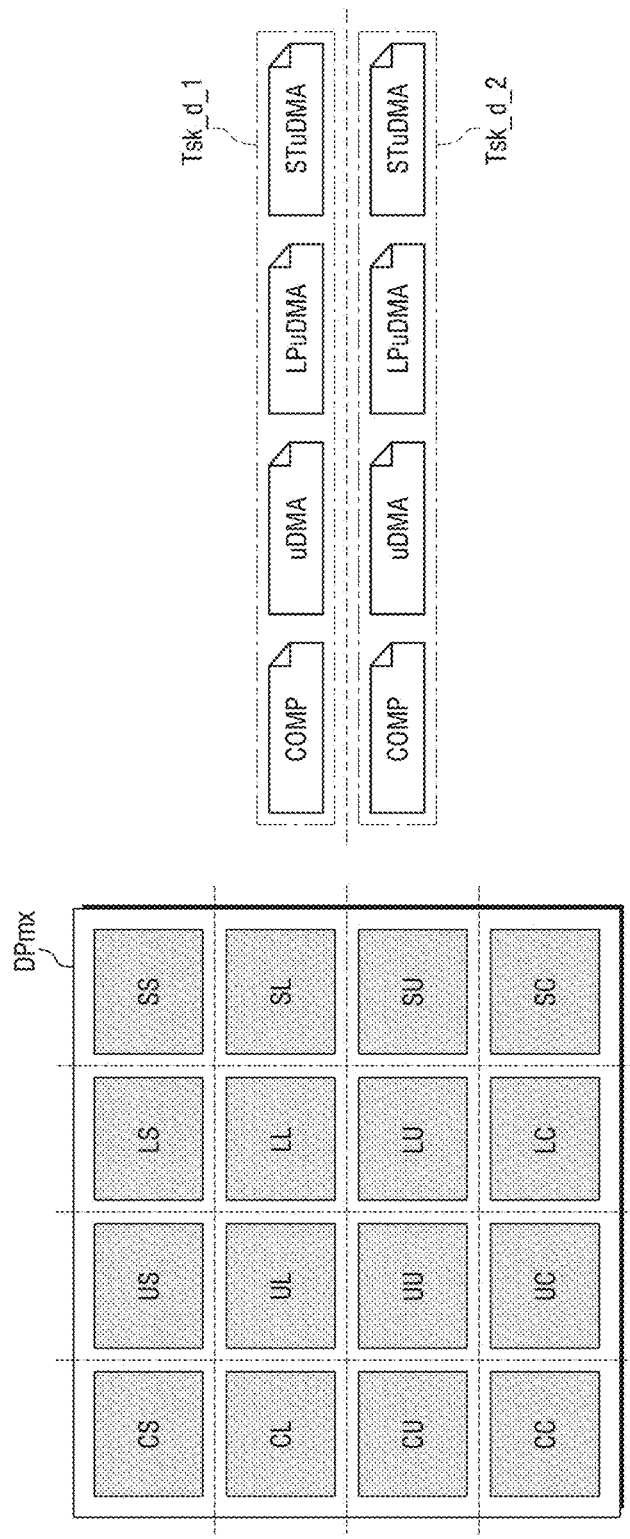

Referring to FIGS. 26 and 30, a current COMP task belonging to a group depends on a previous COMP task, a previous uDMA task, a previous LPuDMA task, and a previous STuDMA task belonging to the same group. In this scenario, a dependency check code of the current COMP task may be [1 1 1 1]. The current uDMA task belonging to a group depends on a previous COMP task, a previous uDMA task, a previous LPuDMA task, and a previous STuDMA task belonging to the same group. In this scenario, a dependency check code of the current uDMA task may be [1 1 1 1]. The current LPuDMA task belonging to a group depends on a previous COMP task, a previous uDMA task, a previous LPuDMA task, and a previous STuDMA task belonging to the same group. In this scenario, a dependency check code of the current LPuDMA task may be [1 1 1 1]. The current STuDMA task belonging to a group depends on a previous COMP task, a previous uDMA task, a previous LPuDMA task, and a previous STuDMA task belonging to the same group. In this scenario, a dependency check code of the current previous STuDMA task may be [1 1 1 1]. In some embodiments, the previous COMP task, the previous uDMA task, the previous LPuDMA task, and the previous STuDMA task may be represented by the task descriptor Tsk_d_1 and the current COMP task, the current uDMA task, the current LPuDMA task, and the current STuDMA task may be represented by the task descriptor Tsk_d_2.

If the previous COMP task belonging to the group is completed, elements CC, CU, CL, and CS in the dependency matrix DPmx are set equal to 1 by a dependency set code [1 1 1 1]. If the previous uDMA task belonging to the group is completed, elements UC, UU, UL, and US in the dependency matrix DPmx are set equal to 1 by a dependency set code [1 1 1 1]. If the previous LPuDMA task belonging to the group is completed, elements LC, LU, LL, and LS in the dependency matrix DPmx are set equal to 1 by a dependency set code [1 1 1 1]. If the previous STuDMA task belonging to the group is completed, elements SC, SU, SL, and SS in the dependency matrix DPmx are set equal to 1 by a dependency set code [1 1 1 1].

After all, a row vector associated with the current COMP task may become [1 1 1 1]. Because the dependency check code of the current COMP task is matched with the row vector associated with the current COMP task in the dependency matrix DPmx, the task manager 600 may determine that all previous tasks which the current COMP task depend on are completed.

In addition, a row vector associated with the current uDMA task may become [1 1 1 1]. Because the dependency check code of the current uDMA task is matched with the row vector associated with the current uDMA task in the dependency matrix DPmx, the task manager 600 may determine that all previous tasks which the current uDMA task depend on are completed.

A row vector associated with the current LPuDMA task may become [1 1 1 1]. Because the dependency check code of the current LPuDMA task is matched with the row vector associated with the current LPuDMA task in the dependency matrix DPmx, the task manager 600 may determine that all previous tasks which the current LPuDMA task depend on are completed.

A row vector associated with the current STuDMA task may become [1 1 1 1]. Because the dependency check code of the current STuDMA task is matched with the row vector associated with the current STuDMA task in the dependency matrix DPmx, the task manager 600 may determine that all previous tasks which the current STuDMA task depend on are completed.

In the embodiment, the task manager 600 can thereby quickly check and process the dependencies of the respective tasks without additional data exchange with the command processor 7000. As a result, the speed of task processing can be improved, and sequential processing between tasks can be performed smoothly.

Figure 31:
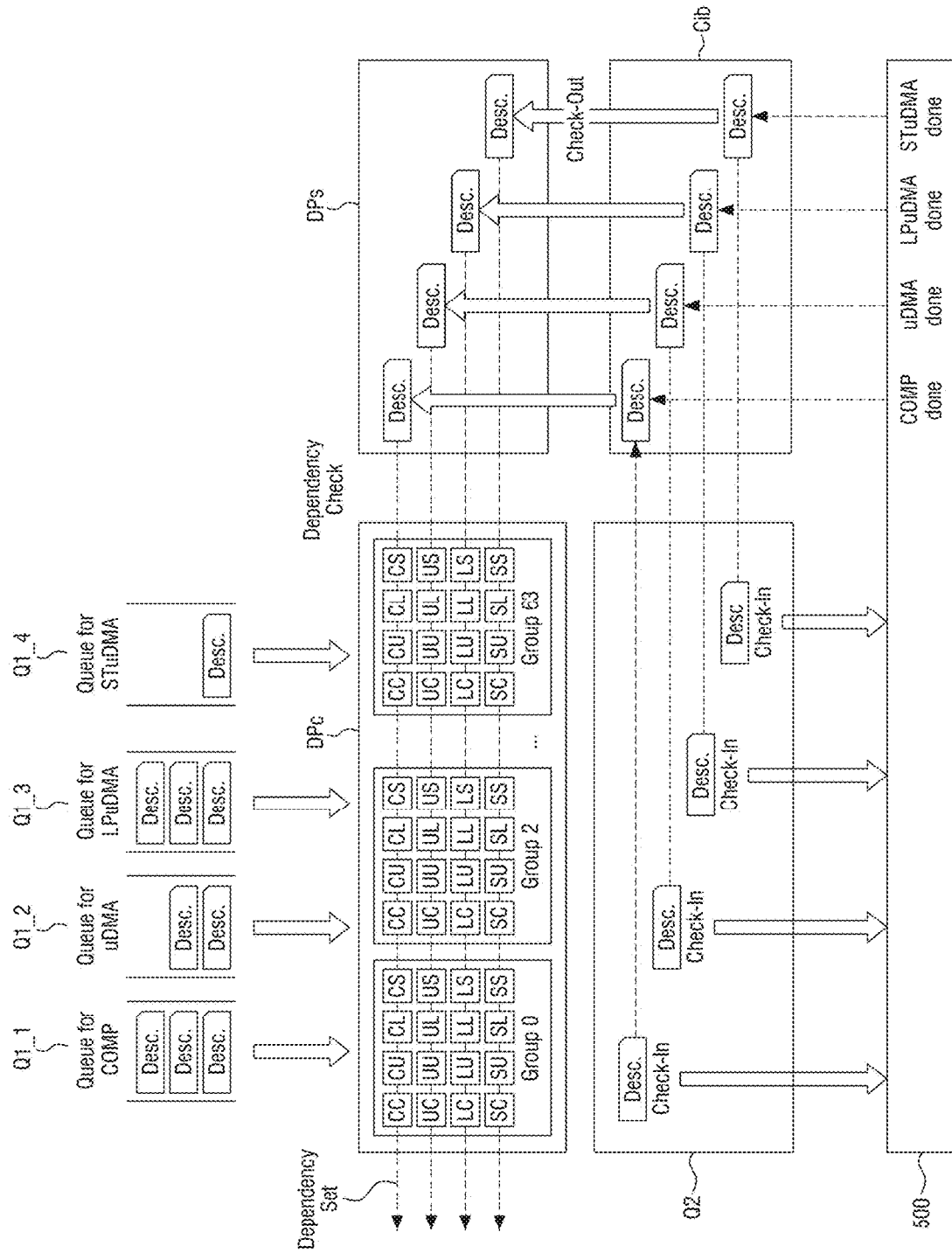
FIG. 31 is a diagram for illustrating a plurality of dependency matrices in the dependency checker.

FIG. 31 is a diagram for illustrating a plurality of dependency matrices in the dependency checker.

Referring to FIG. 31, the dependency checker DPc may include a plurality of dependency matrices. In some embodiments, tasks may be grouped and each task may belong to a respective one group of a plurality of groups. Each of the plurality of dependency matrices may be associated with a respective one of the plurality of groups. Each of the plurality of dependency check matrices may include a rectangular array of elements in arranged in rows and columns. Each of the row may be associated with a respective one of the plurality of task types. Each of the columns may be associated with a respective one of the plurality of task types. A respective one element of the elements in the rectangular array may represent whether a reference task which has a type associated with a column of the respective one element in the rectangular array and which a task of a type associated with a row of the respective one element in the rectangular array depends on is completed. In some embodiments, the number of rows and columns of each of the plurality of dependency check matrices may be, but not limited to, 4. In some embodiments, the number of queues in the first queue group Q1, queues in the second queue group Q2, and check-in buffers of the done passage 630 and the number of each of the rows and columns of the first dependency matrix DPmx_1 may all be the same.

The dependency checker DPc may determine whether reference tasks which a currently-waiting task in the first queue group Q1 depends on are completed by comparing the dependency check code of the currently-waiting task and a vector associated with the currently-waiting task in a dependency check matrix indicated by the dependency check group code of the currently-waiting task. Referring to FIG. 31, the vector with the currently-waiting task is a column vector with the currently-waiting task. Referring to FIG. 26, the vector with the currently-waiting task is a row vector with the currently-waiting task. In some embodiments, in case that the dependency check group code of the currently-waiting task indicates a j-th group and the currently-waiting task has a k-th type (for example, j=0 . . . 63, k=1 . . . 4), the dependency checker DPc may determine that reference tasks which the currently-waiting task depends on are completed, when the dependency check code of the currently-waiting task is matched a k-th column vector associated with the currently-waiting task in a j-th dependency check matrix.

The dependency checker DPc may transfer the currently-waiting task from the first queue group Q1 to the second queue group Q2 in response to determining that the reference tasks which the currently-waiting task depends on are completed. The runtime handle RH may check in tasks in the second queue group Q2 by transferring tasks in the second queue group Q2 to the core global 500 and transferring tasks in the second queue group Q2 to the check-in buffer Cib.

The dependency setter DPs may check out a respective one task of tasks in the check-in buffer Cib in response to a completion signal indicating that the respective one task is completed. When the dependency setter DPs checks out a respective one task, the dependency setter DPs may update a row vector associated with the completed task in a dependent check matrix indicated by the dependency set group code of the completed task based on a dependency set code of the complete task. In some embodiments, in case that the dependency set group code of the completed task indicates a j-th group and the completed task has a k-th type (for example, j=0 . . . 63, k=1 . . . 4), the dependency setter DPs may set the k-th row vector associated with the completed task in the j-th dependent check matrix equal to a dependency set code of the complete task.

Figure 32:
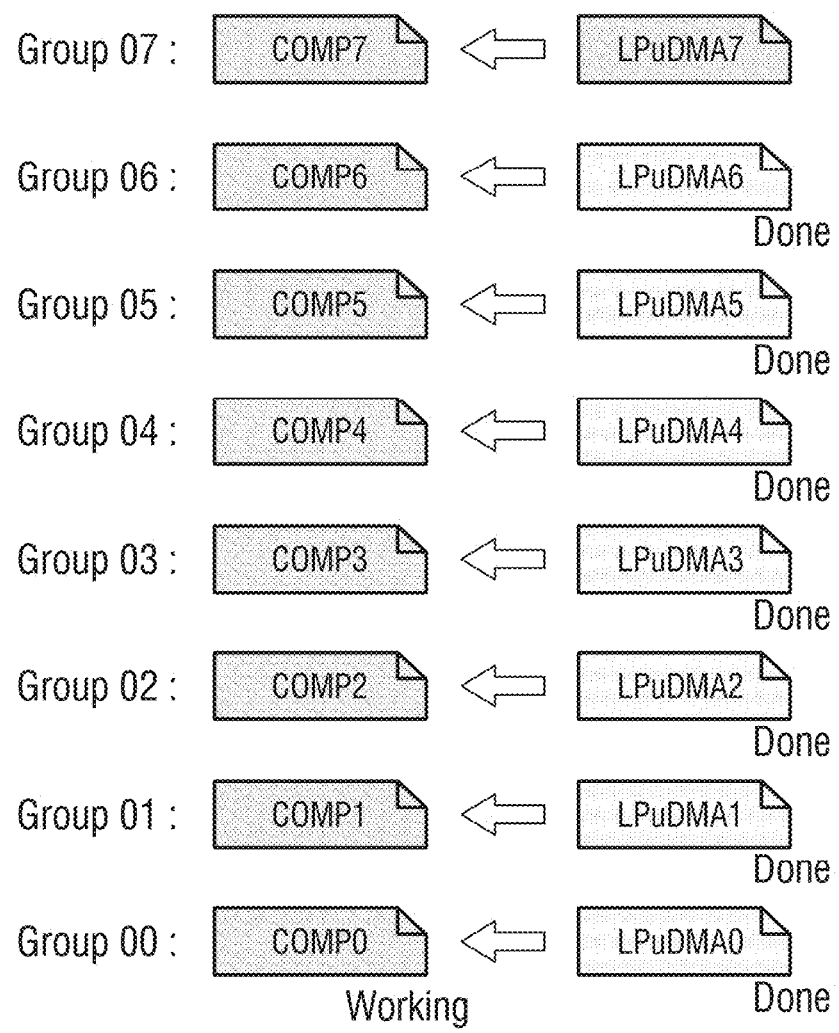
FIG. 32 is a conceptual diagram for illustrating a latency reduction effect according to each group.

FIG. 32 is a conceptual diagram for illustrating a latency reduction effect according to each group.

Referring to FIG. 32, an additional latency may occur for the same type of dependency if there is one dependency matrix. In some embodiments, for example, if there is one dependency matrix from LPuDMA to COMP, a second LPuDMA may be set after a first LPuDMA is completed and set, a first COMP is transferred, and the dependency matrix is cleared.

In contrast, if there are several groups of dependency matrices, the LPuDMA may be completed and set in the second group immediately without having to wait for the first COMP to be transferred. Further, there is no need to wait for the first LPuDMA to be completed and set. Therefore, latency due to checking and setting can be minimized, and the speed of the entire device can thus be increased dramatically.

Figure 33:
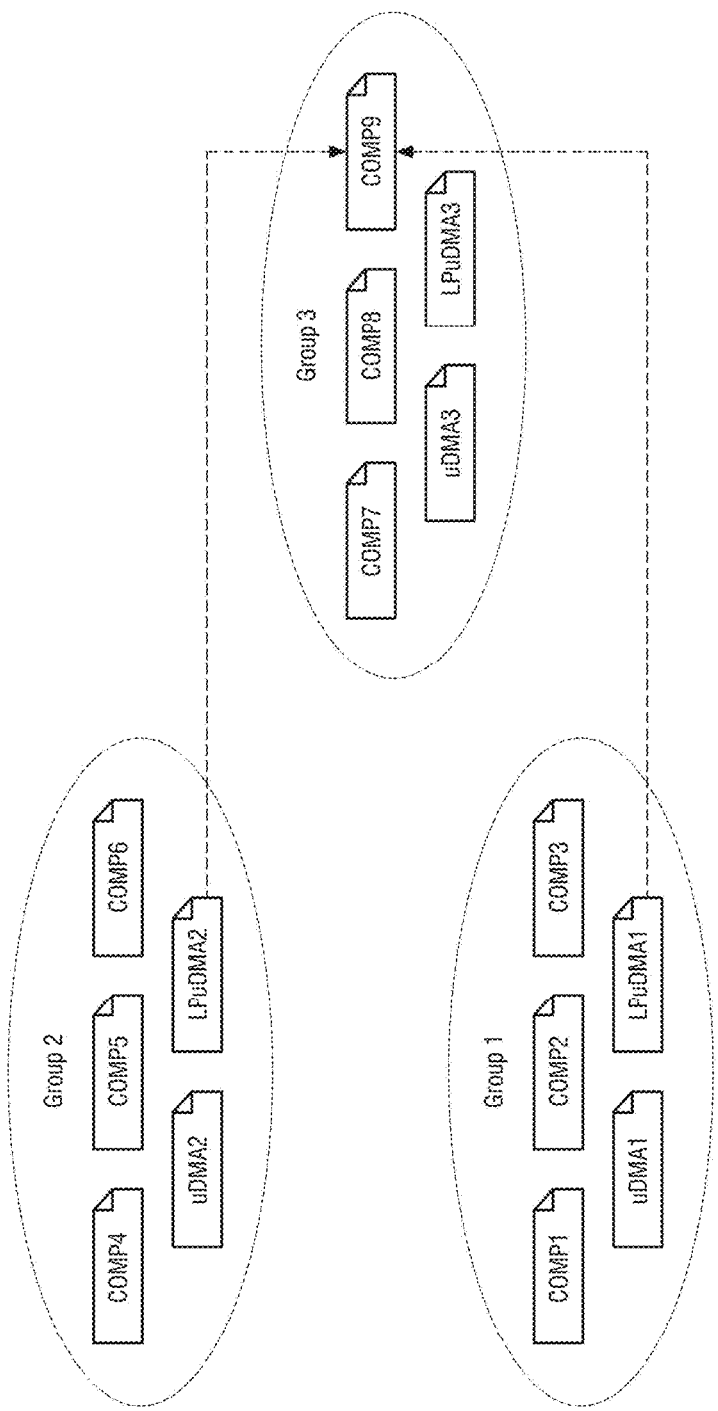
FIG. 33 is an example diagram for illustrating a plurality of task descriptors and one task descriptor whose dependency is checked in different dependency matrices.

FIG. 33 is an example diagram for illustrating a plurality of task descriptors and one task descriptor whose dependency is checked in different dependency matrices.

Referring to FIG. 33, tasks COMP1, COMP2, COMP3, uDMA1, and LPuDMA1 belong to a group 1, tasks COMP4, COMP5, COMP6, uDMA2, and LPuDMA2 belong to a group 2, and tasks COMP7, COMP8, COMP9, uDMA3, and LPuDMA3 belong to a group 3. The task COMP9 belonging to the group 3 depends on both the LPuDMA1 task and the LPuDMA2 task. Accordingly, it is in a state in which dependencies are formed from two task descriptors of different groups to one task descriptor of another group.

Figure 34:
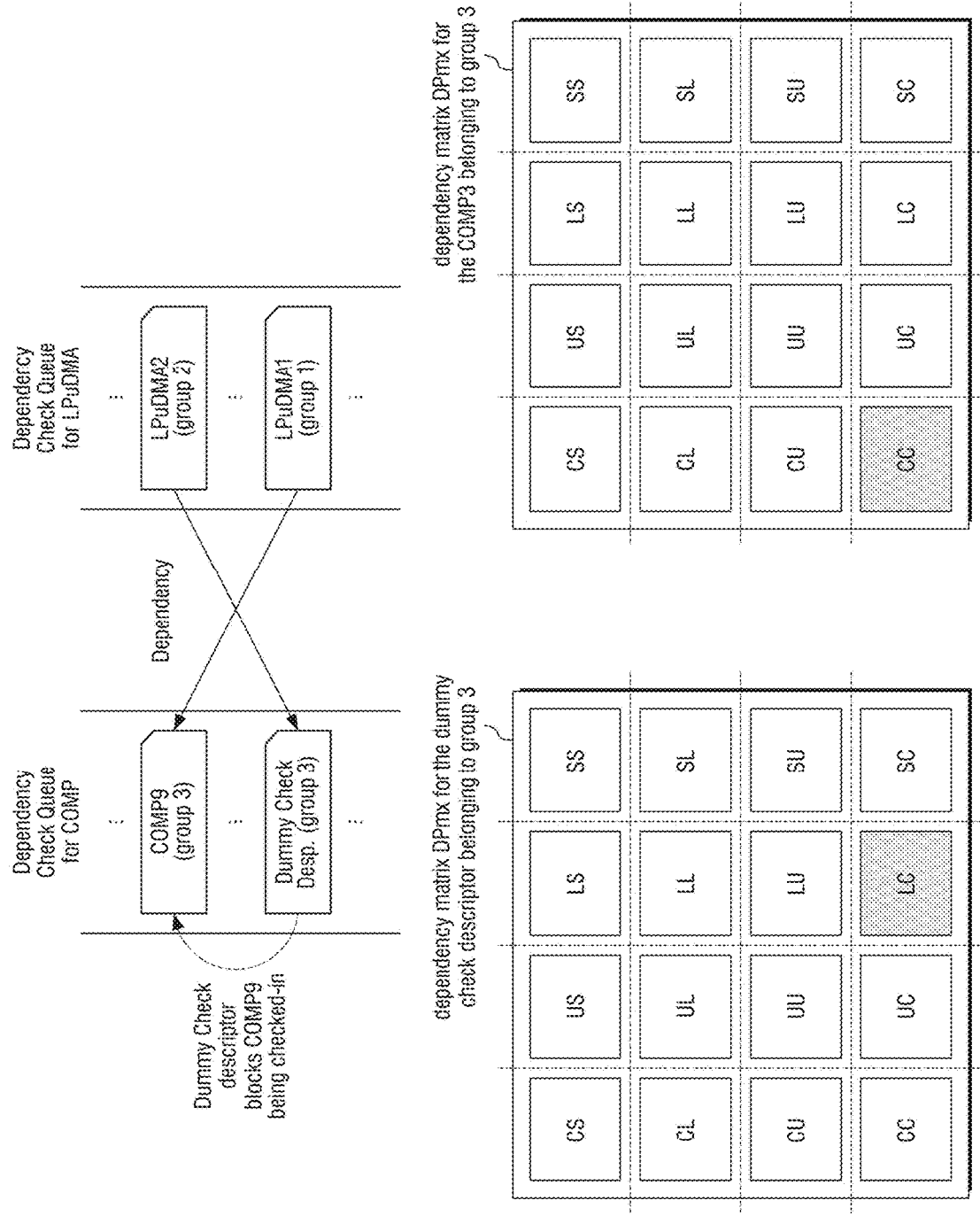
FIG. 34 is a diagram for illustrating a dummy check descriptor.

FIG. 34 is a diagram for illustrating a dummy check descriptor.

Referring to FIG. 34, since COMP9 belonging to group 3 depends on both LPuDMA1 belonging to the group 1 and LPuDMA2 belonging to group 2, COMP9 may be transmitted and executed only after both LPuDMA2 and LPuDMA1 are checked out.

A task descriptor of the COMP9 may include a dependency check information field indicating that the COMP9 depends on the LPuDMA1 belonging to the group 1. In order for the task COMP9 to additionally depend on the task LPuDMA2 belonging to the group 2, the task descriptor of the COMP9 should also include additional dependency check information field indicating that the COMP9 depends on the LPuDMA2 belonging to the group 2, but this may make the size and complexity of the task descriptor increase, because one task may depend on many reference tasks. Accordingly, a dummy check task in a form of a descriptor may be used to increase flexibility in dependency construction.

In some embodiments, COMP9 task belonging to the group 3 may be stored in the dependency check waiting queue for COMP. The LPuDMA1 belonging to the group 1 and the LPuDMA2 task belonging to the group 2 may be stored in the dependency check waiting queue for LPuMDA. In addition, a COMP type of a dummy check descriptor which depends on the task LPuDMA2 and belongs to group 3 may be generated and stored in the dependency check waiting queue for COMP as a preceding task of the COMP9.

In some embodiments, even if the task LPuDMA1 is completed before the LPuDMA2 is completed, an element LC in the dependency matrix DPmx for the COMP9 belonging to the group 3 may not be set equal to 1, because a currently-waiting task is not the task COMP9 but the dummy check descriptor. In this scenario, the dummy check descriptor may block the COMP9 task from being checked-in, because a preceding task has priority over the subsequent task for the same group in the same queue. When the LPuDMA2 is completed, an element LC in the dependency matrix DPmx for the dummy descriptor belonging to the group 3 may be set equal to 1 by a dependency set code [1 0 0 0], and thereby a row vector associated with the COMP type for the group 3 may be [0 0 1 0].

The dummy check descriptor of the dummy check task may have a dependency check code [0 0 1 0]. Because the dependency check code [0 0 1 0] for the dummy check descriptor is matched with a row vector associated with the current COMP task in the dependency matrix DPmx for the group 3, the dummy check descriptor may be burnt out without being checked-in or being transferred to the neural core to be executed.

After the dummy check descriptor is burnt out, a currently-waiting task may become the task COMP9 and an element LC in the dependency matrix DPmx for the task COMP9 belonging to the group 3 may be set equal to 1 by a dependency set code [1 0 0 0] which is generated by completion of the task LPuDMA1. Because the dependency check code [0 0 1 0] for the task COMP9 is matched with a row vector associated with the current COMP task in the dependency matrix DPmx for the group 3, the task COMP9 may be check-in and transferred to the neural core to be executed.

In some embodiments, if a plurality of dependencies are set, all the remaining dependencies except for the subsequent task descriptor itself may be processed with dummy check descriptors. For example, three dependencies may need two dummy check descriptors. In the embodiment, many-to-one dependencies between different groups can be processed freely via a plurality of groups.

Figure 35:
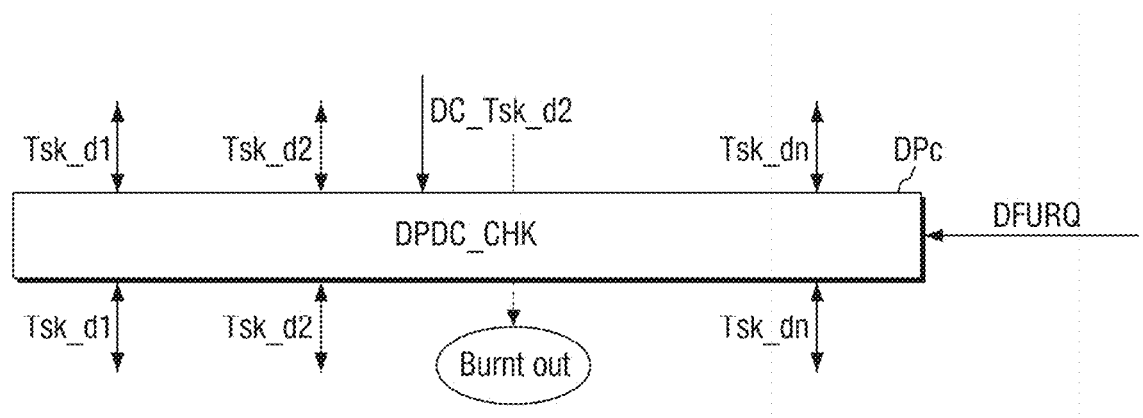
FIG. 35 is a diagram for illustrating the dummy check descriptor being burnt out in the dependency checker.

FIG. 35 is a diagram for illustrating the dummy check descriptor being burnt out in the dependency checker.

Referring to FIG. 35, for example, a second dummy check descriptor DC_Tsk_d2 may be received by the dependency checker DPc. The dummy check descriptors may be generated by the command processor 7000 and received only when necessary, and may thus be received by the dependency checker DPc in response to some task descriptors rather than all task descriptors.

The dependency checker DPc can identify task descriptors and dummy check descriptors out of the received descriptors. Further, dummy set descriptors and dummy check descriptors can be identified as well. In some embodiments, identification can be made because the task descriptors and the dummy set descriptors must be checked out via the dependency checker DPc, but the dummy check descriptors do not require it.

The second dummy check descriptor DC_Tsk_d2 may be burnt out within the dependency checker DPc when the dependency check is completed. In some embodiments, the second dummy check descriptor DC_Tsk_d2 does not need to be transmitted to the core global 500 or checked out, and can thus be burnt out by the dependency checker DPc.

Figure 36:
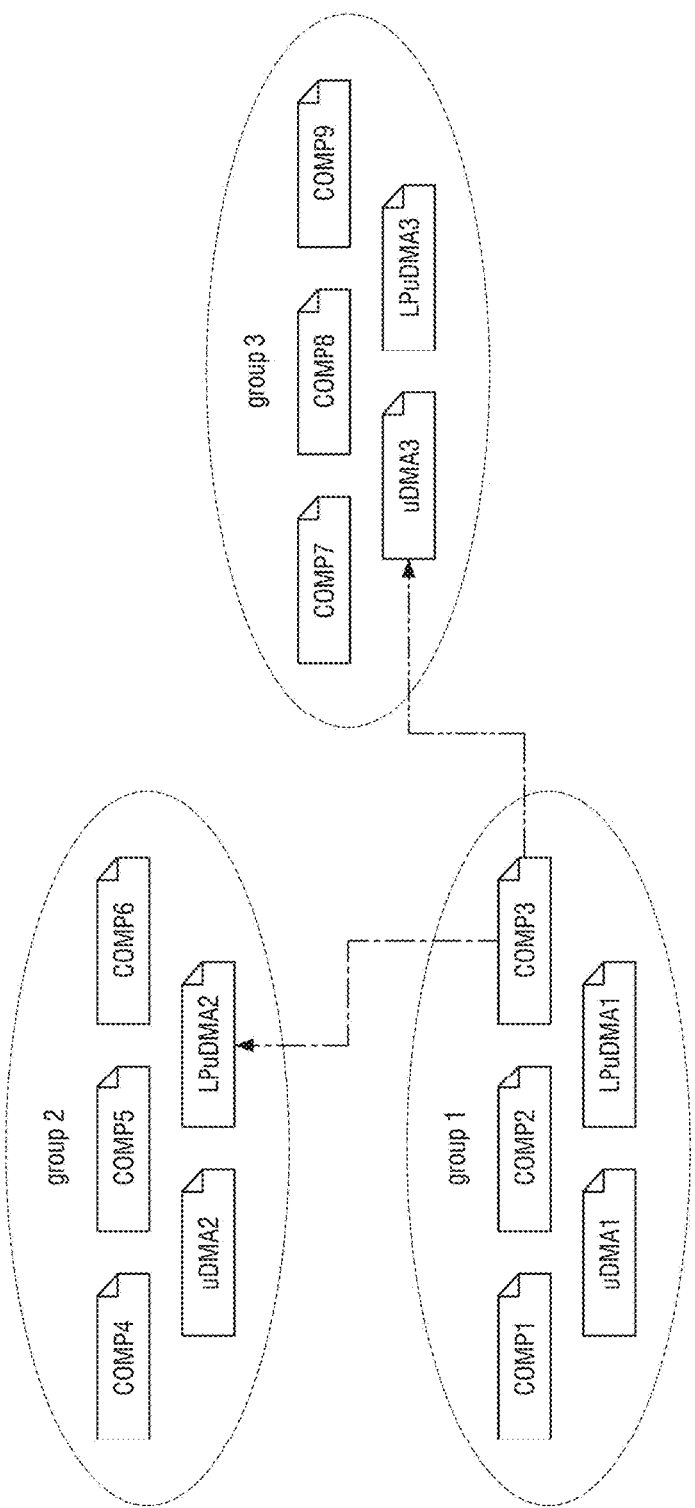
FIG. 36 is an example diagram for illustrating one task descriptor and a plurality of task descriptors whose dependencies are checked in different dependency matrices.

FIG. 36 is an example diagram for illustrating one task descriptor and a plurality of task descriptors whose dependencies are checked in different dependency matrices.

In an embodiment, one task descriptor may depend on a plurality of reference task descriptors, but the plurality of task descriptors may be configured such that dependencies are checked in different dependency matrices.

Referring to FIG. 36, the LPuDMA2 for the group 2 depends on the task COMP3 for the group 1 and the uDMA3 for the group 3 depends on the same task COMP3 for the group 1.

However, a dependency update request DFURQ generated as one task descriptor is checked out may be generated in response to one dependency matrix. In some embodiments, one dependency update request DFURQ cannot update two dependency matrices at the same time.

Illustratively, as the third computation task descriptor COMP3 is checked out, only the third dependency update request DFURQ is generated and only the group 3 is updated, so that dependency setting for the third micro-DMA task descriptor uDMA3 may be performed. In some embodiments, an update to the group 2 and a dependency setting to the second LP micro-DMA task descriptor LPuDMA2 are required, but these are not performed in response to the checkout of the third computation task descriptor COMP3.

In an embodiment of the disclosure, if a particular task descriptor has formed a dependency with a plurality of task descriptors whose dependencies are checked in different dependency matrices, the command processor 7000 may configure a dummy set descriptor corresponding to the particular task descriptor so that a dependency setting can be performed in other dependency matrices as well. In some embodiments, dependency settings for the rest of the dependency matrices proceed through the dummy set descriptor.

Figure 37:
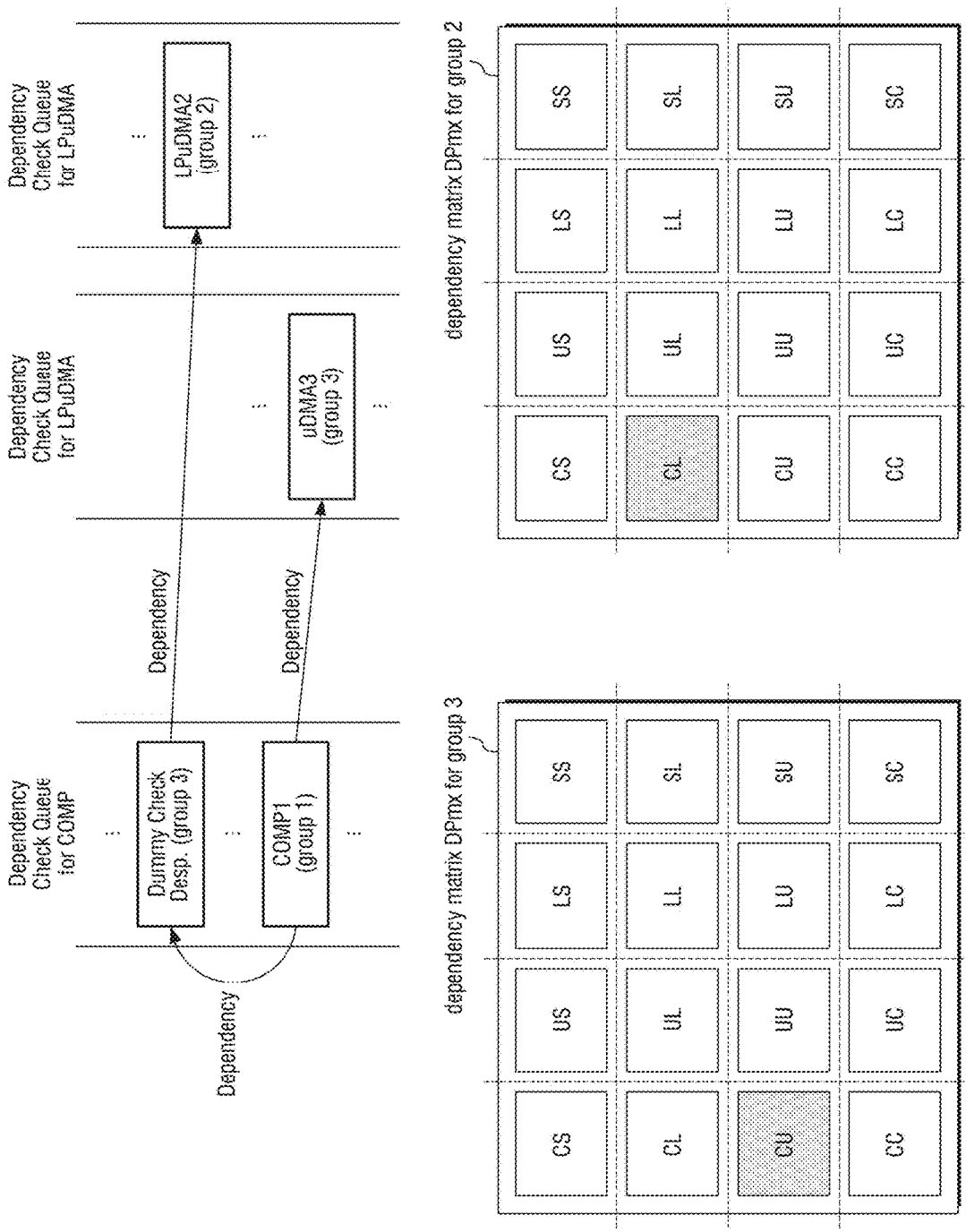
FIG. 37 is a diagram for illustrating a dummy set descriptor.

FIG. 37 is a diagram for illustrating a dummy set descriptor.

As shown in FIG. 36, the LPuDMA2 for the group 2 depends on the task descriptor COMP1 for the group 1 and the task descriptor uDMA3 for the group 3 depends on the same task descriptor COMP1 for the group 1.

Referring to FIG. 37, the task descriptor COMP1 may include a dependency set information field indicating that the task descriptor uDMA3 for the group 3 depends on the task descriptor COMP1 for the group 1. In order for the task descriptor LPuDMA2 for the group 2 to depend on the task descriptor COMP1 for the group 2, the task descriptor COMP1 should also include a dependency set information field indicating that the task descriptor LPuDMA2 depends on the task descriptor COMP1, but this may make the size and complexity of the task descriptor increase, because one task may depend on many reference tasks. Accordingly, a dummy set task in a form of a descriptor may be used to increase flexibility in dependency construction.

In some embodiments, the task descriptor COMP1 belonging to the group 1 may be stored in the dependency check waiting queue for COMP. The task descriptor uDMA3 belonging to the group 3 may be stored in the dependency check waiting queue for uMDA. The task descriptor LPuDMA2 belonging to the group 2 may be stored in the dependency check waiting queue for LPuMDA. In addition, a dummy dependency set descriptor for a dummy dependency set task indicating that the task descriptor LPuDMA2 depends on the dummy dependency set task may be generated and stored in the dependency check waiting queue for COMP.

In some embodiments, the task COMP1 for the group 1 may be executed. If the task COMP1 is completed, an element CU in the dependency matrix DPmx for the group 3 may be set equal to 1 by a dependency set code [0 1 0 0] because task descriptor COMP1 may indicate that the task descriptor uDMA3 for the group 3 depends on the task descriptor COMP1 for the group 1. Since the dependency check code [1 0 0 0] of the task uDMA3 is matched with a row vector [1 0 0 0] associated with the task descriptor uDMA3, the task uDMA3 may be transferred to the core global 500 and checked-in.

In some embodiments, the dummy dependency set task may be executed by the void core 640. If the dummy dependency set task is completed, the void core may cause an element CL in the dependency matrix DPmx for the group 2 to be set equal to 1 by a dependency set code [0 0 1 0] because the dummy dependency set descriptor indicates that the task type of the dummy dependency set task is COMP and that the task descriptor LPuDMA2 depends on the dummy dependency set task corresponding to the dummy dependency set descriptor. Since the dependency check code [1 0 0 0] of the task LPuDMA2 is matched with a row vector [1 0 0 0] associated with the task descriptor LPuDMA2, the task LPuDMA2 may be transferred to the core global 500 and checked-in.

Figure 38:
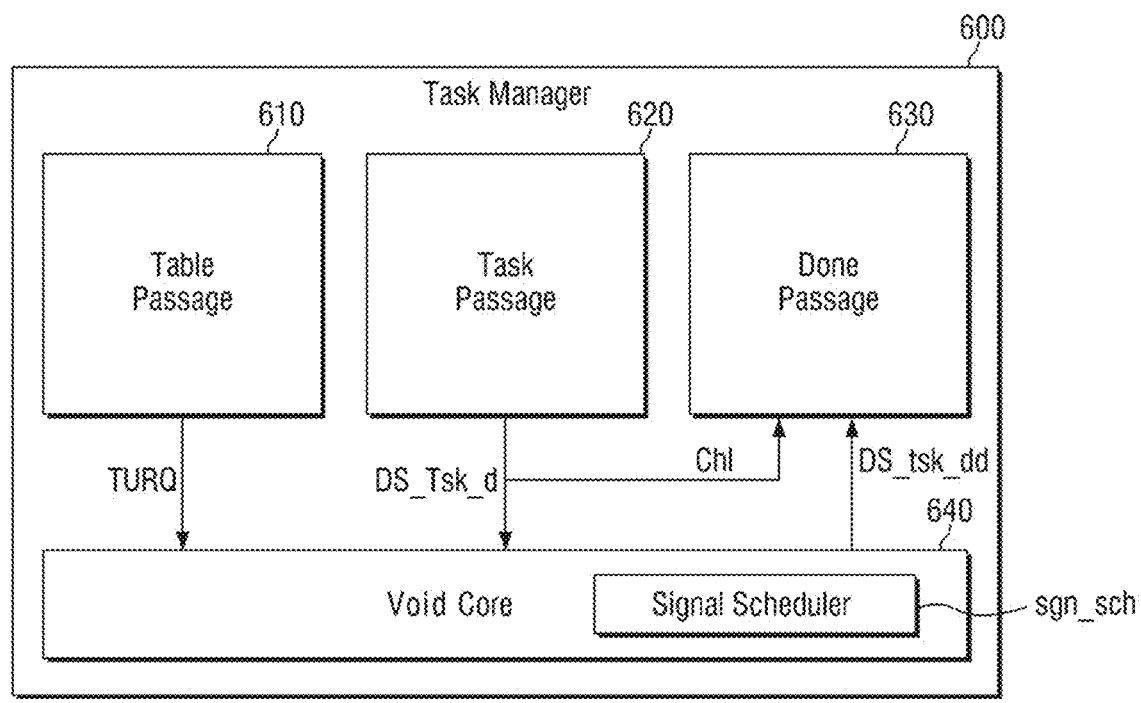
FIG. 38 is a diagram for illustrating a data exchange process performed in the void core of FIG. 15.

FIG. 38 is a diagram for illustrating a data exchange process performed in the void core of FIG. 15.

In FIG. 38, the task descriptor DS_Tsk_d outputted from the task passage 620 is a task descriptor on which a dependency check has been performed, and corresponds to a dummy set descriptor of a particular task descriptor. However, the dummy set descriptor DS_Tsk_d is not provided to the neural core 100 but to the void core 640. In some embodiments, the dummy set descriptor DS_Tsk_d is not provided to the core global 500 and a completion signal DS_tsk_dd is generated via the void core 640.

In an embodiment, a task descriptor requiring actual computations or operations are performed may be referred to as a real task descriptor or a non-dummy task descriptor, and a task descriptor requiring no actual computation or operation may be referred to as a dummy task descriptor. In addition, a task descriptor configured to set an update to a particular dependency matrix in the dummy task descriptor may be referred to as a dummy set descriptor.

In some embodiments, the task passage 620 can identify types of task descriptors, and if a task descriptor is a real task descriptor, i.e., if it contains information related to actual computations or operations, it may process the corresponding task descriptor to be provided to the core global 500. Further, the task passage 620 may process the corresponding task descriptor to be provided to the void core 640 if the task descriptor is a dummy set descriptor. In some embodiments, determination of the types of task descriptors may be performed in the runtime handle RH, but is not limited thereto, and may be performed in the dependency checker DPc as well.

In some embodiments, the dummy set descriptor DS_Tsk_d on which a dependency check has been performed may be transferred to the second queue. The runtime handle RH may identify and provide the dummy set descriptor DS_Tsk_d waiting in the second queue to the void core 640. In some embodiments, the dependency checker DPc may also identify the type of task descriptor along with the dependency check. The dependency checker DPc may transfer the dummy set descriptor DS_Tsk_d to the void core 640 without going through the second queue group Q2 and the runtime handle RH.

The void core 640 may receive the dummy set descriptor DS_Tsk_d on which the dependency check has been performed from the task passage 620. The task passage 620 may transfer check-in data Ch1 corresponding to the dummy set descriptor DS_Tsk_d to the done passage 630 while providing the dummy set descriptor DS_Tsk_d to the void core 640.

Specifically, the dependency checker DPc of the task passage 620 may transfer the check-in data Ch1 corresponding to the dummy set descriptor DS_Tsk_d to the check-in buffer Cib of the done passage 630. The check-in buffer Cib waits for a completion signal of the task according to the provided check-in data Ch1.

The void core 640 may generate a completion signal DS_tsk_dd in response to the provided dummy set descriptor DS_Tsk_d. The void core 640 may transfer the generated completion signal DS_tsk_dd to the done passage 630. In an embodiment, the void core 640 may include a signal scheduler sgn_sch. The signal scheduler sgn_sch may receive the completion signal DS_tsk_dd, schedule the transmission of the completion signal DS_tsk_dd, and transmit it to the done passage 630. In some embodiments, the signal scheduler sgn_sch may control the time when the generated completion signal is transferred to the done passage 630.

Furthermore, since the void core 640 does not perform actual computations or operations, the table update request TURQ may be deleted rather than being transferred to the LSU 110 of the neural core 100.

The check-in buffer Cib of the done passage 630 may receive the completion signal from the void core 640, and the dependency setter DPs may receive the completion signal from the check-in buffer Cib and generate a dependency update request DFURQ. The dummy set descriptor DS_Tsk_d may include information about dependent task descriptors having a dependency relationship with the dummy set descriptor DS_Tsk_d and dependency matrix information in which the dependent task descriptors are checked. The dependency setter DPs may generate a dependency update request DFURQ including the dependency information of the dummy set descriptor DS_Tsk_d in response to the completion signal, and transfer the generated dependency update request DFURQ to the corresponding dependency matrix, thereby causing the dependency information in the dependency field to be updated.

In some embodiments, through the dummy set descriptors, dependency settings for a plurality of dependency matrices can proceed without causing duplication of task computations and/or operations.

In the embodiment, the task manager 600 can thereby quickly check and process the dependencies of the respective tasks without additional data exchange with the command processor 7000. In addition, the embodiment is configured to set dependencies for a plurality of task descriptors provided from different dependency matrices, and thus dependencies for entire tasks can be configured. Through this, the speed of task processing can be further improved, parallel processing between tasks can be performed more smoothly, and traffic between the command processor and the task manager can be minimized, thereby maximizing the processing speed and efficiency of the entire device.

Figure 39:
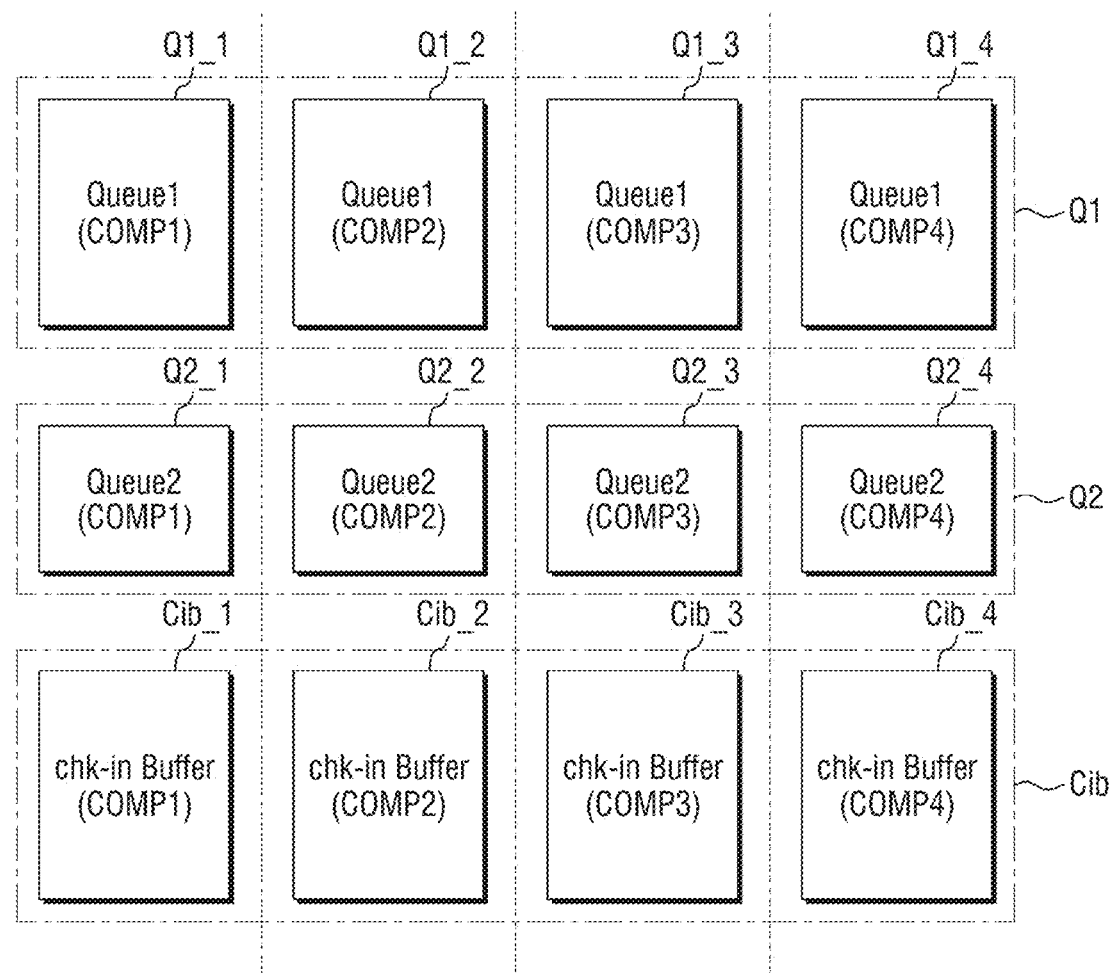
FIG. 39 is a diagram for illustrating a first queue, a second queue, and a check-in buffer of a neural processing device in accordance with some embodiments of the disclosure.

FIG. 39 is a diagram for illustrating a first queue, a second queue, and a check-in buffer of a neural processing device in accordance with some embodiments of the disclosure.

Referring to FIG. 39, the 1st to 4th queues Q1_1 ... Q1_4 of the first queue group Q1, 1st to 4th queues Q2_1 ... Q2_4 of the second queue group Q2, and first to fourth check-in buffers Cib_1 to Cib_4 of a check-in buffer Cib may store particular types of task descriptors, respectively. The 1st to 4th queues Q1_1 ... Q1_4 of the first queue group Q1, the 1st to 4th queues Q2_1 ... Q2_4 of the second queue group Q2, and the first to fourth check-in buffers Cib_1 to Cib_4 may store the same type of task descriptors.

For example, the 1st queue Q1_1 of the first queue group Q1, the 1st queue Q2_1 of the second queue group Q2, and the first check-in buffer Cib_1 may store task descriptors for first computation, and the 2nd queue Q1_2 of the first queue group Q1, the 2nd queue Q2_2 of the second queue group Q2, and the second check-in buffer Cib_2 may store task descriptors for second computation. Further, the 3rd queue Q1_3 of the first queue group Q1, the 3rd queue Q2_3 of the second queue group Q2, and the third check-in buffer Cib_3 may store task descriptors for third computation, and the 4th queue Q1_4 of the first queue group Q1, the 4th queue Q2_4 of the second queue group Q2, and the fourth check-in buffer Cib_4 may store task descriptors for fourth computation. However, the embodiment is not limited thereto.

In some embodiments, the first to fourth computations may be completely the same computation, or may be computations of the same type but different kinds in detail.

Figure 40:
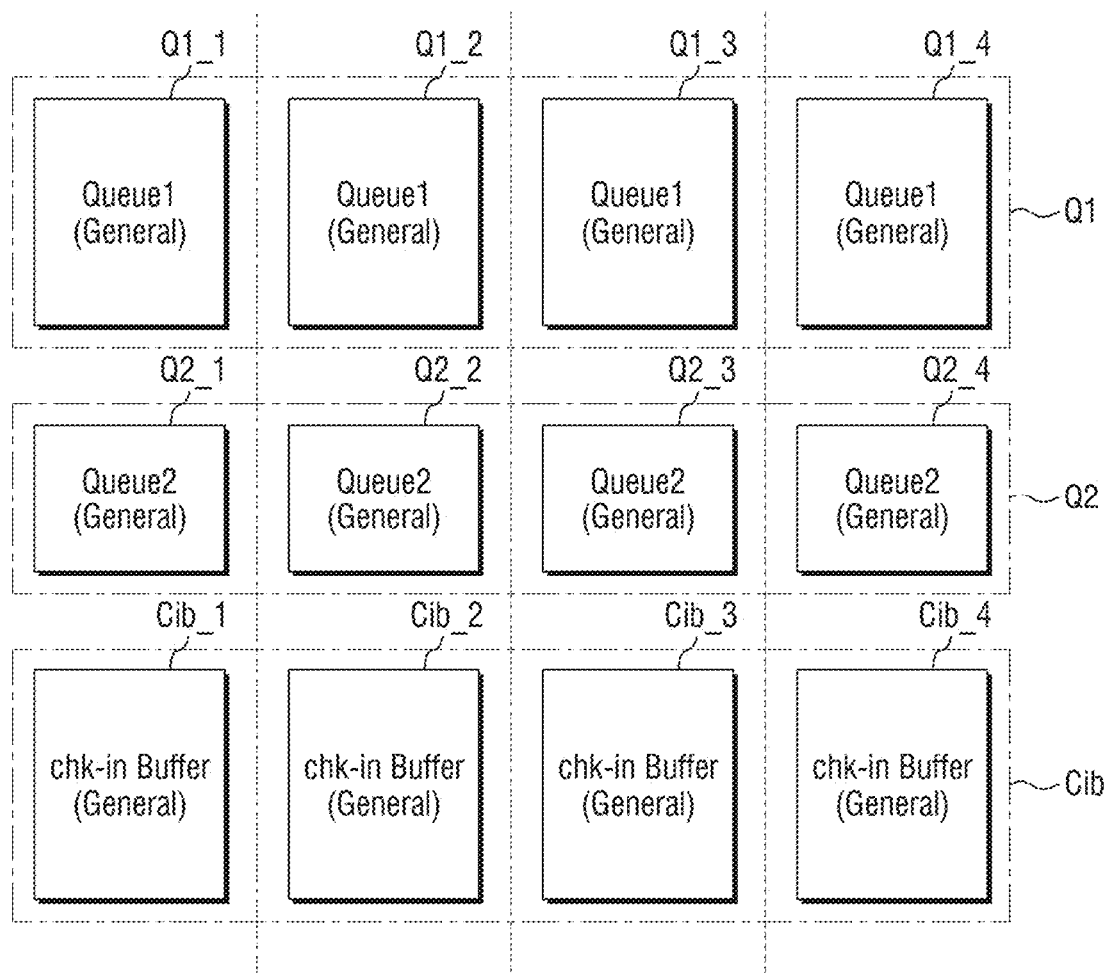
FIG. 40 is a diagram for illustrating a first queue, a second queue, and a check-in buffer of a neural processing device in accordance with some embodiments of the disclosure.

FIG. 40 is a diagram for illustrating a first queue, a second queue, and a check-in buffer of a neural processing device in accordance with some embodiments of the disclosure.

Referring to FIG. 40, the 1st to 4th queues Q1_1 ... Q1_4 of a first queue group Q1, 1st to 4th queues Q2_1 ... Q2_4 of the second queue group Q2, and first to fourth check-in buffers Cib_1 to Cib_4 of a check-in buffer Cib may store several types of task descriptors, respectively. The 1st to 4th queues Q1_1 ... Q1_4 of a first queue group Q1, the 1st to 4th queues Q2_1 ... Q2_4 of the second queue group Q2, and the first to fourth check-in buffers Cib_1 to Cib_4 may store different types of task descriptors or the same type of task descriptors.

Figure 41:
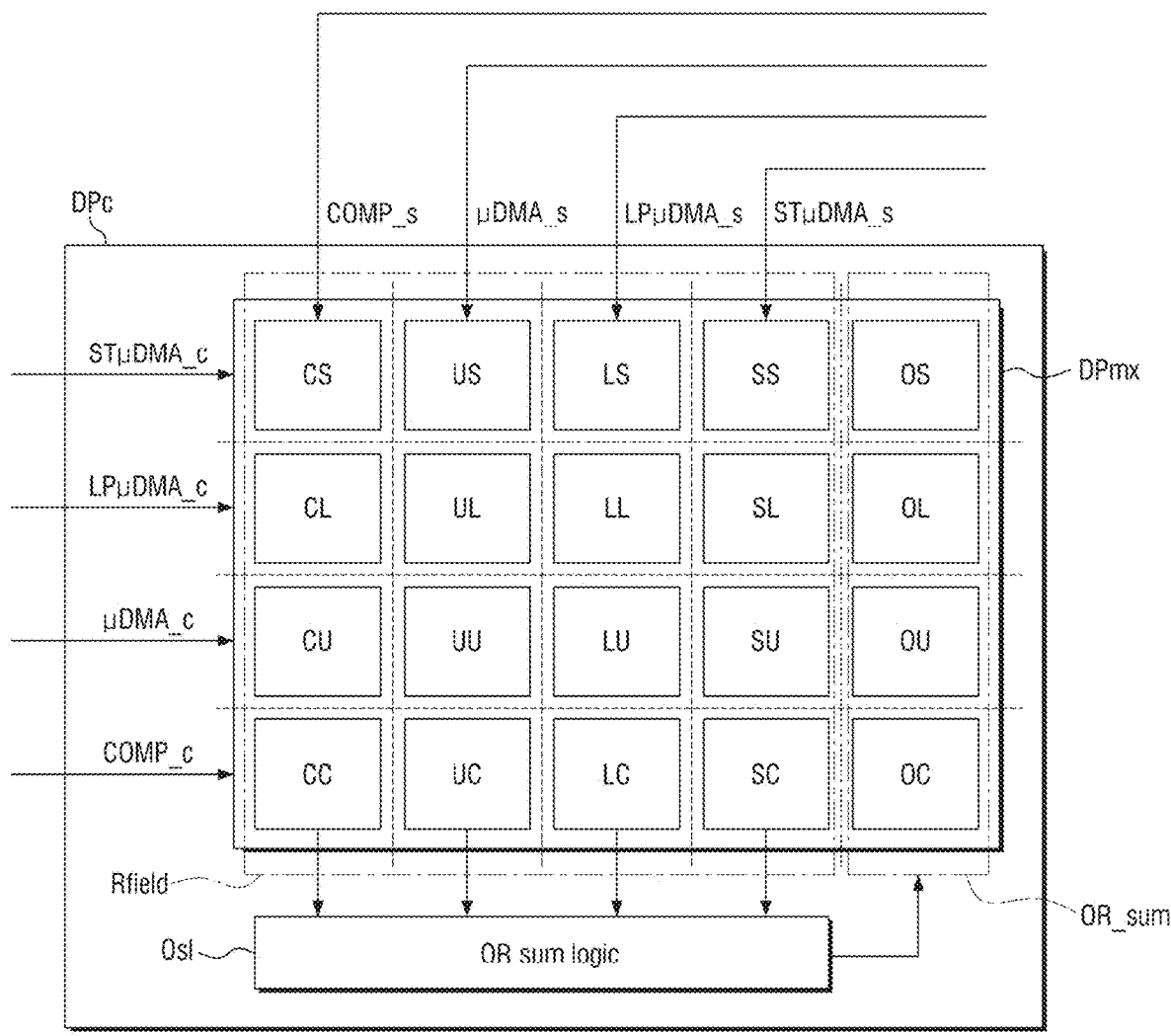
FIG. 41 is a diagram for illustrating a single-mode dependency matrix stored in a dependency checker of a neural processing device in accordance with some embodiments of the disclosure.

FIG. 41 is a diagram for illustrating a dependency matrix for a single mode stored in a dependency checker of a neural processing device in accordance with some embodiments of the disclosure.

Referring to FIG. 41, the dependency matrix DPmx for a single mode may include a field region Rfield and a OR sum region OR_sum. In some embodiments, the field region Rfield may be the same as the dependency matrix DPmx of FIG. 26.

The OR sum region OR_sum may be stored via the OR operation of each row of the field region Rfield. In some embodiments, OS in the fifth column may mean a dependency from the OR operation to the ST micro-DMA. In some embodiments, if any one of the computation, micro-DMA, LP micro-DMA, or ST micro-DMA is checked out, the dependency of the ST micro-DMA can be released. Similarly, OL, OU, and OC may mean dependencies from all types of tasks to the LP micro-DMA, micro-DMA, and computation, respectively. The OR sum region OR_sum may be generated by an OR sum logic Osl.

Figure 42:
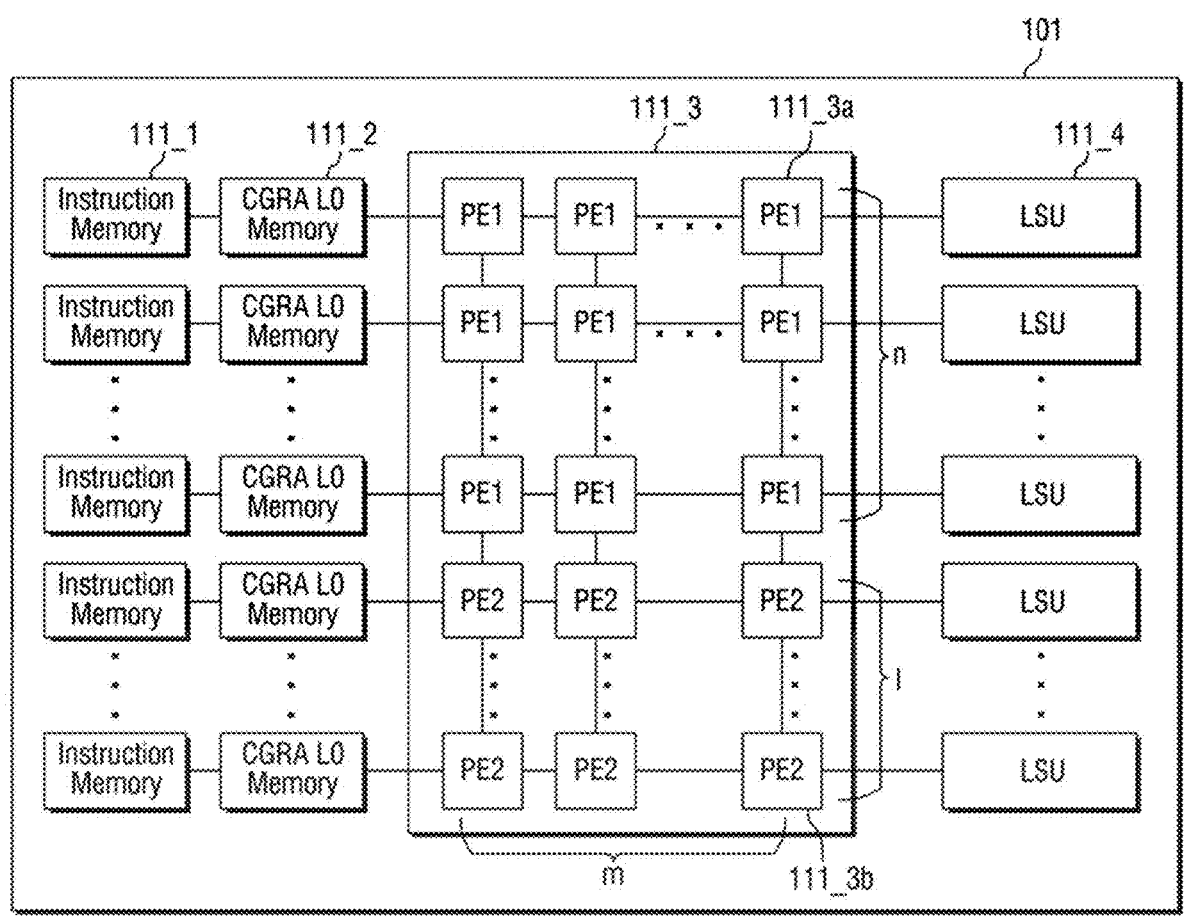
FIG. 42 is a block diagram for illustrating the structure of the neural processing device of FIG. 1 in detail.

FIG. 42 is a block diagram for illustrating in detail the structure of the neural processing device in accordance with some embodiments of the disclosure.

Referring to FIG. 42, a neural core 101 may have a CGRA structure, unlike a neural core 100. The neural core 101 may include an instruction memory 111_1, a CGRA L0 memory 111_2, a PE array 111_3, and a load/store unit (LSU) 111_4. The PE array 111_3 may include a plurality of processing elements interconnected by a mesh style network. The mesh style network may be two-dimensional, three-dimensional, or higher-dimensional. In the CGRA, the plurality of processing elements may be reconfigurable or programmable. The interconnection between the plurality of processing elements may be reconfigurable or programmable. In some embodiments, the interconnection between the plurality of processing elements may be statically reconfigurable or programmable when the interconnection is fixed after the plurality of processing elements are configured or programed. In some embodiments, the interconnection between the plurality of processing elements may be dynamically reconfigurable or programmable when the interconnection is reconfigurable or programmable even after the plurality of processing elements are configured or programed.

The instruction memory 111_1 may receive and store instructions. The instruction memory 111_1 may sequentially store instructions internally, and provide the stored instructions to the PE array 111_3. In some embodiments, the instructions may instruct the operation of first type of a plurality of processing elements 111_3a included in each PE array 1113.

The CGRA L0 memory 1112 may be located inside the neural core 101, receive all input data required for tasks of the neural core 101, and temporarily store the data. In addition, the CGRA L0 memory 1112 may temporarily store output data calculated by the neural core 101 to transmit the data to the outside. The CGRA L0 memory 1112 may serve as a cache memory of the neural core 101.

The CGRA L0 memory 1112 may send and receive data to and from the PE array 111_3. The CGRA L0 memory 111_2 may be a memory corresponding to L0 (level 0) that is lower than L1. In some embodiments, the L0 memory may be a private memory of the neural core 101 that is not shared. The CGRA L0 memory 1112 may transmit data such as activations or weights, programs, and the like to the PE array 111_3.

The PE array 1113 may be a module that performs calculations. The PE array 111_3 may perform not only one-dimensional calculations but also two-dimensional or higher matrix/tensor calculations. The PE array 1113 may include the first type of the plurality of processing elements 111_3a and a second type of a plurality of processing elements 111_3b therein.

The first type of the plurality of processing elements 111_3a and the second type of the plurality of processing elements 111_3b may be arranged in rows and columns. The first type of the plurality of processing elements 111_3a and the second type of the plurality of processing elements 111_3b may be arranged in m columns. In addition, the first type of the plurality of processing elements 111_3a may be arranged in n rows, and the second type of the plurality of processing elements 111_3b may be arranged in 1 rows. Accordingly, the first type of the plurality of processing elements 111_3a and the second type of the plurality of processing element 111_3b may be arranged in (n+1) rows and m columns.

The LSU 111_4 may receive at least one of data, a control signal, or a synchronization signal from the outside via the local interconnection 200. The LSU 111_4 may transmit at least one of the received data, control signal, or synchronization signal to the CGRA L0 memory 1112. Similarly, the LSU 111_4 may transfer at least one of the data, control signal, or synchronization signal to the outside via the local interconnection 200.

The neural core 101 may have a CGRA (Coarse Grained Reconfigurable Architecture) structure. Accordingly, in the neural core 101, each of the first type of the plurality of processing elements 111_3a and the second type of the plurality of processing elements 111_3b of the PE array 111_3 may be connected to at least one of the CGRA L0 memory 111_2, the instruction memory 111_1, or the LSU 111_4, respectively. In some embodiments, the first type of the plurality of processing elements 111_3a and the second type of the plurality of processing elements 111_3b do not have to be connected to all of the CGRA L0 memory 111_2, the instruction memory 111_1, and the LSU 111_4, but may be connected to some thereof.

Further, the first type of the plurality of processing elements 111_3a and the second type of the plurality of processing elements 111_3b may be different types of processing elements from each other. Accordingly, out of the CGRA L0 memory 111_2, the instruction memory 111_1, and the LSU 111_4, the elements connected to the first type of the plurality of processing elements 111_3a and the elements connected to the second type of the plurality of processing elements 111_3b may be different from each other.

The neural core 101 of the disclosure having a CGRA structure enables high-level parallel calculations, and since direct data exchange between the first type of the plurality of processing elements 111_3a and the second type of the plurality of processing elements 111_3b is possible, the power consumption may be low. In addition, by including two or more types of processing elements, optimization according to various calculation tasks may also be possible.

For example, if the first type of the plurality of processing elements 111_3a are processing elements that perform two-dimensional calculations, the second type of the plurality of processing elements 111_3b may be processing elements that perform one-dimensional calculations. However, the embodiment is not limited thereto.

Figure 43:
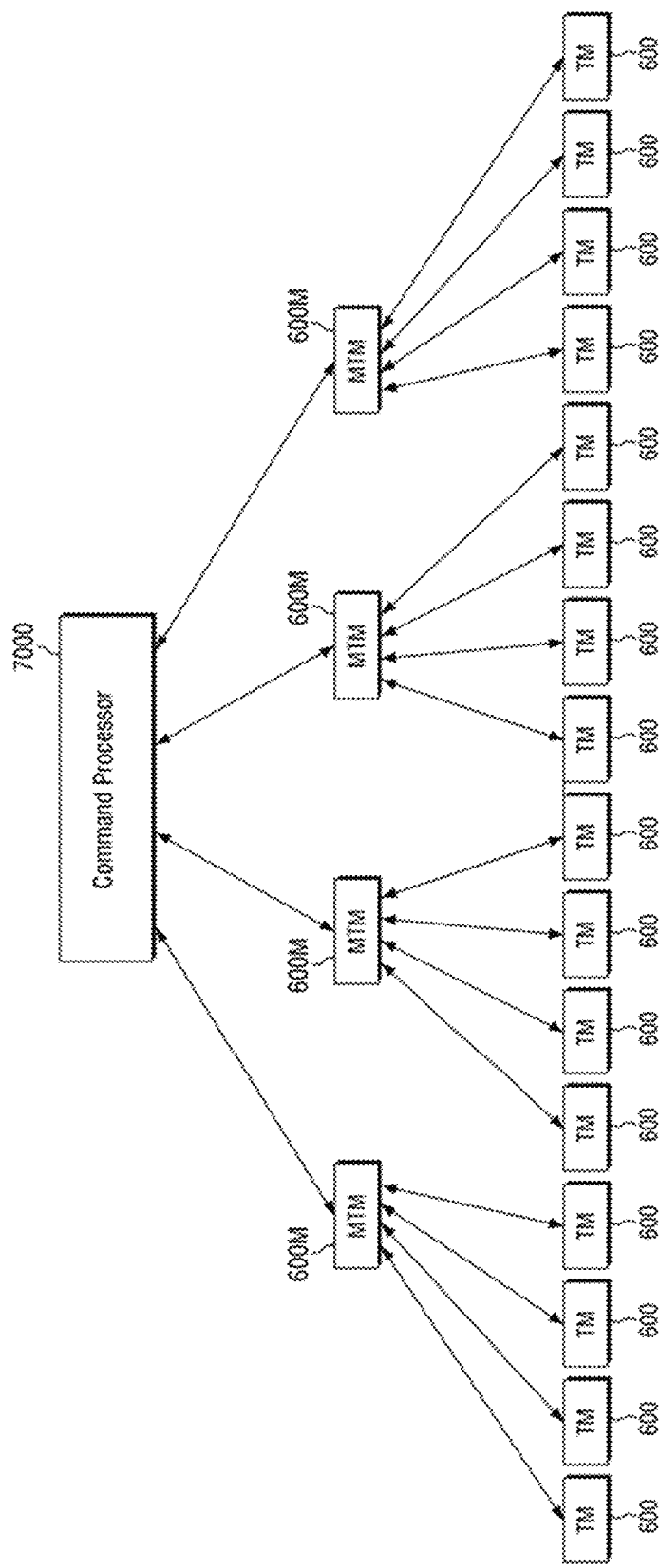
FIG. 43 is a diagram for illustrating a hierarchical structure of a command processor and task managers of a neural processing device in accordance with some embodiments of the disclosure.
Figure 44:
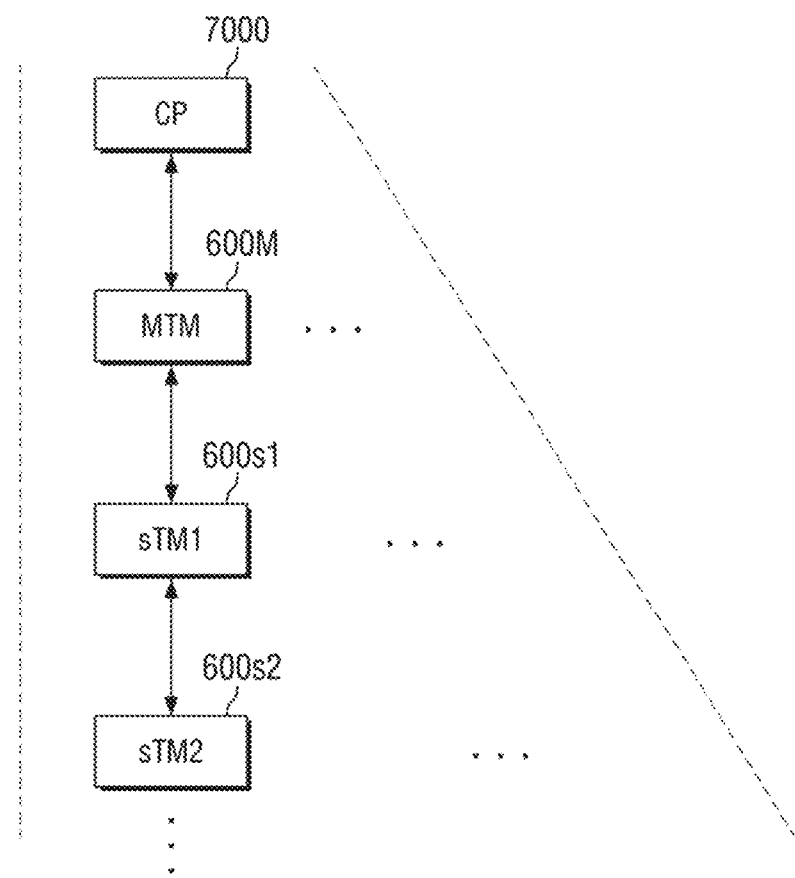
FIG. 44 is a diagram for illustrating a hierarchical structure of a command processor and task managers of a neural processing device in accordance with some embodiments of the disclosure.

FIG. 43 is a diagram for illustrating a hierarchical structure of a command processor and task managers of a neural processing device in accordance with some embodiments of the disclosure, and FIG. 44 is a diagram for illustrating a hierarchical structure of a command processor and task managers of a neural processing device in accordance with some embodiments of the disclosure.

Referring to FIGS. 43 and 44, if a number of task managers 600 increases, it may be difficult for the command processor 7000 to manage all of the task managers 600. Therefore, the neural processing device 1 in accordance with some embodiments of the disclosure may have a hierarchical structure in which each of master task managers 600M manages the plurality of task managers 600 and the command processor 7000 manages the master task managers 600M.

Further, referring to FIG. 44, levels below one of the master task manager 600M may also be subdivided into a plurality. For example, a first sub-task manager 600s1 and a second sub-task manager 600s2 may form each layer. In some embodiments, one first sub-task manager 600s1 may manage at least one second sub-task manager 600s2, and one master task manager 600M may manage at least one first sub-task manager 600s1. Additionally, several layers may be added below the second sub-task manager 600s2 as well.

In some embodiments, although three levels of the task manager 300, the master task manager 300M, and the command processor 7000 are shown in FIGS. 43 and 44, the number of levels may be equal to or greater than four. In some embodiments, the depth of the hierarchical structure may vary as desired depending on the number of task managers 300.

Figure 45:
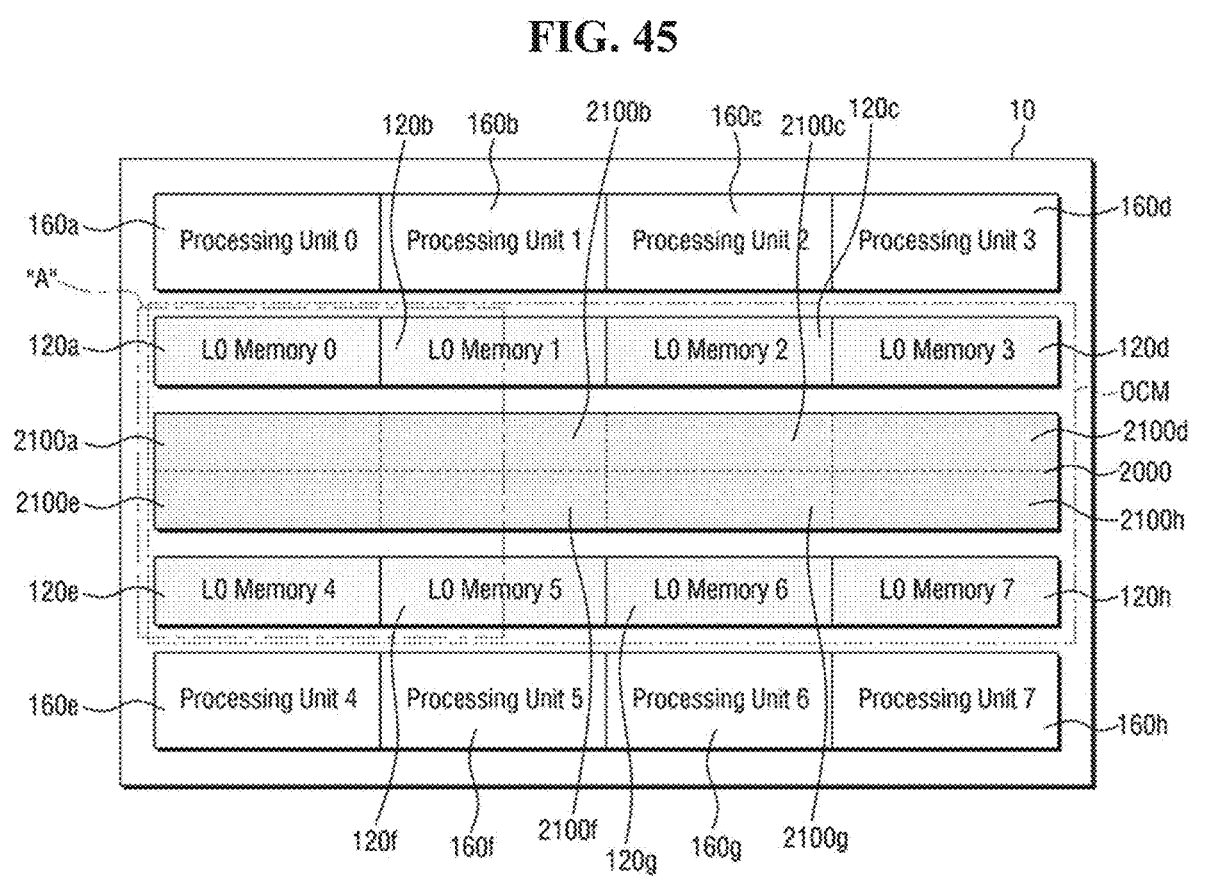

FIG. 45 is a block diagram for illustrating memory reconfiguration of a neural processing system in accordance with some embodiments of the disclosure.

Referring to FIG. 45, the neural core SoC 10 may include first to eighth processing units 160a to 160h and an on-chip memory OCM. Although FIG. 45 illustrates eight processing units as an example, this is merely illustrative, and the number of processing units may vary as desired.

The on-chip memory OCM may include first to eighth L0 memories 120a to 120h and a shared memory 2000.

The first to eighth L0 memories 120a to 120h may be used as private memories for the first to eighth processing units 160a to 160h, respectively. In some embodiments, the first to eighth processing units 160a to 160h and the first to eighth L0 memories 120a to 120h may correspond to each other 1:1.

The shared memory 2000 may include first to eighth memory units 2100a to 2100h. The first to eighth memory units 2100a to 2100h may correspond to the first to eighth processing units 160a to 160h and the first to eighth L0 memories 120a to 120h, respectively. In some embodiments, the number of memory units may be eight, which is the same as the number of processing units and L0 memories.

The shared memory 2000 may operate in one of two kinds of on-chip memory types. In some embodiments, the shared memory 2000 may operate in one of a L0 memory type or a global memory type. In some embodiments, the shared memory 2000 may implement two types of logical memories with one piece of hardware.

If the shared memory 2000 is implemented in the L0 memory type, the shared memory 2000 may operate as a private memory for each of the first to eighth processing units 160a to 160h, just like the first to eighth L0 memories 120a to 120h. The L0 memory can operate at a relatively higher clock speed compared with the global memory, and the shared memory 2000 may also use a relatively higher clock speed when operating in the L0 memory type.

If the shared memory 2000 is implemented in the global memory type, the shared memory 2000 may operate as a common memory used by the first processing unit 160a and the second processing unit 160b together. In some embodiments, the shared memory 2000 may be shared not only by the first to eighth processing units 160a to 160h but also by the first to eighth L0 memories 120a to 120h.

The global memory may generally use a lower clock compared with the L0 memory, but is not limited thereto. When the shared memory 2000 operates in the global memory type, the first to eighth processing units 160a to 160h may share the shared memory 2000. In some embodiments, the shared memory 2000 may be connected to the volatile memory 32 of FIG. 2 via the global interconnection 6000 and may also operate as a buffer for the volatile memory 32.

At least part of the shared memory 2000 may operate in the L0 memory type, and the rest may operate in the global memory type. In some embodiments, the entire shared memory 2000 may operate in the L0 memory type, or the entire shared memory 2000 may operate in the global memory type. Alternatively, part of the shared memory 2000 may operate in the L0 memory type, and the rest may operate in the global memory type.

Figure 46:
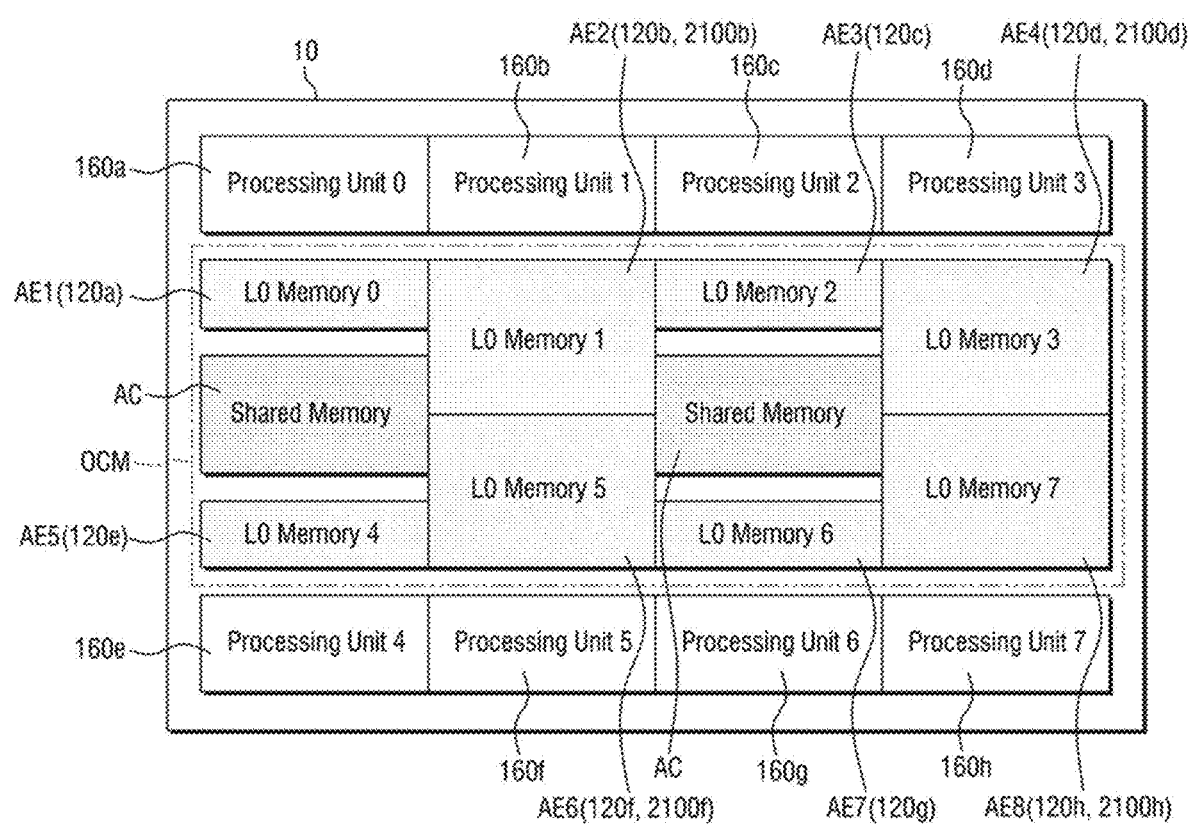
FIG. 46 is a block diagram for illustrating an example of the memory reconstruction of the neural processing system in accordance with some embodiments of the disclosure.

FIG. 46 is a block diagram showing an example of memory reconstruction of a neural processing system in accordance with some embodiments of the disclosure.

With reference to FIGS. 45 and 46, first, third, fifth, and seventh dedicated areas AE1, AE3, AE5, and AE7 for each of the first, third, fifth, and seventh processing units 160a, 160c, 160e, and 160g may include only the first, third, fifth, and seventh L0 memories 120a, 120c, 120e, and 120g, respectively. Further, second, fourth, sixth, and eighth dedicated areas AE2, AE4, AE6, and AE8 for each of the second, fourth, sixth, and eighth processing units 160b, 160d, 160f, and 160h may include second, fourth, sixth, and eighth L0 memories 120b, 120d, 120f, and 120h, respectively. In addition, the second, fourth, sixth, and eighth dedicated areas AE2, AE4, AE6, and AE8 may include the second, fourth, sixth, and eighth memory units 2100b, 2100d, 2100f, and 2100h. The first, third, fifth, and seventh memory units 2100a, 2100c, 2100e, and 2100g of the shared memory 2000 may be used as a common area AC.

The common area AC may be a memory shared by the first to eighth processing units 160a to 160h. The second dedicated area AE2 may include a second L0 memory 120b and a second memory unit 2100b. The second dedicated area AE2 may be an area in which the second L0 memory 120b and the second memory unit 2100b that are separated hardware-wise operate in the same manner and operate logically as one L0 memory. The fourth, sixth, and eighth dedicated areas AE4, AE6, and AE8 may also operate in the same manner as the second dedicated area AE2.

The shared memory 2000 in accordance with the embodiment may convert an area corresponding to each processing unit into a logical L0 memory and a logical global memory of an optimized ratio and may use them. The shared memory 2000 may perform the adjustment of this ratio at runtime.

In some embodiments, each processing unit may perform the same task in some cases, but may perform different tasks in other cases as well. In some embodiments, the amount of the L0 memory and the amount of the global memory required for the tasks carried out by each processing unit are inevitably different each time. Accordingly, if the composition ratio of the L0 memory and the shared memory is fixedly set as in the conventional on-chip memory, there may occur inefficiency due to the calculation tasks assigned to each processing unit.

Therefore, the shared memory 2000 of the neural processing device in accordance with the embodiment may set an optimal ratio of the L0 memory and the global memory according to computation tasks during the runtime, and may enhance the efficiency and speed of computation.

Figure 47:
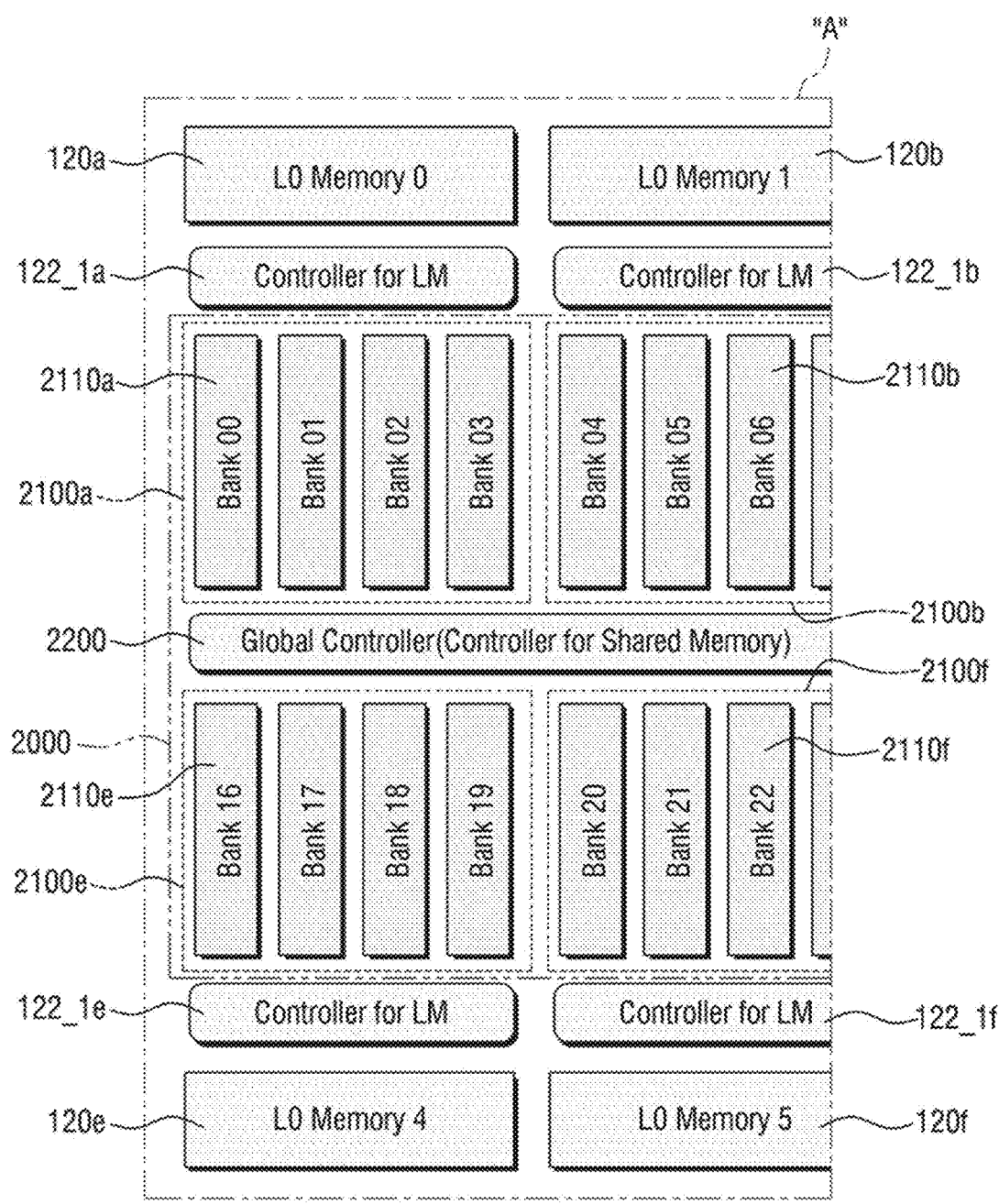
FIG. 47 is an enlarged block diagram of a portion A of FIG. 45.

FIG. 47 is an enlarged block diagram of a portion A of FIG. 45.

With reference to FIGS. 45 and 47, the shared memory 2000 may include a first L0 memory controller 122_1a, a second L0 memory controller 122_1b, a fifth L0 memory controller 122_1e, a sixth L0 memory controller 122_1f, the first to eighth memory units 2100a to 2100h, and a global controller 2200. Other L0 memory controllers not shown may also be included in the embodiment, but the description thereof will be omitted for convenience.

The first L0 memory controller 122_1a, the second L0 memory controller 122_1b, the fifth L0 memory controller 122_1e, the sixth L0 memory controller 122_1f, and the global controller 2200 may be referred to respectively as a first L0 memory controller circuit, a second L0 memory controller circuit, a fifth L0 memory controller circuit, a sixth L0 memory controller circuit, and a global controller circuit. However, for the sake of convenience, the terms are respectively unified as a first L0 memory controller, a second L0 memory controller, a fifth L0 memory controller, a sixth L0 memory controller, and a global controller. In addition, each of the first L0 memory controller 122_1a, the second L0 memory controller 122_1b, the fifth L0 memory controller 122_1e, the sixth L0 memory controller 122_1f, and the global controller 2200 may be implemented as a circuit or circuitry.

The first L0 memory controller 122_1a may control the first L0 memory 120a. In addition, the first L0 memory controller 122_1a may control the first memory unit 2100a. Specifically, when the first memory unit 2100a is implemented in a logical L0 memory type, the control by the first L0 memory controller 122_1a may be performed on the first memory unit 2100a.

The second L0 memory controller 122_1b may control the second L0 memory 120b. Further, the second L0 memory controller 122_1b may control the second memory unit 2100b. In some embodiments, when the second memory unit 2100b is implemented in the logical L0 memory type, the control by the first L0 memory controller 122_1a may be performed on the second memory unit 2100b.

The fifth L0 memory controller 122_1e may control the fifth L0 memory 120e. Further, the fifth L0 memory controller 122_1e may control the fifth memory unit 2100e. In some embodiments, when the fifth memory unit 2100e is implemented in the logical L0 memory type, the control by the fifth L0 memory controller 122_1e may be performed on the fifth memory unit 2100e.

The sixth L0 memory controller 122_1f may control the sixth L0 memory 120f. Further, the sixth L0 memory controller 122_1f may control the sixth memory unit 2100f. In some embodiments, when the sixth memory unit 2100f is implemented in the logical L0 memory type, the control by the sixth L0 memory controller 122_1f may be performed on the sixth memory unit 2100f.

The global controller 2200 may control all of the first to eighth memory units 2100a to 2100h. Specifically, the global controller 2200 may control the first memory unit 2100a to the eighth memory unit 2100h when each of the first to eighth memory units 2100a to 2100h operate logically in the global memory type (i.e., when they do not operate logically in the L0 memory type).

In some embodiments, the first to eighth memory units 2100a to 2100h may be controlled by the first to eighth L0 memory controllers 122_1a to 122_1h, respectively, or may be controlled by the global controller 2200, depending on what type of memory they are logically implemented.

If the L0 memory controllers including the first, second, fifth, and sixth L0 memory controllers 122_1a, 122_1b, 122_1e, and 122_1f control the first to eighth memory units 2100a to 2100h, respectively, the first to eighth L0 memory controllers 122_1a to 122_1h control the first to eighth memory units 2100a to 2100h in the same manner as the first to eighth L0 memories 120a to 120h, and thus, can control them as the private memory of the first to eighth processing units 160a to 160h. Accordingly, the first to eighth memory units 2100a to 2100h may operate at clock frequencies corresponding to the clock frequencies of the first to eighth processing units 160a to 160h.

The L0 memory controllers including the first L0 memory controller 122_1a, the second L0 memory controller 122_1b, the fifth L0 memory controller 122_1e, and the sixth L0 memory controller 122_1f may each include the LSU 110.

If the global controller 2200 controls at least one of the first to eighth memory units 2100a to 2100h, respectively, then the global controller 2200 may control the first to eighth memory units 2100a to 2100h as the global memory of the first to eighth processing units 160a to 160h, respectively. Accordingly, at least one of the first to eighth memory units 2100a to 2100h may operate at a clock frequency independent of the clock frequencies of the first to eighth processing units 160a to 160h, respectively. In some embodiments, if the global controller 2200 controls the i-th memory unit among the first to eighth memory units 2100a to 2100h, the global controller 2200 may control the i-th memory unit as the global memory of the i-th processing unit, and the i-th memory unit may operate at a clock frequency independent of the clock frequency of the i-th processing unit. However, the embodiment is not limited thereto.

The global controller 2200 may connect the first to eighth memory units 2100a to 2100h to the global interconnection 6000 of FIG. 3. The first to eighth memory units 2100a to 2100h may exchange data with the off-chip memory 30 of FIG. 2 by the control of the global controller 2200 or may respectively exchange data with the first to eighth L0 memories 120a to 120h.

Each of the first to eighth memory units 2100a to 2100h may include at least one memory bank. The first memory unit 2100a may include at least one first memory bank 2110a. The first memory banks 2110a may be areas obtained by dividing the first memory unit 2100a into certain sizes. The first memory banks 2110a may all be memory devices of the same size. However, the embodiment is not limited thereto. FIG. 47 illustrates that four memory banks are included in one memory unit.

Similarly, the second, fifth, and sixth memory units 2100b, 2100e, and 2100f may include at least one second, fifth, and sixth memory banks 2110b, 2110e, and 2110f, respectively.

In the following, the description will be made based on the first memory banks 2110a and the fifth memory banks 2110e, which may be the same as other memory banks including the second and sixth memory banks 2110b and 2110f.

Each of the first memory banks 2110a may operate logically in the L0 memory type or operate logically in the global memory type. In some embodiments, the first memory banks 2110a may operate independently of the other memory banks in the first memory unit 2100a. However, the embodiment is not limited thereto.

If each memory bank operates independently, the first memory unit 2100a may include a first area operating in the same manner as the first L0 memory 120a and a second area operating in a different manner from the first L0 memory 120a. In some embodiments, the first area and the second area do not necessarily coexist, but any one area may take up the entire first memory unit 2100a.

Likewise, the second memory unit 2100b may include a third area operating in the same manner as the second L0 memory 120b and a fourth area operating in a different manner from the second L0 memory 120b. In some embodiments, the third area and the fourth area do not necessarily coexist, and any one area may take up the entire first memory unit 2100a.

In some embodiments, the ratio of the first area to the second area may be different from the ratio of the third area to the fourth area. However, the embodiment is not limited thereto. Therefore, the ratio of the first area to the second area may be the same as the ratio of the third area to the fourth area. In some embodiments, the memory composition ratio in each memory unit may vary as desired.

In some embodiments, the ratio of the first area to the second area may be different from the ratio of the third area to the fourth area. However, the embodiment is not limited thereto. Therefore, the ratio of the first area to the second area may be the same as the ratio of the third area to the fourth area. In some embodiments, the memory composition ratio in each memory unit may vary as desired.

On the other hand, the shared memory 2000 in accordance with some embodiments of the disclosure may be controlled selectively by any one of the two controllers depending on the case. In the case depicted, the shared memory 2000 may be controlled not only as a whole by a determined one of the two controllers but also independently for each memory unit or each memory bank.

Through this, the shared memory 2000 in accordance with the embodiment can obtain an optimal memory composition ratio according to calculation tasks during the runtime and can perform faster and more efficient calculation tasks. In the case of a processing unit specialized in artificial intelligence, the required sizes of L0 memory and global memory may vary for each particular application. Moreover, even for the same application, the required sizes of L0 memory and global memory may vary for each layer when a deep learning network is used. In the shared memory 2000, in accordance with the embodiment, the composition ratio of the memory can be changed during runtime even when calculation steps change according to each layer, making fast and efficient deep learning tasks possible.

Figure 48:
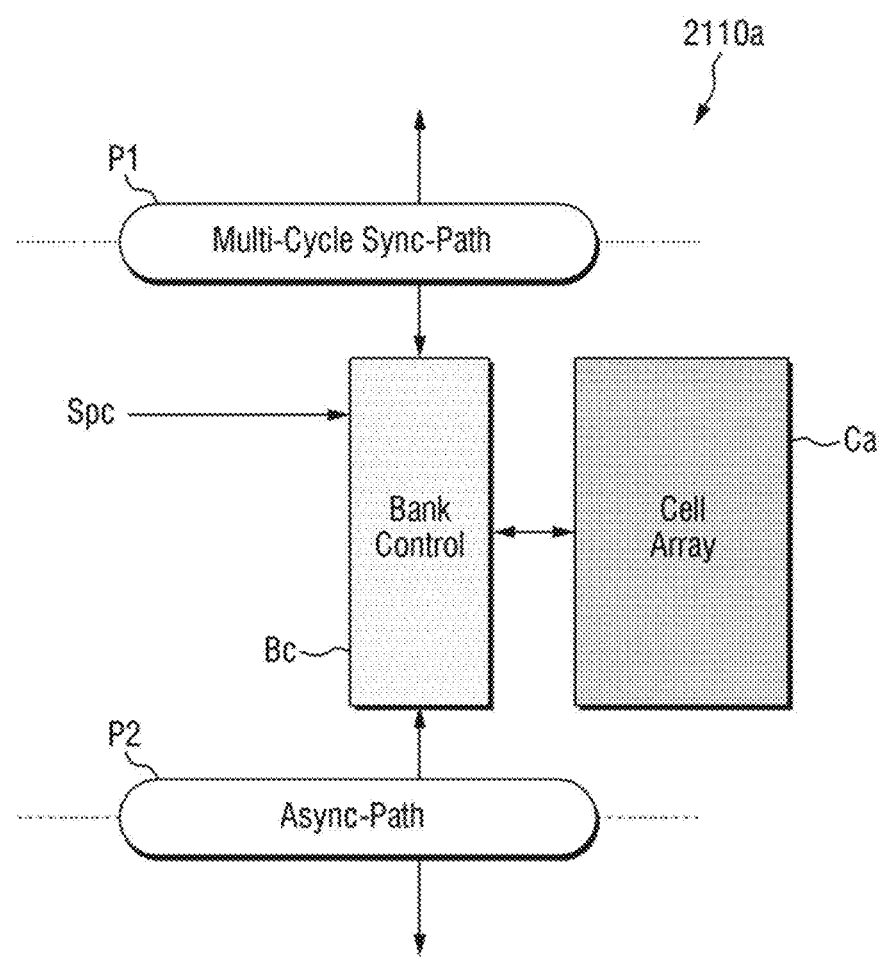
FIG. 48 is a diagram for illustrating the first memory bank of FIG. 47 in detail.

FIG. 48 is a diagram for illustrating the first memory bank of FIG. 47 in detail. Although FIG. 48 illustrates the first memory bank 2110a, other memory banks may also have the same structure as the first memory bank 2110a.

Referring to FIG. 48, the first memory bank 2110a may include a cell array Ca, a bank controller Bc, a first path unit P1, and a second path unit P2.

In some embodiments, the bank controller Bc, the first path unit P1, and the second path unit P2 may be referred to respectively as a bank controller circuit, a first path unit circuit, and a second path unit circuit. However, for the sake of convenience, the terms are respectively unified as a bank controller, a first path unit, and a second path unit. In addition, each of the bank controller Bc, the first path unit Pt, and the second path unit P2 may be implemented as a circuit or circuitry.

The cell array Ca may include a plurality of memory devices (cells) therein. In the cell array Ca, the plurality of memory devices may be arranged in a lattice structure. The cell array Ca may be, for example, a SRAM (static random-access memory) cell array.

The bank controller Bc may control the cell array Ca. The bank controller Bc may determine whether the cell array Ca operates in the L0 memory type or in the global memory type, and may control the cell array Ca according to the determined memory type.

The bank controller Bc may control the cell array Ca. The bank controller Bc may determine whether the cell array Ca operates in the L0 memory type or in the global memory type, and may control the cell array Ca according to the determined memory type.

The path control signal Spc may be generated by a pre-designed device driver or compiler. The path control signal Spc may be generated according to the characteristics of calculation tasks. Alternatively, the path control signal Spc may be generated by an input received from a user. In some embodiments, the user may directly apply an input to the path control signal Spc in order to select optimal memory composition ratio.

The bank controller Bc may determine a path along which the data stored in the cell array Ca are transmitted and received via the path control signal Spc. The exchange interface of data may be changed as the bank controller Bc determines the path along which the data are transmitted and received. In some embodiments, a first interface may be used when the bank controller Bc exchanges data with the first path unit P1, and a second interface may be used when the bank controller Bc exchanges data with the second path unit P2. In some embodiments, the first interface and the second interface may be different from each other.

Also, address systems in which data are stored may vary as well. In some embodiments, if a particular interface is selected, then read and write operations may be performed in an address system corresponding thereto.

The bank controller Bc may operate at a particular clock frequency. For example, if the cell array Ca is an SRAM cell array, the bank controller Bc may operate at the operating clock frequency of a general SRAM.

The first path unit P1 may be connected to the bank controller Bc. The first path unit P1 may directly exchange the data of the cell array Ca with the first processing unit 160a. In some embodiments, "directly" may mean being exchanged with each other without going through the global interconnection 6000. In some embodiments, the first processing unit 160a may exchange data directly with the first L0 memory 120a, and the first processing unit 160a may exchange data via the first path unit P1 when the shared memory 2000 is implemented logically in the L0 memory type. The first path unit P1 may include L0 memory controllers including the first L0 memory controller 122_1a and the second L0 memory controller 122_1b as shown in FIG. 47.

The first path unit P1 may form a multi-cycle sync-path. In some embodiments, the operating clock frequency of the first path unit P1 may be the same as the operating clock frequency of the first processing unit 160a. The first L0 memory 120a may quickly exchange data at the same clock frequency as the operating clock frequency of the first processing unit 160a in order to quickly exchange data at the same speed as the operation of the first processing unit 160a. Likewise, the first path unit P1 may also operate at the same clock frequency as the operating clock frequency of the first processing unit 160a.

In some embodiments, the operating clock frequency of the first path unit P1 may be multiples of the operating clock frequency of the bank controller Bc. In some embodiments, a clock domain crossing (CDC) operation for synchronizing the clocks between the bank controller Bc and the first path unit P1 is not required separately, and thus, a delay of data transmission may not occur. Accordingly, faster and more efficient data exchange can be possible.

In the embodiment shown in FIG. 48, an operating clock frequency of the first path unit P1 may be 1.5 GHz, as an example. This may be twice the frequency of 750 MHz of the bank controller Bc. However, the embodiment is not limited thereto, and any operating clock frequency of the first path unit P1 may be possible as long as the first path unit P1 operates at integer multiples of the clock frequency of the bank controller Bc.

The second path unit P2 may be connected to the bank controller Bc. The second path unit P2 may exchange the data of the cell array Ca with the first processing unit 160a not directly but via the global interconnection 6000. In some embodiments, the first processing unit 160a may exchange data with the cell array Ca via the global interconnection 6000 and the second path unit P2. In some embodiments, the cell array Ca may exchange data not only with the first processing unit 160a but also with other processing units.

In some embodiments, the second path unit P2 may be a data exchange path between the cell array Ca and all the processing units when the first memory bank 2110a is implemented logically in the global memory type. The second path unit P2 may include the global controller 2200 of FIG. 47.

The second path unit P2 may form an asynchronous path or Async-Path. The operating clock frequency of the second path unit P2 may be the same as the operating clock frequency of the global interconnection 6000. Likewise, the second path unit P2 may also operate at the same clock frequency as the operating clock frequency of the global interconnection 6000.

In the case of the embodiment as shown in FIG. 48, the operating clock frequency of the second path unit P2 may not be synchronized with the operating clock frequency of the bank controller Bc. In some embodiments, the clock domain crossing (CDC) operation for synchronizing the clocks between the bank controller Bc and the second path unit P2 may be required. If the operating clock frequency of the bank controller Bc and the operating clock frequency of the second path unit P2 are not synchronized with each other, the degree of freedom in the design of the clock domain may be relatively high. Therefore, the difficulty of hardware design is decreased, thereby making it possible to more easily derive the desired hardware operation.

The bank controller Bc may use different address systems in the case of exchanging data via the first path unit P1 and in the case of exchanging data via the second path unit P2. In some embodiments, the bank controller Bc may use a first address system if exchanging data via the first path unit P1 and a second address system if exchanging data via the second path unit P2. In some embodiments, the first address system and the second address system may be different from each other.

A bank controller Bc is not necessarily required for each memory bank. In some embodiments, a bank controller Bc may not be used to schedule, but instead serves to transfer signals, and thus, is not a required component for each memory bank having two ports. Therefore, one bank controller Bc can be operably coupled to control multiple memory banks. The multiple memory banks may operate independently even if they are controlled by the bank controller Bc. However, the embodiment is not limited thereto.

As a matter of course, the bank controller Be may exist for each memory bank. In some embodiments, the bank controller Be may control each memory bank individually.

Referring to FIG. 47 and FIG. 48, if the first memory unit 2100a exchanges data via the first path unit P1, the first address system may be used. If the first memory unit 2100a exchanges data via the second path unit P2, the second address system may be used. Similarly, if the second memory unit 2100b exchanges data via the first path unit Pt, a third address system may be used. If the second memory unit 2100b exchanges data via the second path unit P2, the second address system may be used. In some embodiments, the first address system and the third address system may be the same as each other. However, the embodiment is not limited thereto.

The first address system and the third address system may each be used exclusively for the first processing unit 160a and the second processing unit 160b, respectively. The second address system may be commonly applied to the first processing unit 160a and the second processing unit 160b.

In FIG. 48, the operating clock frequency of the second path unit P2 may operate at 1 GHz, as an example. This may be a frequency that is not synchronized with the operating clock frequency of 750 MHz of the bank controller Bc. In some embodiments, the operating clock frequency of the second path unit P2 may be freely set without being dependent on the operating clock frequency of the bank controller Be at all.

A generic global memory has used slow SRAM (e.g., 750 MHz) and a global interconnection (e.g., 1 GHz) faster than that, inevitably resulting in delays due to the CDC operation. On the other hand, the shared memory 2000 in accordance with some embodiments has room to use the first path unit P1 in addition to the second path unit P2, thereby making it possible to avoid delays resulting from the CDC operation.

Furthermore, in the generic global memory, a plurality of processing units uses one global interconnection 6000, and thus, when an amount of data transfer occurs at the same time, the decrease in the overall processing speed is likely to occur. On the other hand, the shared memory 2000 in accordance with some embodiments has room to use the first path unit P1 in addition to the second path unit P2, thereby making it possible to achieve the effect of properly distributing the data throughput that could be concentrated on the global controller 2200 as well.

Figure 49:
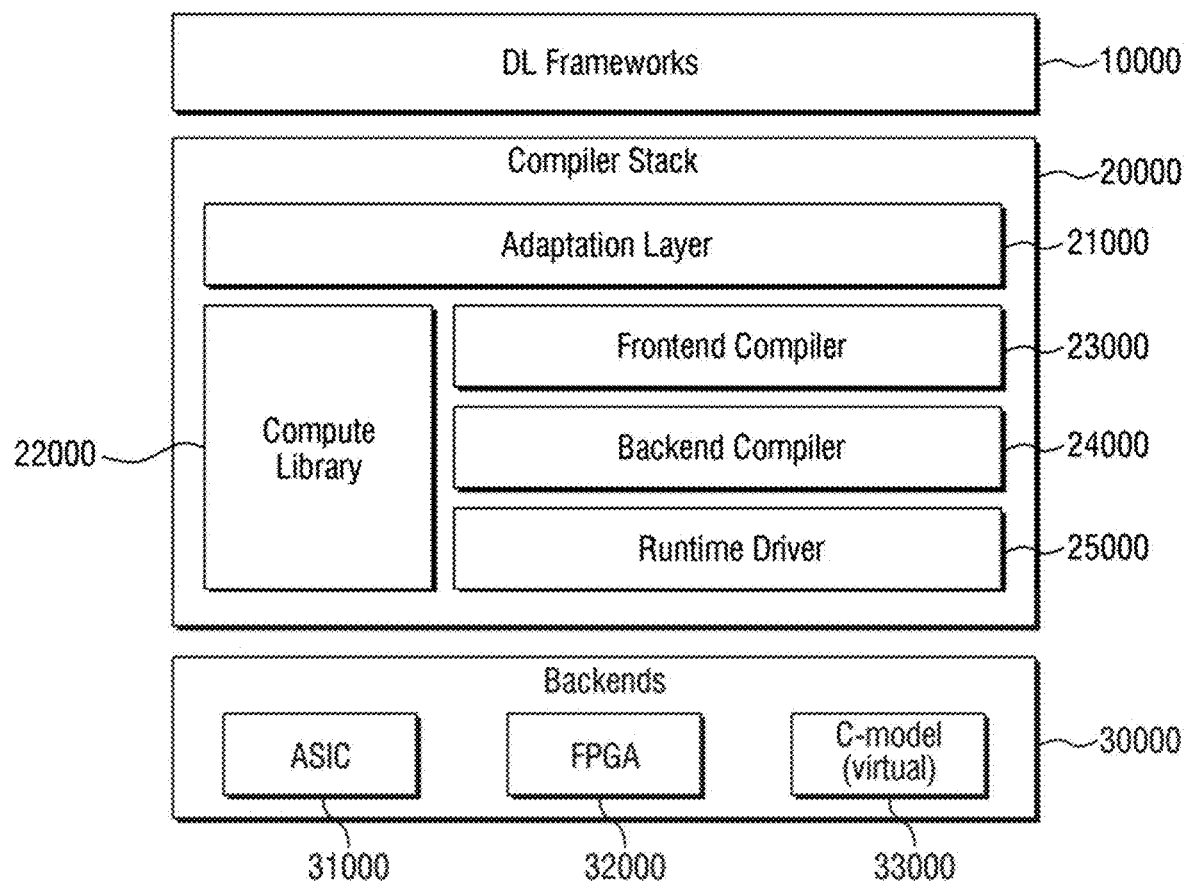
FIG. 49 is a block diagram for illustrating a software hierarchy of a neural processing device in accordance with some embodiments of the disclosure.

FIG. 49 is a block diagram for illustrating a software hierarchy of a neural processing device in accordance with some embodiments.

Referring to FIG. 49, the software hierarchy of the neural processing device in accordance with some embodiments may include a deep learning (DL) framework 10000, a compiler stack 20000, and a back-end module 30000.

The DL framework 10000 may mean a framework for a deep learning model network used by a user. For example, a neural network that has finished training may be generated using a program such as TensorFlow or PyTorch.

The compiler stack 20000 may include an adaptation layer 21000, a compute library 22000, a front-end compiler 23000, a back-end compiler 24000, and a runtime driver 25000.

The adaptation layer 21000 may be a layer in contact with the DL framework 10000. The adaptation layer 21000 may quantize a neural network model of a user generated by the DL framework 10000 and modify graphs. In addition, the adaptation layer 21000 may convert a type of model into a required type.

The front-end compiler 23000 may convert various neural network models and graphs transferred from the adaptation layer 21000 into a constant intermediate representation (IR). The converted IR may be a preset representation that is easy to handle later by the back-end compiler 24000.

The optimization that can be done in advance in the graph level may be performed on such an IR of the front-end compiler 23000. In addition, the front-end compiler 23000 may finally generate the IR through the task of converting it into a layout optimized for hardware.

The back-end compiler 24000 optimizes the IR converted by the front-end compiler 23000 and converts it into a binary file, enabling it to be used by the runtime driver. The back-end compiler 24000 may generate an optimized code by dividing a job at a scale that fits the details of hardware.

The compute library 22000 may store template operations designed in a form suitable for hardware among various operations. The compute library 22000 provides the back-end compiler 24000 with multiple template operations required by hardware, allowing the optimized code to be generated.

The compute library 22000 may store template operations designed in a form suitable for hardware among various operations. The compute library 22000 provides the back-end compiler 24000 with multiple template operations required by hardware, allowing the optimized code to be generated.

The back-end module 30000 may include an ASIC (application-specific integrated circuit) 31000, an FPGA (field-programmable gate array) 32000, and a C-model 33000. The ASIC 31000 may refer to a hardware chip determined according to a predetermined design method. The FPGA 32000 may be a programmable hardware chip. The C-model 33000 may refer to a model implemented by simulating hardware on software.

The back-end module 30000 may perform various tasks and derive results by using the binary code generated through the compiler stack 20000.

Figure 50:
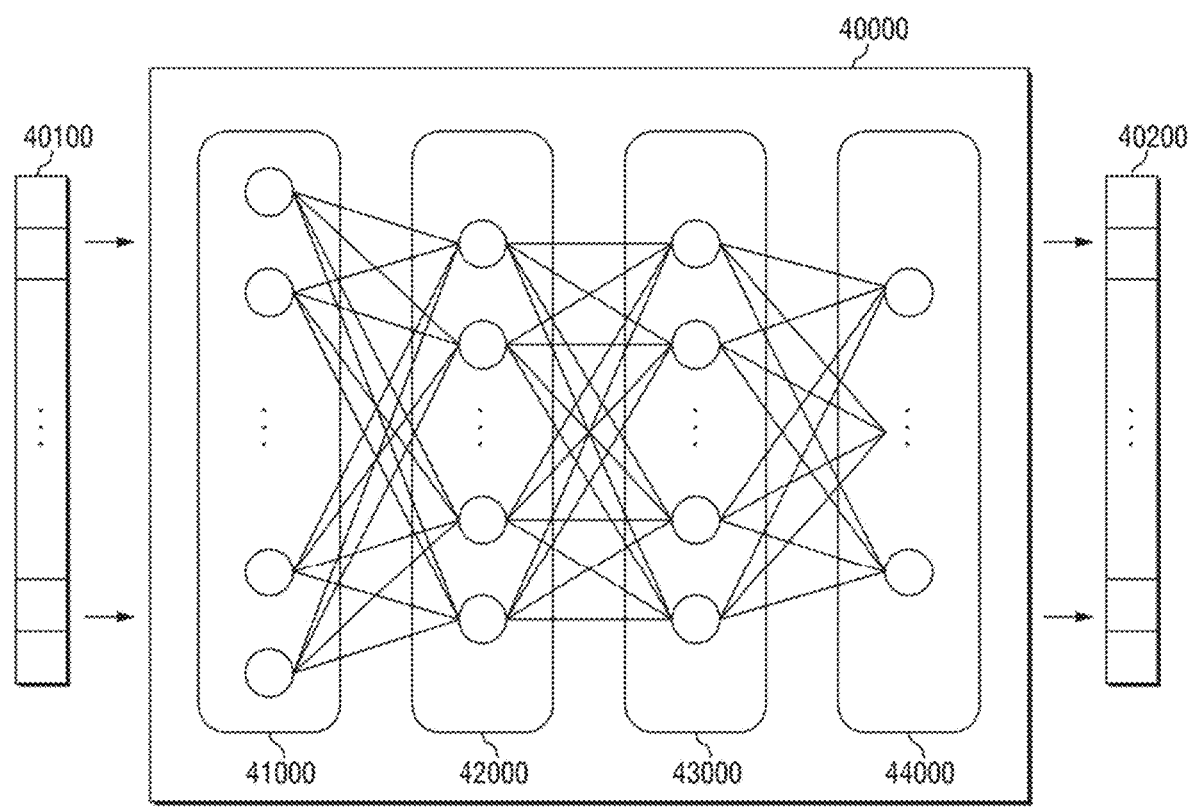
FIG. 50 is a conceptual diagram for illustrating deep learning calculations performed by a neural processing device in accordance with some embodiments of the disclosure.

FIG. 50 is a conceptual diagram for illustrating deep learning calculations performed by a neural processing device in accordance with some embodiments.

Referring to FIG. 50, an artificial neural network model 40000 is one example of a machine learning model and is a statistical learning algorithm implemented based on the structure of a biological neural network or is a structure for executing the algorithm, in machine learning technology and cognitive science.

The artificial neural network model 40000 may represent a machine learning model having an ability to solve problems by learning to reduce the error between an accurate output corresponding to a particular input and an inferred output by repeatedly adjusting the weight of the synapse by nodes. Nodes are artificial neurons that have formed a network by combining synapses, as in a biological neural network. For example, the artificial neural network model 40000 may include any probabilistic model, neural network model, etc., used in artificial intelligence learning methods such as machine learning and deep learning.

A neural processing device in accordance with some embodiments may implement the form of such an artificial neural network model 40000 and perform calculations. For example, the artificial neural network model 40000 may receive an input image and may output information on at least a part of an object included in the input image.

The artificial neural network model 40000 may be implemented by a multilayer perceptron (MLP) including multilayer nodes and connections between them. An artificial neural network model 40000 in accordance with the embodiment may be implemented using one of various artificial neural network model structures including the MLP. As shown in FIG. 50, the artificial neural network model 40000 includes an input layer 41000 that receives input signals or data 40100 from the outside, an output layer 44000 that outputs output signals or data 40200 corresponding to the input data, and n (where n is a positive integer) hidden layers 42000 to 43000 that are located between the input layer 41000 and the output layer 44000 and that receive a signal from the input layer 41000, extract characteristics, and forward them to the output layer 44000. Here, the output layer 44000 receives signals from the hidden layers 42000 to 43000 and outputs them to the outside.

The learning methods of the artificial neural network model 40000 include a supervised learning method for training to be optimized to solve a problem by the input of supervisory signals (correct answers), and an unsupervised learning method that does not require supervisory signals.

The neural processing device may directly generate training data, through simulations, for training the artificial neural network model 40000. In this way, by matching a plurality of input variables and a plurality of output variables corresponding thereto with the input layer 41000 and the output layer 44000 of the artificial neural network model 40000, respectively, and adjusting the synaptic values between the nodes included in the input layer 41000, the hidden layers 42000 to 43000, and the output layer 44000, training may be made to enable a correct output corresponding to a particular input to be extracted. Through such a training phase, it is possible to identify the characteristics hidden in the input variables of the artificial neural network model 40000, and to adjust synaptic values (or weights) between the nodes of the artificial neural network model 40000 so that an error between an output variable calculated based on an input variable and a target output is reduced.

Figure 51:
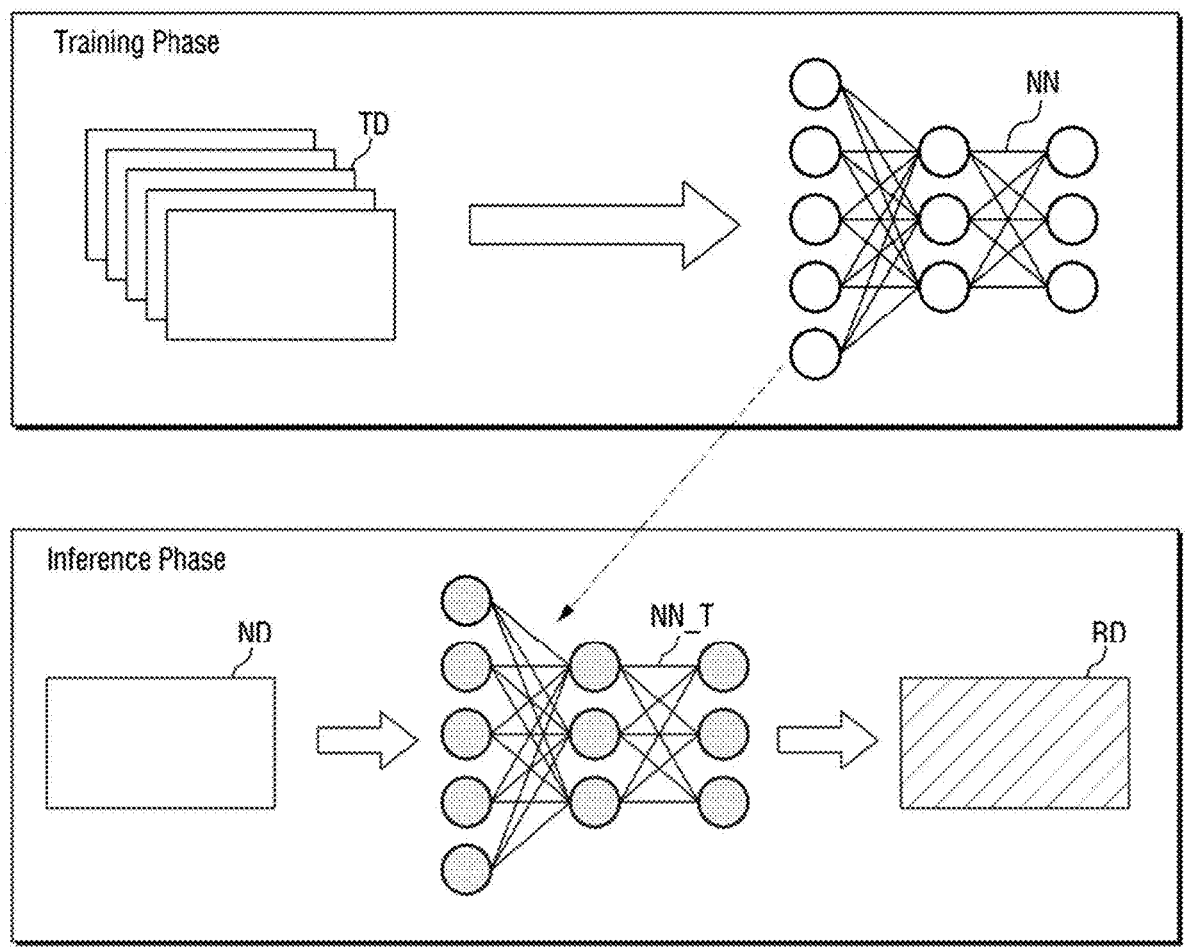
FIG. 51 is a conceptual diagram for illustrating training and inference operations of a neural network of a neural processing device in accordance with some embodiments of the disclosure.

FIG. 51 is a conceptual diagram for illustrating training and inference operations of a neural network of a neural processing device in accordance with some embodiments.

Referring to FIG. 51, the training phase may be subjected to a process in which a large number of pieces of training data TD are passed forward to the artificial neural network model NN and are passed backward again. Through this, the weights and biases of each node of the artificial neural network model NN are tuned, and training may be performed so that more and more accurate results can be derived. Through the training phase, the artificial neural network model NN may be converted into a trained neural network model NN_T.

In the inference phase, new data ND may be inputted into the trained neural network model NN_T again. The trained neural network model NN_T may derive result data RD through the weights and biases that have already been used in the training, with the new data ND as input. For such result data RD, what training data TD were used in training and how many pieces of training data TD were used in the training phase may be important.

Hereinafter, a method for checking task dependencies of a task manager in accordance with some embodiments of the disclosure will be described with reference to FIGS. 17 to 22 and FIGS. 52 to 56. The parts overlapping with the embodiments described above will be omitted or simplified.

Figure 52:
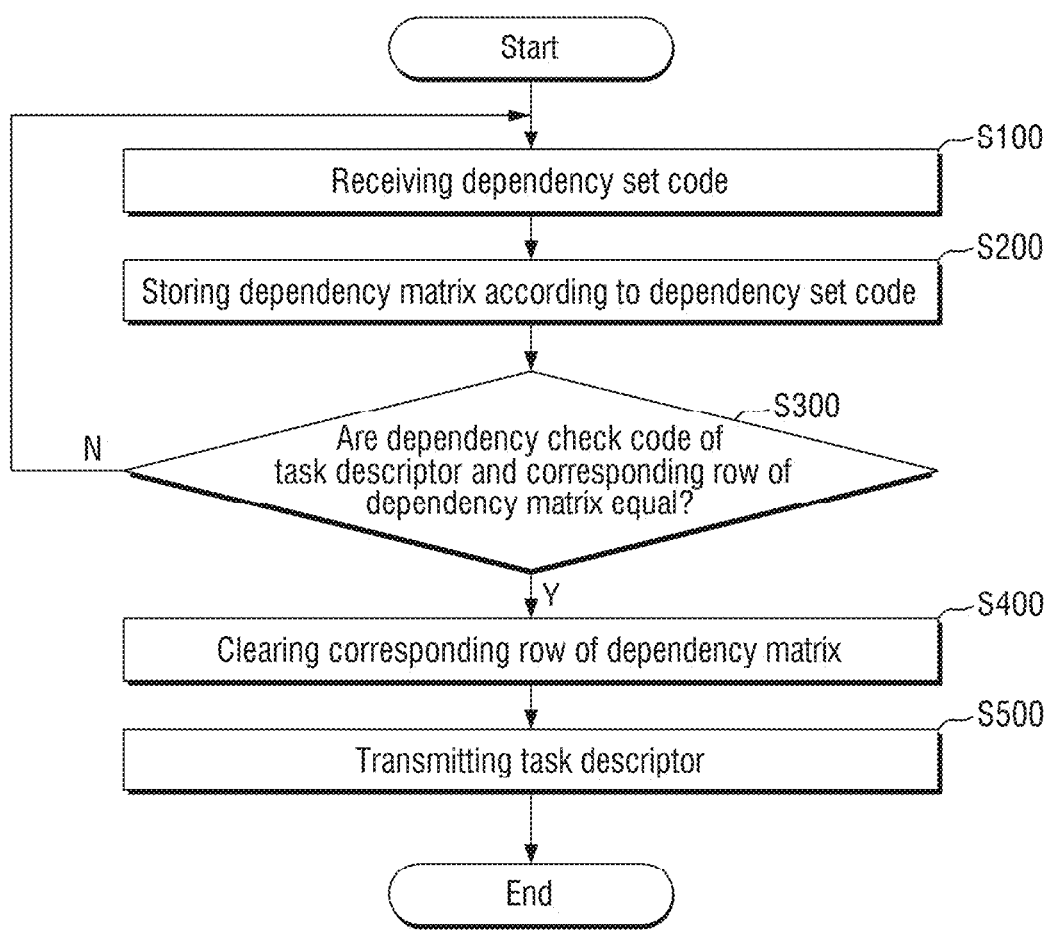
FIG. 52 is a flowchart for illustrating a method for checking task dependencies of a task manager in accordance with some embodiments of the disclosure.
Figure 53:
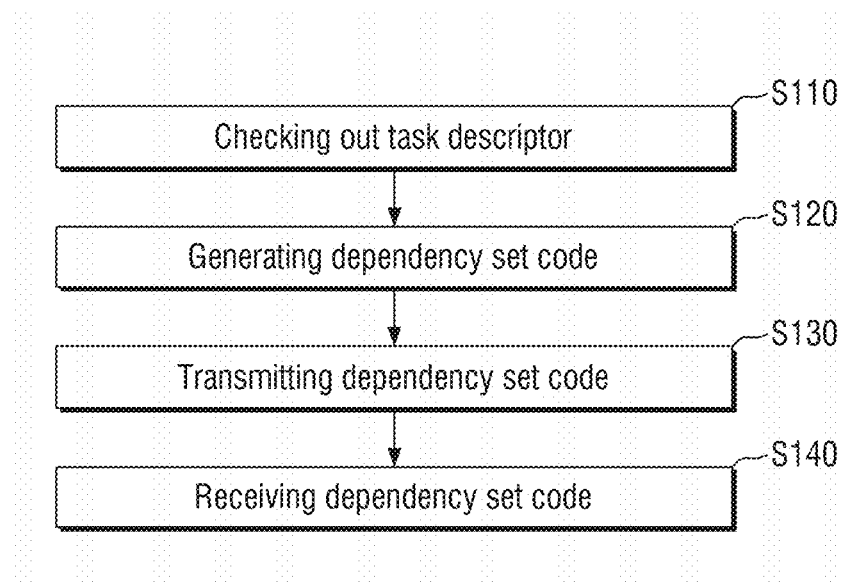
FIG. 53 is a flowchart for illustrating the receiving the dependency set code of FIG. 52 in detail.
Figure 54:
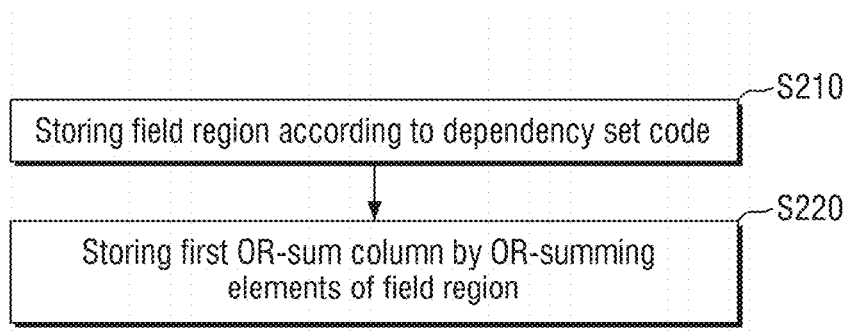
FIG. 54 is a flowchart for illustrating the storing the dependency matrix of FIG. 52 in detail.
Figure 55:
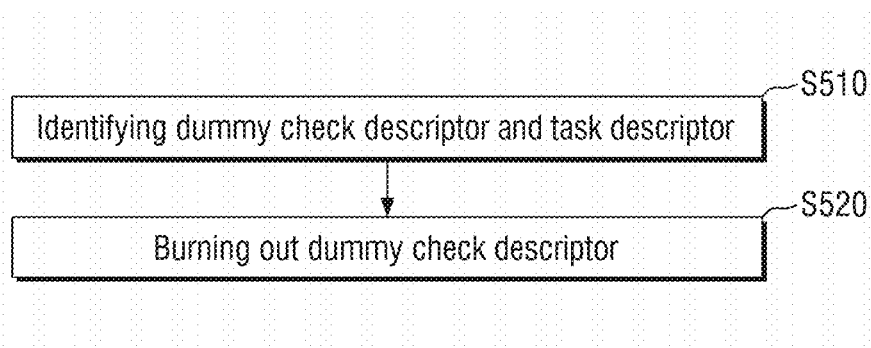
FIG. 55 is a flowchart for illustrating the transmitting the task descriptor of FIG. 52 in detail.

FIG. 52 is a flowchart for illustrating a method for checking task dependencies of a neural processing device in accordance with some embodiments of the disclosure, and FIG. 53 is a flowchart for illustrating the receiving the dependency set code of FIG. 52 in detail. FIG. 54 is a flowchart for illustrating the storing the dependency matrix of FIG. 52 in detail, and FIG. 55 is a flowchart for illustrating the transmitting the task descriptor of FIG. 52 in detail.

Referring to FIG. 52, a dependency set code is received at S100.

In detail, referring to FIG. 53, a task descriptor is checked out at S110.

Specifically, referring to FIG. 22, the dependency setter DPs may also check out each of the first to n-th task descriptors Tsk_d1 to Tsk_dn according to the completion signals. Accordingly, the dependency setter DPs may generate checkout reports COrp about which tasks have been completed and checked out.

Referring again to FIG. 53, a dependency set code is generated at S120.

Specifically, referring to FIGS. 18 and 22, the dependency setter DPs may receive the completion signals from the check-in buffer Cib and generate dependency update requests DFURQ. In some embodiments, depending on which task corresponding to what task descriptor has been completed, the dependency setter DPs may generate a dependency update request DFURQ.

In some embodiments, the dependency update request DFURQ may include the contents of the dependency set codes described above. In some embodiments, the dependency update request DFURQ may include dependency information of the task descriptor that is being checked out currently. In some embodiments, the dependency update request DFURQ may include information about a task descriptor that can be executed as the dependency limitation is removed by the task descriptor that is being checked out currently.

The dependency checker DPc may generate dependency set codes DFURQ1 to DFURQ4 with the dependency update request DFURQ.

Referring again to FIG. 53, the dependency set code is transmitted at S130.

Specifically, referring to FIG. 22, the dependency setter DPs may transmit the dependency update request DFURQ to the task message 620.

Referring again to FIG. 53, a dependency set code is received at S140.

Specifically, referring to FIG. 17, the dependency checker DPc may receive the dependency update request DFURQ. The dependency update request DFURQ may notify the change of dependency as a completed task occurs according to a defined dependency between particular tasks.

Referring again to FIG. 52, a dependency matrix is stored according to the dependency set code at S200.

Specifically, referring to FIG. 18, each column of the dependency matrix DPmx may be updated via the first to fourth dependency set codes DFURQ1 to DFURQ4 generated by the dependency update request DFURQ.

In detail, referring to FIG. 54, a field region is stored according to the dependency set code at S210.

Specifically, referring to FIG. 19, the field region Rfield may be the same as the dependency matrix DPmx of FIG. 18. In some embodiments, the field region Rfield may have the form of a square matrix.

Referring again to FIG. 54, the elements of the field region are OR-summed and a first OR-sum column is stored at S220.

Specifically, referring to FIG. 19, the OR sum region OR_sum may be generated by OR operation of the elements of the field region Rfield. Specifically, the OR operation of the four elements in the first row of the field region Rfield may become an element e51 in the first row of the OR sum region OR_sum. Likewise, the elements e52 to e54 in the second to fourth rows may be the OR-sum result values of the second to fourth rows, respectively.

The OR sum logic Osl may calculate the value of the OR sum region OR_sum by using the values of the elements in the field region Rfield. The OR sum logic Osl may perform an OR operation for each row and store it in the OR sum region OR_sum, as described above.

Referring again to FIG. 52, it is determined whether dependency check code and corresponding row of the dependency matrix are equal at S300. If they are equal, the corresponding row of the dependency matrix is cleared at S400, and the task descriptor is transmitted at S500. If not, the task manager waits for steps S100 and S200 again.

Specifically, referring to FIG. 18, after being updated in this way, the dependency matrix DPmx may be compared with the first to fourth dependency check codes chk1 to chk4. In some embodiments, the dependency checker DPc may receive the first to n-th task descriptors Tsk_d1 to Tsk_dn, and generate a dependency check code according to each task descriptor. The dependency check codes may correspond to each row of the dependency matrix DPmx of FIG. 18.

In some embodiments, the first to fourth dependency check codes chk1 to chk4 may correspond to the first to fourth rows of the dependency matrix DPmx of FIG. 18, respectively. Therefore, the first to fourth dependency check codes chk1 to chk4 may be compared with the first to fourth rows of the dependency matrix DPmx, respectively. For example, if the first dependency check code chk1 and the first row e11, e21, e31, and e41 of the dependency matrix DPmx are equal, the dependency checker DPc may check in the first task descriptor Tsk_d1 and clear the first row of the dependency matrix DPmx. In some embodiments, clearing may mean removing all data in the first row of the dependency matrix DPmx. The checked-in task descriptor may be transmitted to the second queue group Q2.

In detail, referring to FIG. 55, a dummy check descriptor and the task descriptor are identified at S510. Next, the dummy check descriptor is burnt out at S520.

Specifically, referring to FIG. 35, the dependency checker DPc can identify task descriptors and dummy check descriptors out of the received descriptors. Further, dummy set descriptors and dummy check descriptors can be identified as well. In some embodiments, identification can be made because the task descriptors and the dummy set descriptors must be checked out via the dependency checker DPc, but the dummy check descriptors do not require it.

The second dummy check descriptor DC_Tsk_d2 may be burnt out within the dependency checker DPc when the dependency check is completed. In some embodiments, the second dummy check descriptor DC_Tsk_d2 does not need to be transmitted to the core global 500 or checked out, and can thus be burnt out by the dependency checker DPc.

Hereinafter, a method for checking task dependencies of a task manager in accordance with some embodiments of the disclosure will be described with reference to FIGS. 52 and 56. The parts overlapping with the embodiments described above will be omitted or simplified.

Figure 56:
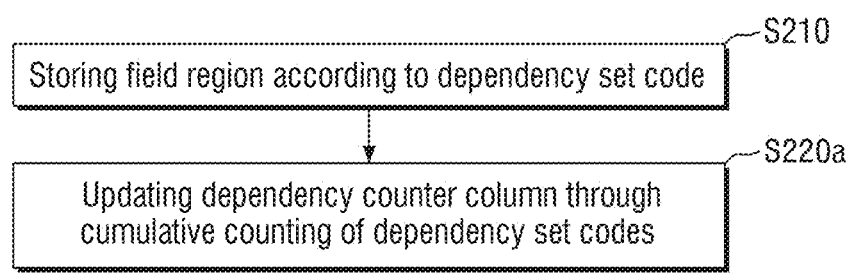
FIG. 56 is a flowchart for illustrating a method for checking task dependencies of a task manager in accordance with some embodiments of the disclosure.

FIG. 56 is a flowchart for illustrating a method for checking task dependencies of a task manager in accordance with some embodiments of the disclosure. FIG. 56 is a diagram for illustrating step S200 of FIG. 52 in detail.

Step S210 of FIG. 56 may be the same as step S210 of FIG. 54. Next, a dependency counter column is updated through cumulative counting of the dependency set codes at S220a.

Specifically, referring to FIG. 20, the first dependency counter region dcnt1 may be generated by counting the number of dependency set codes recorded into the elements of the field region Rfield. Specifically, the application number of the dependency set codes in the first row of the field region Rfield may be the element e51 in the first row of the first dependency counter region dcnt1. Likewise, elements e52 to e54 in the second to fourth rows may be the counting result values of the dependency set codes in the second to fourth rows, respectively.

The dependency counter update logic dcul may calculate the value of the first dependency counter region dcnt1 by counting the number of times the dependency set codes of the field region Rfield are applied. The dependency counter update logic dcul may perform counting for each row and store it in the first dependency counter region dcnt1, as described above.

In the following, a method for setting task dependencies of a neural processing device in accordance with some embodiments of the disclosure will be described with reference to FIGS. 57 and 58. The parts overlapping with the embodiments described above will be omitted or simplified. For a description of the method for setting task dependencies in accordance with the embodiment, reference may be made to FIGS. 1 to 56 and the related descriptions described above.

Figure 57:
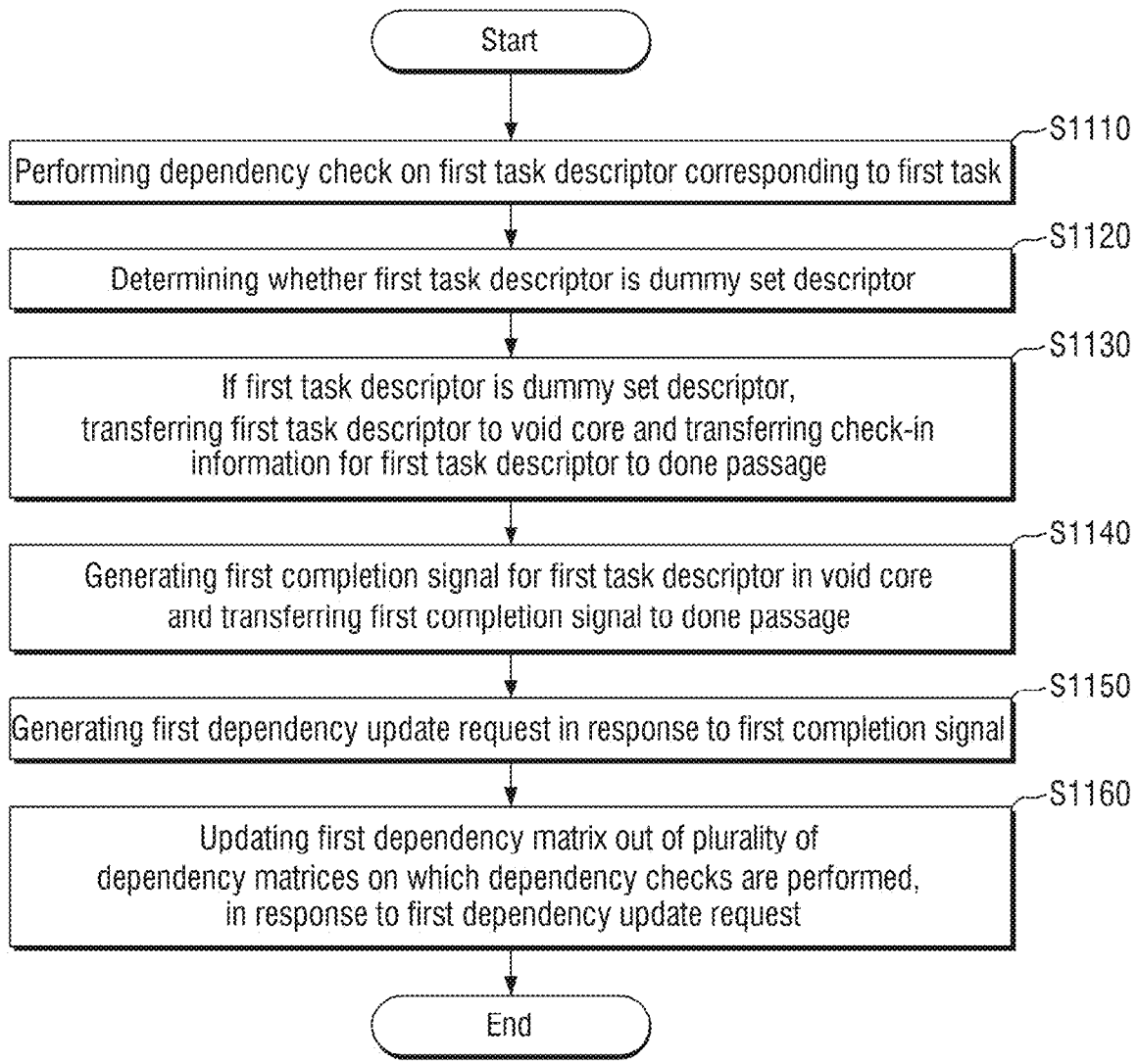
FIG. 57 is a flowchart for illustrating a method for setting task dependencies of a neural processing device in accordance with some embodiments of the disclosure.
Figure 58:
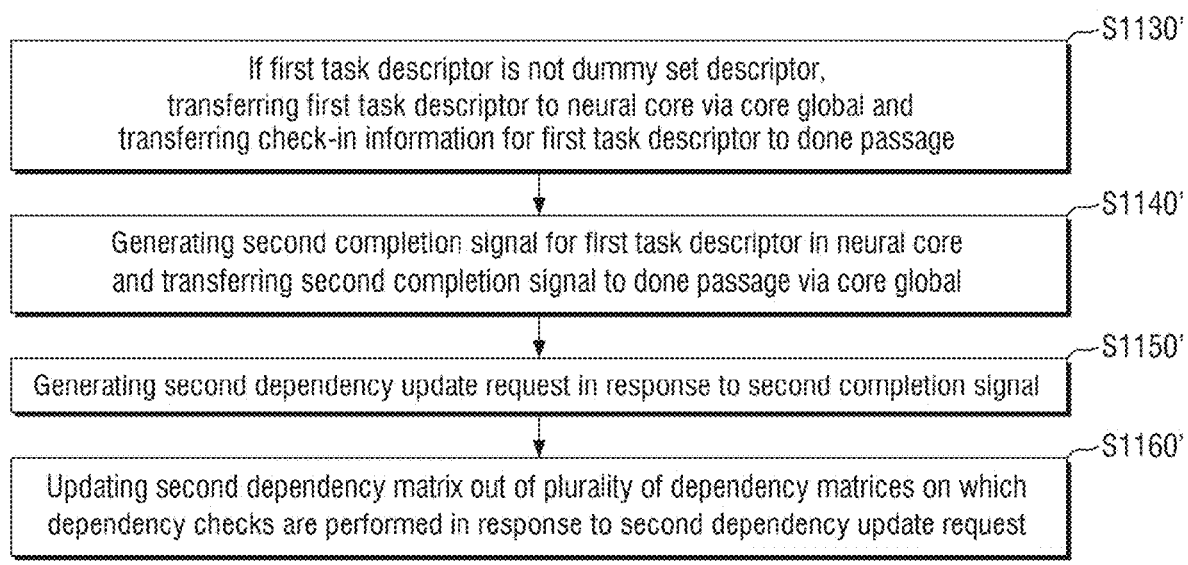
FIG. 58 is a flowchart for illustrating a process of a dependency setting when the first task descriptor is not a dummy set descriptor.

FIG. 57 is a flowchart for illustrating a method for setting task dependencies of a neural processing device in accordance with some embodiments of the disclosure, and FIG. 58 is a flowchart for illustrating a process of dependency setting when the first task descriptor is not a dummy set descriptor.

Referring to FIG. 57, a method for setting task dependencies of a neural processing device in accordance with some embodiments of the disclosure includes performing a dependency check on a first task descriptor corresponding to a first task at S1110, determining whether the first task descriptor is a dummy set descriptor at S1120, if the first task descriptor is a dummy set descriptor, transferring the first task descriptor to the void core and transferring check-in information for the first task descriptor to the done passage at S1130, generating a first completion signal for the first task descriptor in the void core and transferring the first completion signal to the done passage at S1140, generating a first dependency update request in response to the first completion signal at S1150, and updating a first dependency matrix out of a plurality of dependency matrices on which dependency checks are performed, in response to the first dependency update request at S1160.

First, a dependency check is performed on the first task descriptor corresponding to the first task at S1110.

The dependency checker DPc may include a plurality of dependency matrices. The dependency checker DPc may input the first task descriptor into the preset dependency matrix DPmx. In some embodiments, the first task descriptor may be in a state in which a dependency matrix inputted by the command processor 7000 has been preset. Illustratively, the first task descriptor may be inputted to the first dependency matrix DPmx_1 and checked for dependency. The dependency checker DPc may generate a dependency check code for the first task descriptor, and compare the dependency check code with the first dependency matrix, thereby determining whether they are identical. If identity is recognized, the dependency may be checked on the first task descriptor.

Next, it is determined whether the first task descriptor is a dummy set descriptor at S1120.

At S1120, it is determined whether the first task descriptor is a dummy set descriptor. In an embodiment, a task descriptor on which actual computations or operations are performed is defined as a real task descriptor, and a task descriptor on which no actual computation or operation is performed is defined as a dummy task descriptor. In addition, a task descriptor configured to set an update to a particular dependency matrix in the dummy task descriptor is defined as a dummy set descriptor.

The dummy set descriptors may be configured to include only information for dependency settings to task descriptors whose dependencies are checked in a particular dependency matrix. In some embodiments, the dummy set descriptors may be configured such that no actual computation or operation is performed, and may be configured such that only a checkout process for generating the dependency update request is performed.

In an embodiment, the first task descriptor may be determined as to whether it is a dummy set descriptor depending on whether it includes information for computation or operation.

At step S1120, if the first task descriptor is a dummy set descriptor, dependencies for dependent task descriptors are set through steps S1130 to S1160 to be described later.

In some embodiments, if the first task descriptor is a dummy set descriptor, transferring the first task descriptor to the void core and transferring check-in information for the first task descriptor to the done passage at S1130, generating a first completion signal for the first task descriptor in the void core and transferring the first completion signal to the done passage at S1140, generating a first dependency update request in response to the first completion signal at S1150, and updating a first dependency matrix out of a plurality of dependency matrices on which dependency checks are performed in response to the first dependency update request at S1160 may be proceeded, as shown in FIG. 57.

Here, the first dependency matrix may be a matrix into which a second task descriptor dependent on the first task descriptor is inputted for dependency check.

In some embodiments, the dependency setting for the dependency check of the dependent second task descriptor may be performed using a path through the void core without actual computation or operation proceeding through the first task descriptor, which is a dummy task descriptor.

In addition, at S1120, if the first task descriptor is not a dummy set descriptor, i.e., if it is a real task descriptor, dependencies for dependent task descriptors are set through steps S1130' to S1160' according to FIG. 58.

In some embodiments, if the first task descriptor is not a dummy set descriptor, transferring the first task descriptor to the neural core via the core global and transferring check-in information for the first task descriptor to the done passage at S1130'; generating a second completion signal for the first task descriptor in the neural core and transferring the second completion signal to the done passage via the core global at S1140'; generating a second dependency update request in response to the second completion signal at S1150', and updating a second dependency matrix out of the plurality of dependency matrices on which dependency checks are performed in response to the second dependency update request at S1160' may be proceeded.

Here, the second dependency matrix may be a matrix into which a second task descriptor dependent on the first task descriptor is inputted for a dependency check. In some embodiments, the dependency setting for the dependency check of the dependent second task descriptor may be performed based not on the dummy set descriptor but on the completion signal generated according to the actual computation or operation action of the first task descriptor.

In some embodiments, blocks, units, modules, and components as describe above may be implemented as a circuit or circuitry. Blocks, units, modules, and components which perform processing may be referred to as a processor, a processing circuit, a processor circuit, or a processing circuitry. Blocks, units, modules, and components which store data may be referred to as a memory, a memory circuit, or a memory circuitry.

Hereinafter, various aspects will be described.

In some aspects, a neural processing device comprises processing circuitry; and a task managing circuit coupled to the processing circuitry. The task managing circuit is configured to cause: storing tasks in a dependency check waiting memory; determining whether reference tasks which a currently-waiting task in the dependency check waiting memory depends on are completed based on a dependency of the currently-waiting task and a memory area storing one or more dependency check matrices, wherein the dependency of the currently-waiting task represents a list of tasks which have to be completed for the currently-waiting task to be transferred to the processing circuitry and the one or more dependency check matrices represent whether reference tasks which tasks in the dependency check waiting memory depend on are completed; transferring the currently-waiting task from the dependency check waiting memory to the processing circuitry in response to determining that the reference tasks which the currently-waiting task depends on are completed; updating the one or more dependency check matrices in response to a signal indicating that a task executed by the processing circuitry is completed.

In some aspects, each of the one or more dependency check matrices includes a rectangular array of elements in arranged in rows and columns, each of the rows is associated with a respective one of the plurality of task types, each of the columns is associated with a respective one of the plurality of task types, and a respective one element of the elements in the rectangular array represents whether a reference task which has a type associated with a column of the respective one element in the rectangular array and which a task of a type associated with a row of the respective one element in the rectangular array depends on is completed.

In some aspects, it is determined that the reference tasks which the currently-waiting task depends on are completed in response to a determination that the dependency check matrix indicates that reference tasks listed by the dependency of the currently-waiting task are completed, and it is determined that reference tasks which the currently-waiting task depends on are incomplete in response to a determination that the dependency check matrix indicates that reference tasks listed by the dependency of the currently-waiting task are incomplete.

In some aspects, at least one of the the one or more dependency check matrices further includes a vector array of elements in arranged in the columns, and a respective one element of the elements in the vector array stores represents whether at least one of reference tasks which a task of a type associated with a row of the respective one element in the vector array depends on is completed. In some embodiments, it is determined that the reference tasks which the currently-waiting task depends on are completed in response to a determination that the dependency check matrix indicates that at least one of reference tasks listed by the dependency of the currently-waiting task is completed, and it is determined that reference tasks which the currently-waiting task depends on are incomplete in response to a determination that the dependency check matrix indicates that at least one of reference tasks listed by the dependency of the currently-waiting task is incomplete.

In some aspects, at least one of the the one or more dependency check matrices further includes a first vector array of elements in arranged in the columns, and a respective one element of the elements in the first vector array stores represents how many reference tasks which a task of a type associated with a row of the respective one element in the first vector array depends on are completed. In some embodiments, it is determined that the reference tasks which the currently-waiting task depends on are completed in response to a determination that a value of an element for the currently-waiting task in the first array is equal to a number of of reference tasks listed by the dependency of the currently-waiting task, and it is determined that reference tasks which the currently-waiting task depends on are incomplete in response to a determination that a value of an element for the currently-waiting task in the first array is less than a number of of reference tasks listed by the dependency of the currently-waiting task.

In some aspects, the processing circuitry includes one or more neural processing circuits and one or more non-neural processing circuits, at least one of the the one or more dependency check matrices further includes a second vector array of elements in arranged in the columns, a respective one element of the elements in the second vector array stores represents how many non-neural reference tasks which are executed by the one or more non-neural processing circuits and which a task of a type associated with a row of the respective one element in the second vector array depends on are completed, a respective one element of the elements in the first vector array stores represents how many reference tasks which are executed by the one or more neural processing circuits and which a task of a type associated with a row of the respective one element in the first vector array depends on are completed. In some embodiments, it is determined that the reference tasks which the currently-waiting task depends on are completed further in response to a determination that a value of an element for the currently-waiting task in the second array is equal to a number of of non-neural reference tasks listed by the dependency of the currently-waiting task, and it is determined that reference tasks which the currently-waiting task depends on are incomplete further in response to a determination that a value of an element for the currently-waiting task in the second array is less than a number of of non-neural reference tasks listed by the dependency of the currently-waiting task.

In some aspects, asks in a dependency check waiting memory belongs to a group of a plurality of groups, each of the one or more dependency check matrices is associated with a respective one of the plurality of groups, and a task of a type associated with a row of the respective one element in the rectangular array belongs to a group associated with a dependency check matrix including the respective one element in the rectangular array.

In some aspects, the dependency check waiting memory includes a plurality of dependency check waiting queues, each of the plurality of dependency check waiting queues is associated with a respective one of a plurality of task types, and a respective one task of the tasks is stored in a dependency check waiting queue associated with a task type of a respective one task.

In some aspects, the tasks are for a machine learning model, the processing circuitry performs transferred tasks to generate task results, and the neural processing device is configured to perform training or inference of the machine learning model based on the task results.

In some aspects, transferring the currently-waiting task from the dependency check waiting memory to the processing circuitry comprises: transferring the currently-waiting task from the dependency check waiting memory to a plurality of check-in waiting queues in response to determining that the reference tasks which the currently-waiting task depends on are completed, and transferring tasks in the plurality of check-in waiting queues to the processing circuitry.

In some aspects, tasks in the dependency check waiting memory include a first task, a second task, a third task, and a dummy check task. In some embodiments, the dummy check task is burnt out without being executed by the processing circuitry, the third task depends on the first task, the dummy check task depends on the second task, and the third task and the dummy check task belongs to the same group.

In some aspects, tasks in the dependency check waiting memory include a first task, a second task, a dummy set task, and a third task. In some embodiments, the dummy set task causes updating the one or more dependency check matrices without being executed by the processing circuitry when reference tasks the dummy set task depends on are completed, the second task depends on the first task, the dummy set task depends on the first task, and the third task depends on the dummy set task.

In some aspects, each of the tasks has a form of a task descriptor including a dependency set code and a dependency check code, the one or more dependency check matrices are updated by the dependency set code of a completed task, and whether reference tasks which the currently-waiting task depends on are completed is determined by comparing the dependency check code of the currently-waiting task and a vector in the one or more dependency check matrices.

In some aspects, a method performed by a neural processing device, comprises: storing tasks in a dependency check waiting memory; determining whether reference tasks which a currently-waiting task in the dependency check waiting memory depends on are completed based on a dependency of the currently-waiting task and a memory area storing one or more dependency check matrices, wherein the dependency of the currently-waiting task represents a list of tasks which have to be completed for the currently-waiting task to be transferred to a processing circuitry and the one or more dependency check matrices represent whether reference tasks which tasks in the dependency check waiting memory depend on are completed; transferring the currently-waiting task from the dependency check waiting memory to the processing circuitry in response to determining that the reference tasks which the currently-waiting task depends on are completed; and updating the one or more dependency check matrices in response to a signal indicating that a task executed by the processing circuitry is completed.

In some aspects, each of the one or more dependency check matrices includes a rectangular array of elements in arranged in rows and columns, each of the rows is associated with a respective one of the plurality of task types, each of the columns is associated with a respective one of the plurality of task types, and a respective one element of the elements in the rectangular array represents whether a reference task which has a type associated with a column of the respective one element in the rectangular array and which a task of a type associated with a row of the respective one element in the rectangular array depends on is completed.

In some aspects, it is determined that the reference tasks which the currently-waiting task depends on are completed in response to a determination that the dependency check matrix indicates that reference tasks listed by the dependency of the currently-waiting task are completed, and it is determined that reference tasks which the currently-waiting task depends on are incomplete in response to a determination that the dependency check matrix indicates that reference tasks listed by the dependency of the currently-waiting task are incomplete.

In some aspects, tasks in a dependency check waiting memory belongs to a group of a plurality of groups, each of the one or more dependency check matrices is associated with a respective one of the plurality of groups, and a task of a type associated with a row of the respective one element in the rectangular array belongs to a group associated with a dependency check matrix including the respective one element in the rectangular array.

In some aspects, transferring the currently-waiting task from the dependency check waiting memory to the processing circuitry comprises: transferring the currently-waiting task from the dependency check waiting memory to a plurality of check-in waiting queues in response to determining that the reference tasks which the currently-waiting task depends on are completed, and transferring tasks in the plurality of check-in waiting queues to the processing circuitry.

In some aspects, tasks in the dependency check waiting memory include a first task, a second task, a third task, and a dummy check task. In some embodiments, the dummy check task which is burnt out without being executed by the processing circuitry, the third task depends on the first task, the dummy check task depends on the second task, and the third task and the dummy check task belongs to the same group.

In some aspects, tasks in the dependency check waiting memory include a first task, a second task, a dummy set task, and a third task. In some embodiments, the dummy set task causes updating the one or more dependency check matrices without being executed by the processing circuitry when reference tasks the dummy set task depends on are completed, the second task depends on the first task, the dummy set task depends on the first task, and the third task depends on the dummy set task.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the disclosure.

What is claimed is:
1. A neural processing device comprising:
processing circuitry; and
task managing circuitry operably coupled to the processing circuitry,
wherein the task managing circuitry is configured to cause:
receiving a plurality of tasks;
storing the plurality of received tasks in a dependency check waiting memory;
determining whether reference tasks which a currently-waiting task in the dependency check waiting memory depends on are completed based on a dependency of the currently-waiting task and a memory area storing one or more dependency check matrices, wherein the dependency of the currently-waiting task represents a list of tasks which have to be completed for the currently-waiting task to be transferred to the processing circuitry and the one or more dependency check matrices represent whether reference tasks which tasks in the dependency check waiting memory depend on are completed;
transferring the currently-waiting task in the dependency check waiting memory to the processing circuitry in response to determining that the reference tasks which the currently-waiting task depends on are completed; and
updating the one or more dependency check matrices in response to a signal indicating that a task processed by the processing circuitry is completed, wherein
the dependency check waiting memory includes a plurality of dependency check waiting queues,
each of the plurality of dependency check waiting queues is associated with a respective one of a plurality of task types, and
a respective one task of the tasks is stored in a dependency check waiting queue associated with a task type of a respective one task.

2. The neural processing device of claim 1, wherein
each of the one or more dependency check matrices includes a rectangular array of elements arranged in rows and columns,
each of the rows is associated with a respective one of a plurality of task types,
each of the columns is associated with a respective one of the plurality of task types, and
a respective one element of the elements in the rectangular array represents whether a reference task which has a type associated with a column of the respective one element in the rectangular array and which a task of a type associated with a row of the respective one element in the rectangular array depends on is completed.

3. The neural processing device of claim 2, wherein
it is determined that the reference tasks which the currently-waiting task depends on are completed in response to a determination that the dependency check matrix indicates that reference tasks listed by the dependency of the currently-waiting task are completed, and
it is determined that reference tasks which the currently-waiting task depends on are incomplete in response to a determination that the dependency check matrix indicates that reference tasks listed by the dependency of the currently-waiting task are incomplete.

4. The neural processing device of claim 2, wherein
at least one of the one or more dependency check matrices further includes a vector array of elements arranged in the columns,
a respective one element of the elements in the vector array stores represents whether at least one of the reference tasks which a task of a type associated with a row of the respective one element in the vector array depends on is completed, it is determined that the reference tasks which the currently-waiting task depends on are completed in response to a determination that the dependency check matrix indicates that at least one of the reference tasks listed by the dependency of the currently-waiting task is completed, and it is determined that reference tasks which the currently-waiting task depends on are incomplete in response to a determination that the dependency check matrix indicates that at least one of the reference tasks listed by the dependency of the currently-waiting task is incomplete.

5. The neural processing device of claim 2, wherein
at least one of the one or more dependency check matrices further includes a first vector array of elements arranged in the columns, a respective one element of the elements in the first vector array stores represents how many reference tasks which a task of a type associated with a row of the respective one element in the first vector array depends on are completed, it is determined that the reference tasks which the currently-waiting task depends on are completed in response to a determination that a value of an element for the currently-waiting task in the first array is equal to a number of reference tasks listed by the dependency of the currently-waiting task, and it is determined that reference tasks which the currently-waiting task depends on are incomplete in response to a determination that a value of an element for the currently-waiting task in the first array is less than a number of reference tasks listed by the dependency of the currently-waiting task.

6. The neural processing device of claim 5, wherein
the processing circuitry includes one or more neural processing circuits and one or more non-neural processing circuits, at least one of the one or more dependency check matrices further includes a second vector array of elements arranged in the columns, a respective one element of the elements in the second vector array stores represents how many non-neural reference tasks which are processed by the one or more non-neural processing circuits and which a task of a type associated with a row of the respective one element in the second vector array depends on are completed, a respective one element of the elements in the first vector array stores represents how many reference tasks which are processed by the one or more neural processing circuits and which a task of a type associated with a row of the respective one element in the first vector array depends on are completed, it is determined that the reference tasks which the currently-waiting task depends on are completed further in response to a determination that a value of an element for the currently-waiting task in the second array is equal to a number of non-neural reference tasks listed by the dependency of the currently-waiting task, and it is determined that reference tasks which the currently-waiting task depends on are incomplete further in response to a determination that a value of an element for the currently-waiting task in the second array is less than a number of non-neural reference tasks listed by the dependency of the currently-waiting task.

7. The neural processing device of claim 2, wherein
tasks in a dependency check waiting memory belongs to a group of a plurality of groups, each of the one or more dependency check matrices is associated with a respective one of the plurality of groups, and a task of a type associated with a row of the respective one element in the rectangular array belongs to a group associated with a dependency check matrix including the respective one element in the rectangular array.

8. The neural processing device of claim 1, wherein transferring the currently-waiting task from the dependency check waiting memory to the processing circuitry comprises:

transferring the currently-waiting task from the dependency check waiting memory to a process waiting memory in response to determining that the reference tasks which the currently-waiting task depends on are completed, and transferring tasks in the process waiting memory to the processing circuitry.

9. The neural processing device of claim 1, wherein
tasks in the dependency check waiting memory include a first task, a second task, a third task, and a dummy check task, the dummy check task is burnt out without being processed by the processing circuitry, the third task depends on the first task, the dummy check task depends on the second task, and the third task and the dummy check task belongs to the same group.

10. The neural processing device of claim 1, wherein
tasks in the dependency check waiting memory include a first task, a second task, a dummy set task, and a third task, the dummy set task causes updating the one or more dependency check matrices without being processed by the processing circuitry when reference tasks the dummy set task depends on are completed, the second task depends on the first task, the dummy set task depends on the first task, and the third task depends on the dummy set task.

11. The neural processing device of claim 1, wherein
each of the tasks has a form of a task descriptor including a dependency set code and a dependency check code, the one or more dependency check matrices are updated by the dependency set code of a completed task, and whether reference tasks which the currently-waiting task depends on are completed is determined by comparing the dependency check code of the currently-waiting task and a vector in the one or more dependency check matrices.

12. A method performed by a neural processing device, comprising:

receiving a plurality of tasks;

storing the plurality of received tasks in a dependency check waiting memory;

determining whether reference tasks which a currently-waiting task in the dependency check waiting memory depends on are completed based on a dependency of the currently-waiting task and a memory area storing one or more dependency check matrices, wherein the dependency of the currently-waiting task represents a list of tasks which have to be completed for the currently-waiting task to be transferred to a processing circuitry and the one or more dependency check matrices represent whether reference tasks which tasks in the dependency check waiting memory depend on are completed;

transferring the currently-waiting task from the dependency check waiting memory to the processing circuitry in response to determining that the reference tasks which the currently-waiting task depends on are completed; and updating the one or more dependency check matrices in response to a signal indicating that a task processed by the processing circuitry is completed, wherein the dependency check waiting memory includes a plurality of dependency check waiting queues, each of the plurality of dependency check waiting queues is associated with a respective one of a plurality of task types, and a respective one task of the tasks is stored in a dependency check waiting queue associated with a task type of a respective one task.

13. The method of claim 12, wherein each of the one or more dependency check matrices includes a rectangular array of elements arranged in rows and columns, each of the rows is associated with a respective one of a plurality of task types, each of the columns is associated with a respective one of the plurality of task types, and a respective one element of the elements in the rectangular array represents whether a reference task which has a type associated with a column of the respective one element in the rectangular array and which a task of a type associated with a row of the respective one element in the rectangular array depends on is completed.

14. The method of claim 13, wherein it is determined that the reference tasks which the currently-waiting task depends on are completed in response to a determination that the dependency check matrix indicates that reference tasks listed by the dependency of the currently-waiting task are completed, and it is determined that reference tasks which the currently-waiting task depends on are incomplete in response to a determination that the dependency check matrix indicates that reference tasks listed by the dependency of the currently-waiting task are incomplete.

15. The method of claim 13, wherein tasks in a dependency check waiting memory belongs to a group of a plurality of groups, each of the one or more dependency check matrices is associated with a respective one of the plurality of groups, and a task of a type associated with a row of the respective one element in the rectangular array belongs to a group associated with a dependency check matrix including the respective one element in the rectangular array.

16. The method of claim 12, wherein transferring the currently-waiting task from the dependency check waiting memory to the processing circuitry comprises:

transferring the currently-waiting task from the dependency check waiting memory to the process waiting memory in response to determining that the reference tasks which the currently-waiting task depends on are completed, and transferring tasks in the process waiting memory to the processing circuitry.

17. The method of claim 12, wherein tasks in the dependency check waiting memory include a first task, a second task, a third task, and a dummy check task, the dummy check task which is burnt out without being processed by the processing circuitry, the third task depends on the first task, the dummy check task depends on the second task, and the third task and the dummy check task belongs to the same group.

18. The method of claim 12, wherein tasks in the dependency check waiting memory include a first task, a second task, a dummy set task, and a third task, the dummy set task causes updating the one or more dependency check matrices without being processed by the processing circuitry when reference tasks the dummy set task depends on are completed, the second task depends on the first task, the dummy set task depends on the first task, and the third task depends on the dummy set task.

* * * * *